United States Patent
Butcher et al.

(10) Patent No.: US 10,352,385 B2
(45) Date of Patent: Jul. 16, 2019

(54) DRIVE ASSEMBLY FOR CONVERSION SYSTEM

(71) Applicant: Stolle Machinery Company, LLC, Centennial, CO (US)

(72) Inventors: Gregory H. Butcher, Columbus, OH (US); Aaron E. Carstens, Centerville, OH (US); Patrick K. McCarty, Dayton, OH (US); Jason A. Davidson, Sidney, OH (US); Neil A. Zumberger, Sidney, OH (US); Kenneth E. Carper, Cincinnati, OH (US); Russell Bauer, West Chester, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 457 days.

(21) Appl. No.: 14/881,234

(22) Filed: Oct. 13, 2015

(65) Prior Publication Data

US 2016/0030996 A1     Feb. 4, 2016

Related U.S. Application Data

(63) Continuation-in-part of application No. 14/211,378, filed on Mar. 14, 2014, now Pat. No. 9,321,097, and
(Continued)

(51) Int. Cl.
*B21D 51/38* (2006.01)
*F16D 67/04* (2006.01)
(Continued)

(52) U.S. Cl.
CPC .............. *F16D 67/04* (2013.01); *B21D 51/38* (2013.01); *F16D 67/02* (2013.01); *F16H 48/05* (2013.01); *F16H 48/12* (2013.01); *B21D 24/005* (2013.01)

(58) Field of Classification Search
CPC ...... B21D 51/38; B21D 51/383; B30B 15/10; B30B 15/14; B30B 15/12; F16D 67/02
See application file for complete search history.

(56) References Cited

U.S. PATENT DOCUMENTS

| | | | | |
|---|---|---|---|---|
| 1,863,425 A | * | 6/1932 | Wallbillich | F16P 3/00 192/131 R |
| 2,472,452 A | | 6/1949 | Wissman | |

(Continued)

FOREIGN PATENT DOCUMENTS

| | | |
|---|---|---|
| CN | 103630354 | 3/2014 |
| JP | 57-159225 | 10/1982 |

(Continued)

OTHER PUBLICATIONS

Stolle Machinery Company, LLC, PCT/US2015/055709 International Search Report and Written Opinion, dated Dec. 31, 2015, 9 pages.

(Continued)

*Primary Examiner* — Pradeep C Battula
(74) *Attorney, Agent, or Firm* — Eckert Seamans Cherin & Mellott, LLC

(57) ABSTRACT

A conversion system wherein a crankshaft drives the motion of the tooling assemblies within a number of lanes is provided. The crankshaft is structured to move the tooling assemblies associated with less than the total number of lanes. That is, for example, a four lane conversion press could include two crankshafts each actuating the tooling assemblies of two lanes. In an exemplary embodiment, each lane has a single associated crankshaft. The conversion system includes a multiple press drive assembly with a clutch/brake assembly and a flywheel assembly. The clutch/brake assembly is structured to suspend operation of the press units while the flywheel assembly stores energy in a
(Continued)

flywheel. When operation of the press units is restarted, energy from the flywheel aids the motor in bringing the press units to an operating speed.

5 Claims, 28 Drawing Sheets

Related U.S. Application Data a continuation-in-part of application No. 14/211,534, filed on Mar. 14, 2014, now Pat. No. 9,393,610.

(60) Provisional application No. 61/790,363, filed on Mar. 15, 2013.

(51) Int. Cl.
*F16H 48/12* (2012.01)
*F16H 48/05* (2012.01)
*F16D 67/02* (2006.01)
*B21D 24/00* (2006.01)

(56) References Cited

U.S. PATENT DOCUMENTS

| | | | | |
|---|---|---|---|---|
| 2,505,600 | A * | 4/1950 | Wissman | F16D 67/04 188/366 |
| 3,805,931 | A * | 4/1974 | Portmann | B30B 15/10 192/12 C |
| 4,106,422 | A | 8/1978 | Buhrke | |
| 4,262,510 | A * | 4/1981 | Allen | B21D 51/26 72/17.3 |
| 4,327,569 | A * | 5/1982 | Hamanishi | B21B 31/103 72/239 |
| 4,382,737 | A * | 5/1983 | Jensen | B21D 51/44 72/348 |
| 4,519,489 | A | 5/1985 | Dingus et al. | |
| 4,589,533 | A * | 5/1986 | Del Duca | B30B 15/10 192/12 C |
| 4,723,882 | A | 2/1988 | Wissman et al. | |
| 4,918,956 | A | 4/1990 | Schoch | |
| 5,209,098 | A | 5/1993 | Cudzik | |
| 5,511,920 | A | 4/1996 | Artrip | |
| 5,876,171 | A | 3/1999 | Martin et al. | |
| 5,915,296 | A * | 6/1999 | Itakura | B30B 1/26 100/209 |
| 7,234,907 | B1 | 6/2007 | Artrip | |
| 7,464,576 | B2 | 12/2008 | Turner et al. | |
| 9,399,248 | B2 * | 7/2016 | Fleischer | B21D 51/26 |
| 2007/0113985 | A1 | 5/2007 | Gysi et al. | |
| 2008/0267736 | A1 | 10/2008 | Artrip | |
| 2011/0203123 | A1 * | 8/2011 | Holcomb | B27B 17/00 30/382 |
| 2014/0271043 | A1 | 9/2014 | Butcher et al. | |

FOREIGN PATENT DOCUMENTS

| | | |
|---|---|---|
| JP | 3-47685 | 5/1991 |
| JP | 05-220529 | 8/1993 |
| JP | 2011-212701 | 10/2011 |

OTHER PUBLICATIONS

Stolle Machinery Company, LLC, EP 17186023.2 Search Report, dated Dec. 12, 2017, 8 pages.
Stolle Machinery Company, LLC, JP 2016-502775 Office Action, dated Dec. 12, 2017, 4 pages.

* cited by examiner

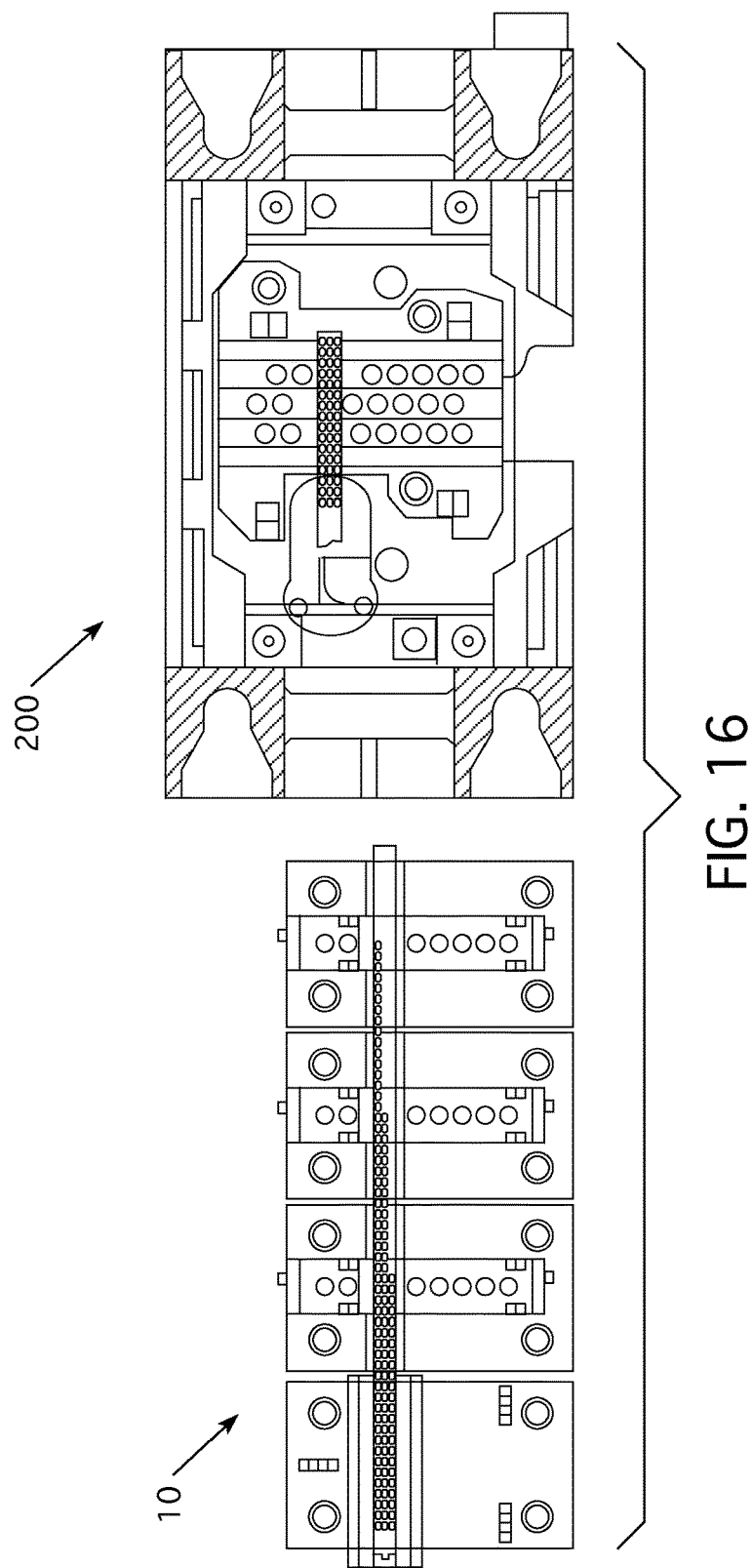

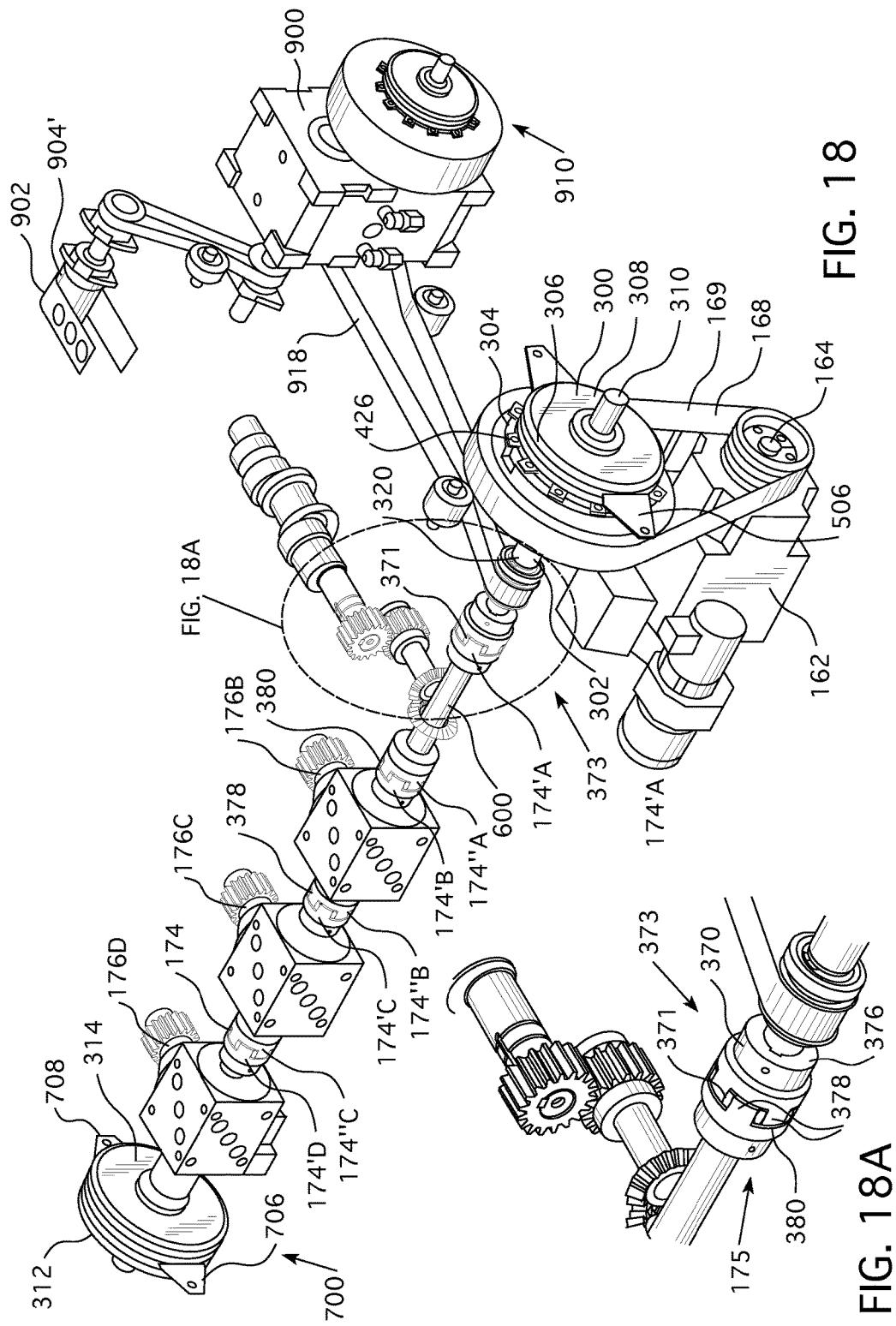

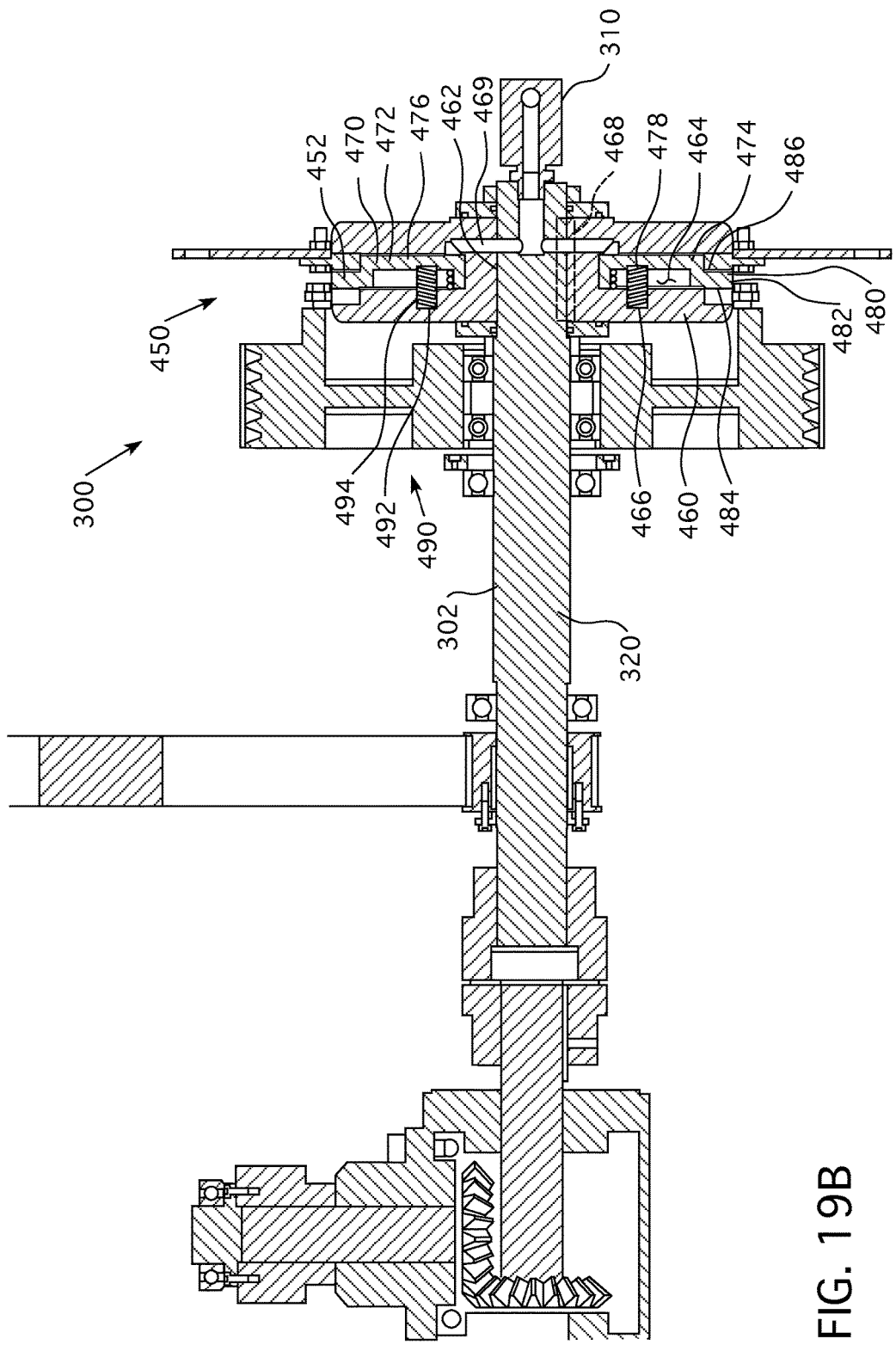

DRIVE ASSEMBLY FOR CONVERSION SYSTEM

CROSS REFERENCE TO RELATED APPLICATION

This application is a continuation-in-part application of and claims priority to U.S. Provisional Patent Application Ser. No. 61/790,363, filed Mar. 15, 2013, entitled CONVERSION SYSTEM; U.S. patent application Ser. No. 14/211,378, filed Mar. 14, 2014, entitled, CONVERSION SYSTEM; and U.S. patent application Ser. No. 14/211,534, filed Mar. 14, 2014, entitled, CONVERSION PRESS.

BACKGROUND OF THE INVENTION

Field of the Invention

The disclosed and claimed concept relates to a conversion system and, more specifically, to a multi-out conversion system utilizing a crankshaft associated with each end lane or tab, wherein the lanes are isolated portions of the total load thereby reducing and aligning the applied load per crankshaft.

Background Information

Metallic containers (e.g., cans) for holding products such as, for example, food and beverages, are typically provided with an easy open can end on which a pull tab is attached (e.g., without limitation, riveted) to a tear strip or severable panel. The severable panel is defined by a scoreline in the exterior surface (e.g., public side) of the can end. The pull tab is structured to be lifted and/or pulled to sever the scoreline and deflect and/or remove the severable panel, thereby creating an opening for dispensing the contents of the can.

A can end consists of a shell and tab. The shell and the tab are made in separate presses. The shell is created by cutting out and forming the shell from a coil of sheet metal product (e.g., without limitation, sheet aluminum; sheet steel). In a separate press, tabs for the can end are produced by feeding in a continuous coil through a tab die. The shells and tabs are conveyed to a conversion press. At the conversion press, the blank shell is fed onto a belt which indexes through an elongated, progressive die known as a lane die. The lane dies include a number of tooling stations which form the paneling, score and integrated rivet on the shell. The lane dies are part of an upper tooling assembly and a lower tooling assembly. The tabs move longitudinally through the die(s). The longitudinal axes of the tab die(s) are disposed generally perpendicular to the longitudinal axes of the lane dies. At the final tool station, the tab is coupled to the shell thereby creating the can end.

Typically, each tool station of the conversion press includes an upper tool member, which is structured to be advanced towards a lower tool member upon actuation of a press ram. The shell is received between the upper and lower tool members. Alternatively stated, the shell is received between the upper and lower tool assemblies. The upper tool assembly is structured to reciprocate between an upper position, spaced from the lower tool assembly, and a lower position, adjacent the lower tool assembly. Thus, the upper tool member engages the shell when the upper tool assembly is in the second position and the upper and/or lower tool members, respectively, act upon the public and/or product (e.g., interior side, which faces the can body) sides of the shell, in order to perform a number of the aforementioned conversion operations. Upon completion of a cycle, the press ram retracts the upper tool assembly and the partially converted shell is moved to the next successive tool station, or the tooling is changed within the same station, to perform the next conversion operation.

As noted above, the conversion press is, typically, structured to process multiple can ends at one time. That is, the conversion press includes multiple lane dies defining separate "lanes." Each lane includes successive tool stations. It is common to include an even number of lanes, e.g., four lanes. The successive tool stations in each lane may be identical or different. Generally, the first tool station in each lane performs a forming operation such as forming a bubble, or, first formation to create the integrated rivet. This operation requires a high force, but the location of the application of force is furthest away from ram resulting in the highest tipping moment.

The conversion press typically includes a single elongated ram that operates all die sets. The ram applies a total superposition of force(s) of about 80 tons. Rams capable of providing such forces are large and require a large drive assembly as well. This force is applied along the longitudinal axis of the ram. The ram is typically coupled to a central location on a die shoe that supports the upper tool members. Thus, when there are four lanes, the ram is attached between the two central lanes and offset from all tool stations. In this configuration, the ram, the die shoe and the linkages therebetween are subjected to multiple loads and moment arms that are unbalanced. That is, because the ram is not aligned with any single lane, there are various tipping moments (i.e. torque) applied to the ram, the die shoe and the linkages therebetween that would not be present, or would be lower, if the conversion press had a single lane and the press ram was aligned with the lane.

The forces on the ram, the die shoe and the linkages therebetween are further unbalanced because the bubble operation at the first tool station creates a greater tipping moment than subsequent tool stations. That is, while the bubble operation may not need the greatest force, because this operation occurs at the first tool station, the distance from the center of the tool lane die is greater than for other tool stations. Thus, the distance multiplied by a large force creates the largest tipping moment. The tab lane die, however, is subjected to lesser forces and, as such, the loads and tipping moments cause fewer problems with regard to the tab lane die assembly. The tab lane, however, does create tipping moments on the ram when the ram actuates the tab lane die. That is, by virtue of being coupled, and spaced, from the ram, the ram and other elements are subject to wear and tear due to the tab lane die assembly even though the tab lane die assembly is relatively unaffected by those same forces. The large force required to operate the conversion press, as well as the unbalanced load, cause these elements to deflect, thereby causing wear and tear on the ram, the end lane die assemblies, including the die shoe, and the linkages therebetween.

Further, the ram is, typically, disposed above the die shoe and tooling stations. Generally, it is easier to construct a ram assembly above the tooling elements than to provide space for the ram below the tooling elements. Thus, the ram is, typically, disposed above the can ends being formed. In this configuration, lubricants and cooling fluids used in/on the ram may drip on the can lids.

A specific example is disclosed in Appendix A wherein, as shown in Figure A, a conversion press includes three lanes, lanes A, B, and C. Each end lane typically includes eight tooling stations and each tab lane typically includes seventeen tooling stations. As shown in the table data at page 1, the loads in the first three stations is greater than the other stations. Using the lane A stake station as an initial origin, the tipping moments for each lane and station can be determined. These calculations are shown on Appendix pages 2-6. For example, because lane B is disposed along the X-axis, there are no X moment arms for the lane A tool stations. Further, the ram center is disposed at the location indicated. Knowing the various loads and moment arms relative to the initial origin, the loads and moment arms relative to the ram center can be determined as shown on Appendix A, page 7. Because these loads are not balanced, the ram press includes "kiss blocks" disposed at locations spaced from the ram center (three identified). When the kiss blocks are deflected, they create a counter force that balances the ram forces. That is, opposing kiss blocks are disposed on the upper tool assembly and the lower tool assembly. Generally, the kiss blocks contact each other as the upper tool assembly moves into the second position and level the tooling stations.

That is, a kiss block is disposed between each die shoe and each upper and lower tool member. A kiss block is made of hardened steel. A kiss block is disposed at a tool station where the final product specification must be held within 0.0001 inch. As an upper tooling element comes down, the kiss blocks engage and are deflected by as much as 0.025". That is, the upper tooling assembly and the lower tooling assembly have, at the second position, a minimum spacing. Just before the upper tooling assembly and the lower tooling assembly reach the minimum spacing, the kiss blocks engage each other. The distance the upper tooling assembly and the lower tooling assembly move between the time the kiss blocks engage each other and their second position is, as used herein, the "deflection" or "interference" of the kiss blocks. During the time of the interference, the kiss blocks are deformed not unlike a marshmallow is deformed under pressure.

The amount of deflection is set prior to forming operations. Typically, the tool assemblies are moved into the second position and the relative positions of the upper and lower tool assemblies are adjusted so that the kiss blocks are deflected. This adjustment is identified as "pre-load." The pre-load deflection of kiss blocks in different locations are not always the same. For example, when the unload side (downstream, finished product side) kiss blocks are pre-loaded with a 0.025 inch deflection, the load side (upstream, unfinished side) kiss blocks are between about 0.009 inch and 0.011 inch, or about 0.010 inch deflection. The deflection of the kiss blocks removes substantially all deflection out of the ram and also takes up any linkage/bearing clearances in the press. In this configuration, the kiss blocks ensure that the upper tooling is substantially flat and parallel to the bottom tooling. It also ensures that the residual of any end stock between the upper and lower tooling, such as a score, is maintained to as accurate as +/−0.00045 inch (i.e. a 0.0009 inch range). When the die assemblies separate, the kiss blocks vibrate while returning to their original shape. This vibration, known as "snap through," causes wear and tear on the conversion press. The snap through vibration is increased when the deflection is greater.

The unbalanced forces, and the associated wear and tear, the size of the ram and associated drive, and the potential for fluids dripping on the can ends are problems with known presses. The degree to which the kiss blocks are deflected, i.e. the amount of deflection of the kiss blocks, is also a disadvantage.

SUMMARY OF THE INVENTION

At least one embodiment of the disclosed and claimed concept provides for a multi-out conversion press wherein a crankshaft drives the motion of the tooling assemblies within a number of lanes. In an exemplary embodiment, there are three end lanes and one tab lane. The crankshaft is structured to move the tooling assemblies associated with less than the total number of lanes of the multi-out conversion press. That is, for example, a four-lane conversion press could include two crankshafts each actuating the tooling assemblies of two lanes. In an exemplary embodiment, each end lane and each tab lane has an associated crankshaft. That is, there are three crankshafts associated with end lanes and one crankshaft associated with a tab lane. In this configuration, the associated drive, as well as the force required to drive the conversion press, is substantially less than the force required to drive a ram coupled to all lanes of the press. By reducing the forces and moments acting upon the linkage assembly and tooling assemblies, wear and tear is reduced. Further, because the smaller proportion of the total load has been aligned and reduced to each lane/crankshaft, the kiss blocks are deflected to a lesser degree; this reduces the snap through vibration discussed above.

Each crankshaft is elongated and the crankshaft longitudinal axis extends substantially parallel to the longitudinal axis of the associated end lane. In an exemplary embodiment, each end lane crankshaft is disposed substantially below a single associated end lane. In this configuration, the linkage assembly is subjected to fewer offset forces, i.e. forces that produce tipping moments on the conversion system components. Further, in this configuration, wear and tear on the linkage assembly and tooling assemblies is reduced. Further, as the crankshaft is disposed below the tooling assemblies, lubricants and other fluids associated with the crankshaft and drive cannot drip onto the can ends.

The crankshaft associated with the tab lane is disposed generally perpendicular to the longitudinal axis of the tab lane. The crankshaft associated with the tab lane is also disposed generally below the tab lane thereby reducing contamination from lubricants and other fluids associated with the crankshaft. The tab lane kiss blocks are not subjected to interference during a forming operation. That is, there is a gap between the tab lane kiss blocks and other elements of the tab lane tooling assemblies. Further, because the tab lane is separate from the end lanes, forces in the tab lane have no effect on the end lane die assemblies. That is, by separating the tab lane die assemblies from the end lane die assemblies, wear and tear is reduced.

Accordingly, the disclosed and claimed concept provides a can end conversion system including a plurality of elongated sets of lanes, each lane set including a crankshaft, a linkage assembly, a first tooling assembly, and a second tooling assembly. The can end conversion system further includes a multiple press drive assembly that is operatively coupled to each crankshaft. Each crankshaft includes an elongated body. Each crankshaft body longitudinal axis is substantially parallel to a lane set longitudinal axis. Each linkage assembly is rotatably coupled to the crankshaft. Each linkage assembly is coupled to the first tooling assembly. Each second tooling assembly disposed in a substantially fixed position relative to the crankshaft. Thus, rotation of each crankshaft moves the first tooling assembly between a first position, wherein the first tooling assembly is spaced from the second tooling assembly, and a second position, wherein the first tooling assembly is adjacent the second tooling assembly. When shells and tabs are passed through the conversion press, forming operations occur when the first tooling assembly is moving into the second position.

The multiple press drive assembly includes a motor, a clutch/brake assembly, and a drive linkage assembly. The motor includes an output shaft. The clutch/brake assembly includes an output shaft. The drive linkage assembly includes a number of gearboxes, a number of linkage shafts, and a number of press shafts. The clutch/brake assembly is operatively coupled to said motor output shaft. The clutch/brake assembly output shaft are operatively coupled to the drive linkage assembly. Each press shaft is structured to be operatively coupled to a crankshaft. In this configuration, the clutch/brake assembly is structured to disengage, that is de-operatively couple, the motor from the drive linkage assembly. Thus, operation of the press units can be suspended.

Further, the clutch/brake assembly includes a flywheel assembly. The motor is operatively coupled to the flywheel assembly and provides a rotational motion to a flywheel. when operation of the press units is restarted, energy from the flywheel is provided to the clutch/brake assembly so as to reduce the burden on the motor.

BRIEF DESCRIPTION OF THE DRAWINGS

A full understanding of the invention can be gained from the following description of the preferred embodiments when read in conjunction with the accompanying drawings in which:

FIG. 15A is a top plan view, FIG. 15B is a front view and FIG. 15C is a side view.

FIG. 16 is a comparison of a conversion system relative to a prior art ram press.

FIG. 18 is a detail isometric view of the direct drive linkage assembly.

FIG. 18A is a detail isometric view of a selectable coupling.

FIGS. 19A, 19B, and 19C are each detail side cross-sectional views of a clutch/brake assembly, each with different reference numbers.

DESCRIPTION OF THE PREFERRED EMBODIMENTS

Figure 1:
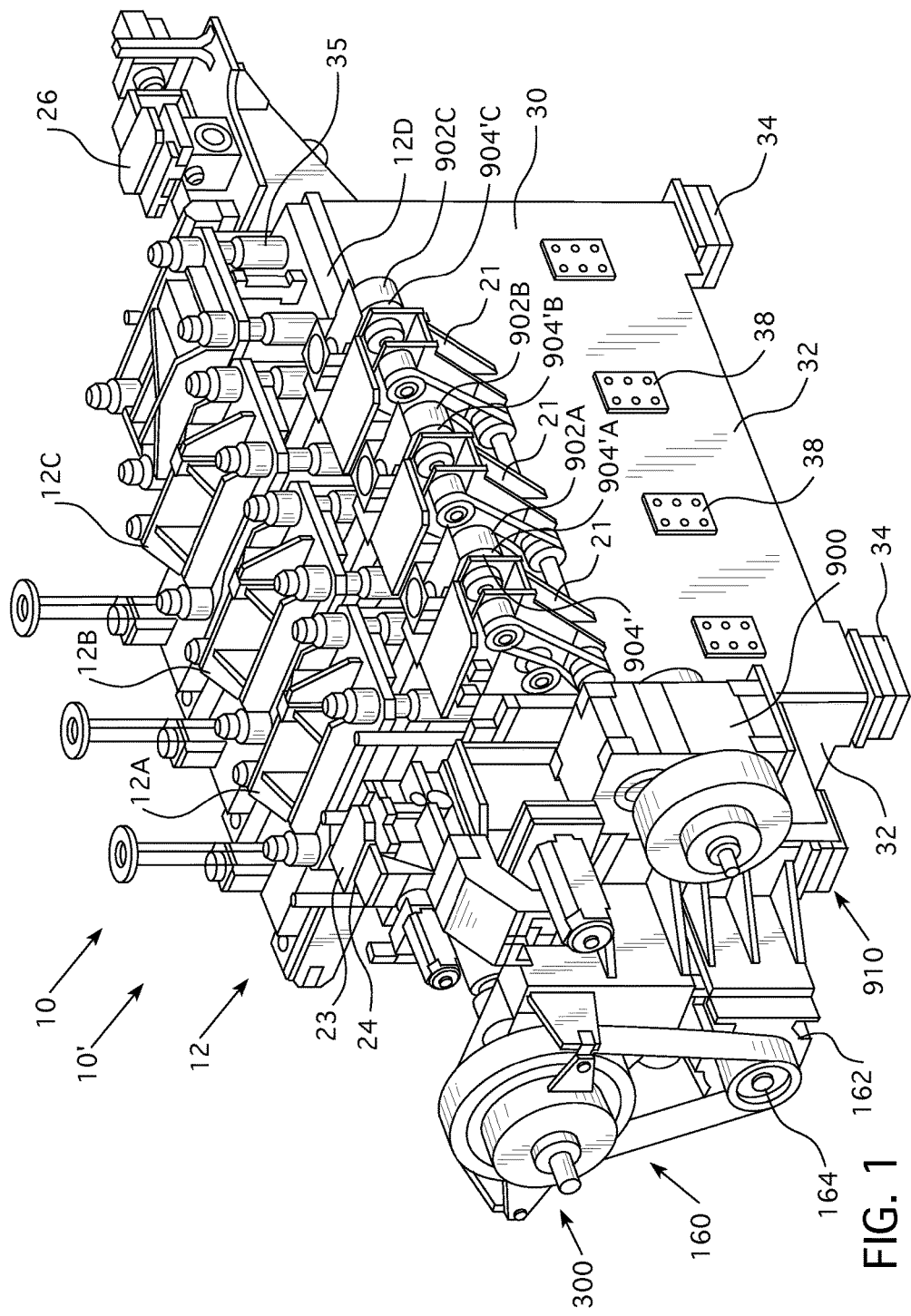
FIG. 1 is an isometric view of a can end conversion system.

For purposes of illustration, embodiments of the disclosed concept will be described as applied to can ends for beverage/beer cans, although it will become apparent that they could also be employed to other containers such as, for example and without limitation, cans for liquids other than beer and beverages, and food cans.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As employed herein, the terms "can" and "container" are used substantially interchangeably to refer to any known or suitable container, which is structured to contain a substance (e.g., without limitation, liquid; food; any other suitable substance), and expressly includes, but is not limited to, food cans, as well as beverage cans, such as beer and soda cans.

As employed herein, the term "can end" refers to the lid or closure that is structured to be coupled to a can, in order to seal the can.

As used herein, a "multi-out" conversion press is a conversion press wherein there is more than one lane of shells being coupled to tabs during a cycle.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, "translate" means to move relative to another element while maintaining the same orientation relative to a distant point.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw; however, when a rotational force is applied to the screwdriver, the screwdriver "operatively engages" the screw and causes the screw to rotate.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such the components of a "coupling assembly" may not be described at the same time in the following description.

As used herein, a "coupling" is one element of a coupling assembly. That is, a coupling assembly includes at least two components, or coupling components, that are structured to be coupled together. It is understood that the elements of a coupling assembly are compatible with each other. For example, in a coupling assembly, if one coupling element is a snap socket, the other coupling element is a snap plug.

As used herein, "correspond" indicates that two structural components are sized and shaped to be similar to each other and/or may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. This definition is further modified if the two components are said to "substantially correspond." "Substantially correspond" means that the size of the opening is very close to the size of the element inserted therein. That is, not so close as to cause substantial friction, as with a snug fit, but with more contact and friction than a "corresponding fit," i.e. a "slightly larger" fit.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

A can end conversion system 10, and more specifically a beverage and food can end conversion system 10', is shown in FIGS. 1-5. Generally, the conversion system 10 forms a can end 1 from a can end shell 1' and a tab 2. Specifically, in the container industry, a pre-converted can end 1 is commonly referred to as a can end shell 1', or simply a shell 1'. One such shell 1' is shown on a feeder device 21 (both shown schematically). As defined herein, the terms "can end," "can end shell" and "shell" may be used interchangeably. Further, as detailed below, a tab 2 is formed and coupled to each shell 1'.

A conversion system 10, that is utilized to perform the conversion operations is partially shown in FIGS. 1-5. The conversion system 10 does not include a ram press. As used herein, a "ram press" is a ram that is either guided by slides or hydrostatic pistons. In one embodiment, such a "ram press" generates a compressive load of about 250,000 lbs., but, as is known, the necessary load or tonnage to form the metal of the can end is a function of the mass of the ram and the velocity of the slide/pistons. Further, the conversion system 10 does not include a "ram press," as is conventionally known in the art such as, but not limited to a press manufactured by Minster of Ohio or Bruderer of Switzerland, and shown in FIGS. 15A-15C. That is, as used herein, a "ram press" consists of a base upon which two columns are mounted. On top of the two columns is a cross member housing known as a crown. The crown is an assembly of a ram and the necessary linkage, typically a crank, which drives the ram up and down.

The conversion system 10 includes a plurality of press units 12. As shown, there are four press units 12A, 12B, 12C, 12D. As detailed below, the four press units 12A, 12B, 12C, 12D define three end lanes 20A, 20B, 20C (described below), which are identified as end presses 12A, 12B, 12C, and one tab lane 20D (described below), which is identified as a tab press 12D. The press units 12 are modular. As used herein, "modular" means devices having substantially the same general size and shape so that one "modular" device may be replaced with another "modular" device. The press units 12 include coupling assemblies 14 structured to fix the press units 12 together. In an exemplary embodiment, the coupling assemblies 14 include linking pins 15 structured to couple one or two press units 12 to a housing assembly 30. The feeder device 21, in an exemplary embodiment, is modular as well. That is, each unit 12 includes a feeder device 21, or, for the tab press 12D, discussed below, a tab feeder assembly 23.

Figure 8:
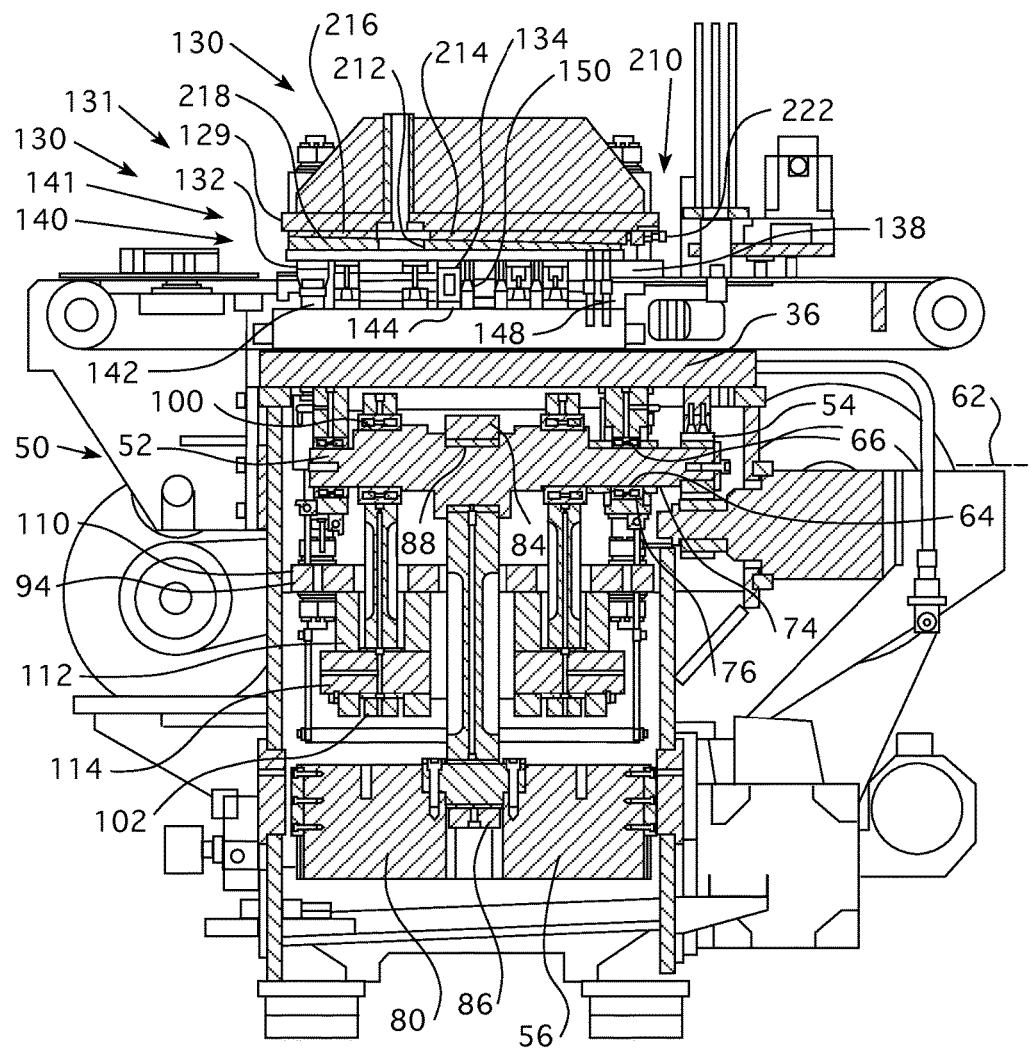
FIG. 8 is a first cross-sectional side view of an end press unit.
Figure 9:
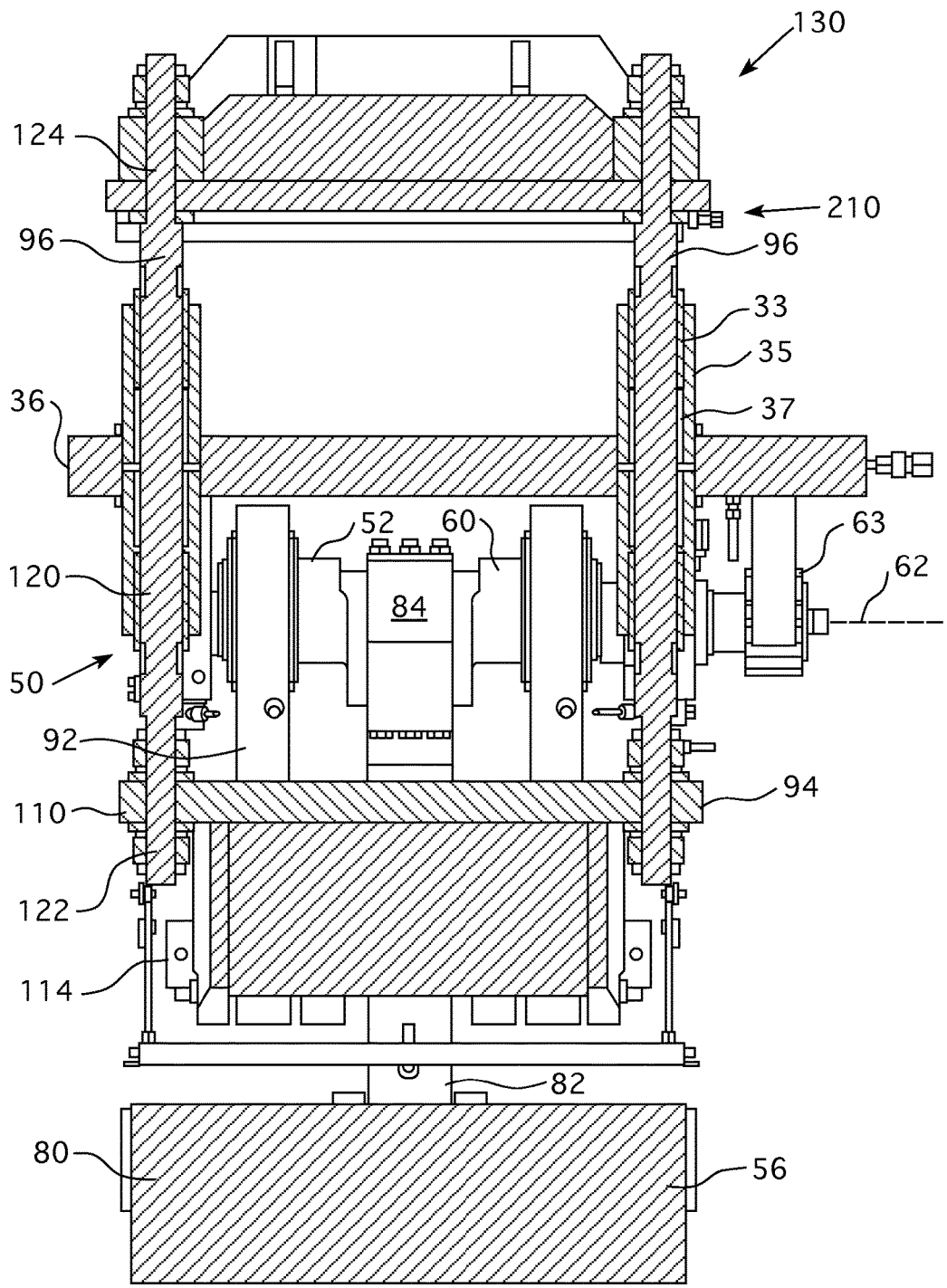
FIG. 9 is a second cross-sectional side view of an end press unit with selected tooling components removed for clarity.
Figure 10:
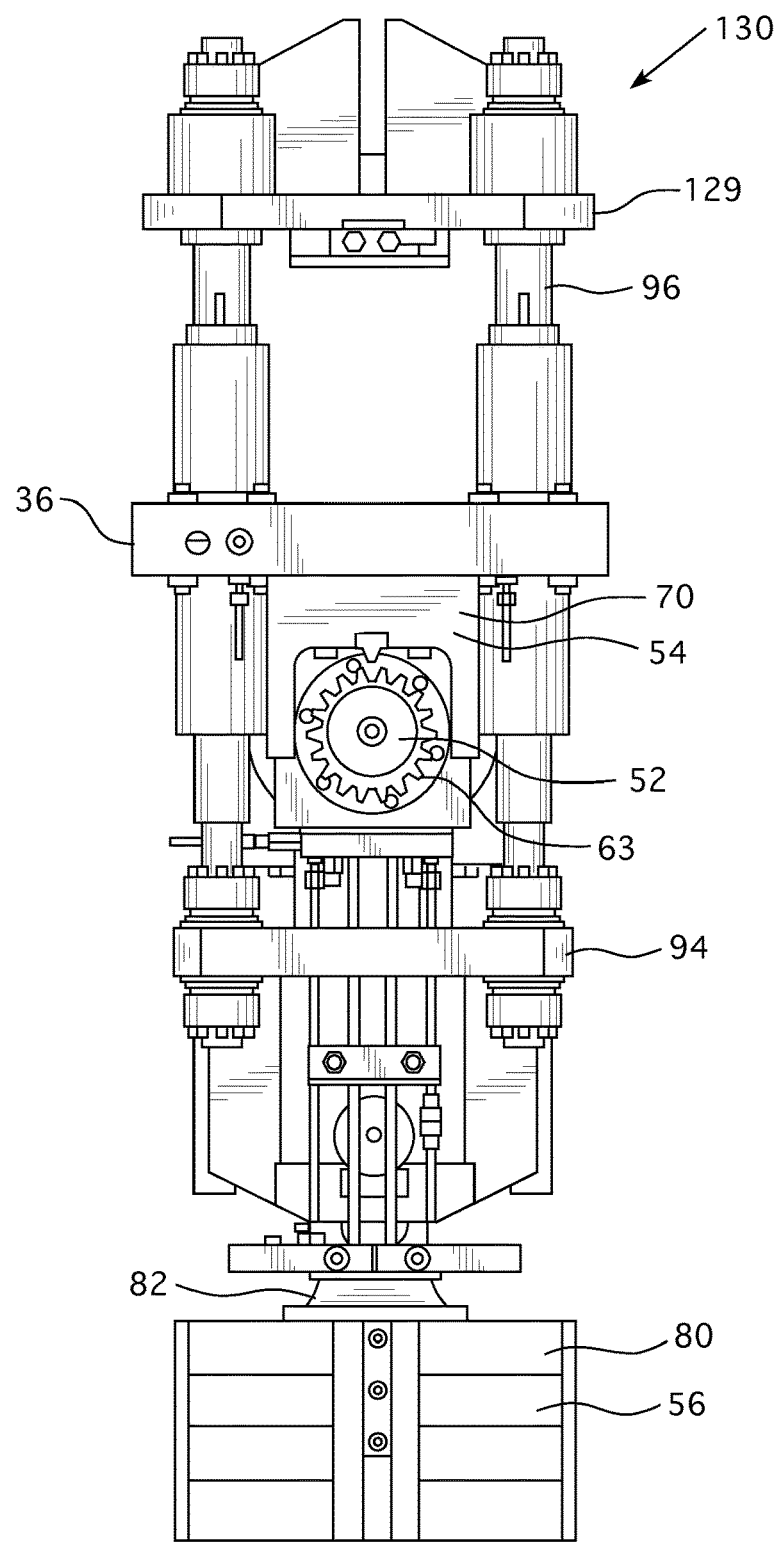
FIG. 10 is a partial end view of an end press unit with selected tooling components removed for clarity.
Figure 11:
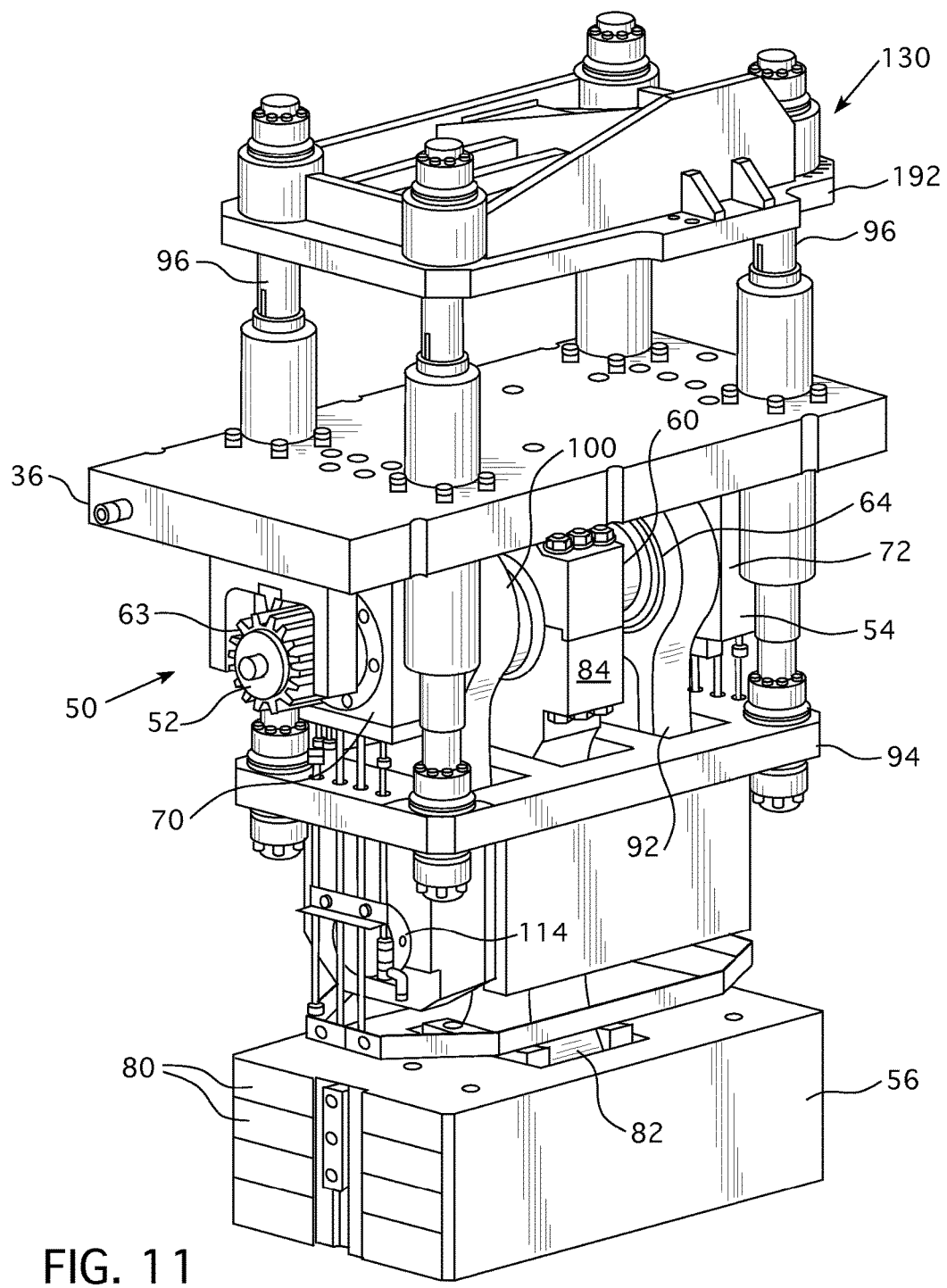
FIG. 11 is a partial isometric view of an tab press unit with selected tooling components removed for clarity.
Figure 12:
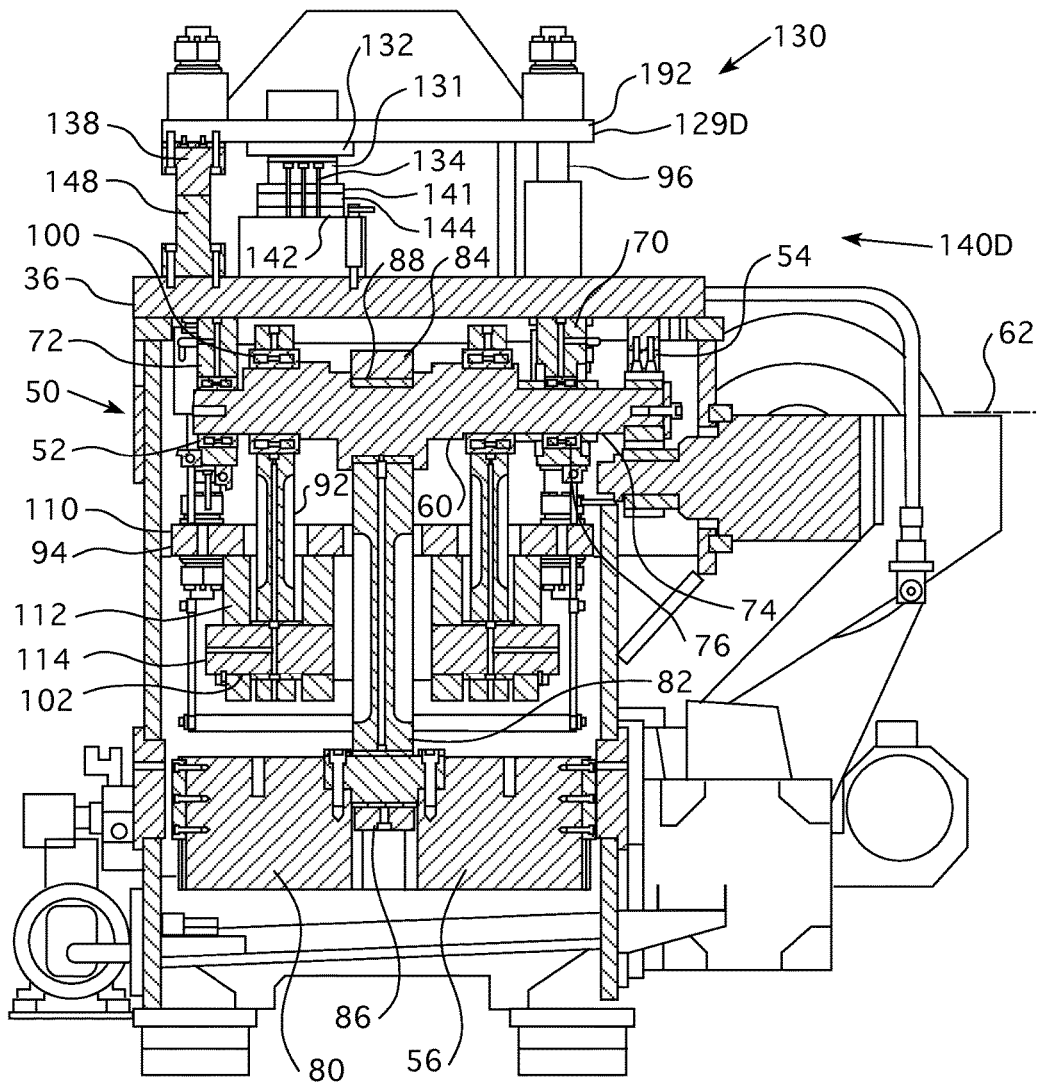
FIG. 12 is a first cross-sectional side view of a tab press unit.
Figure 13:
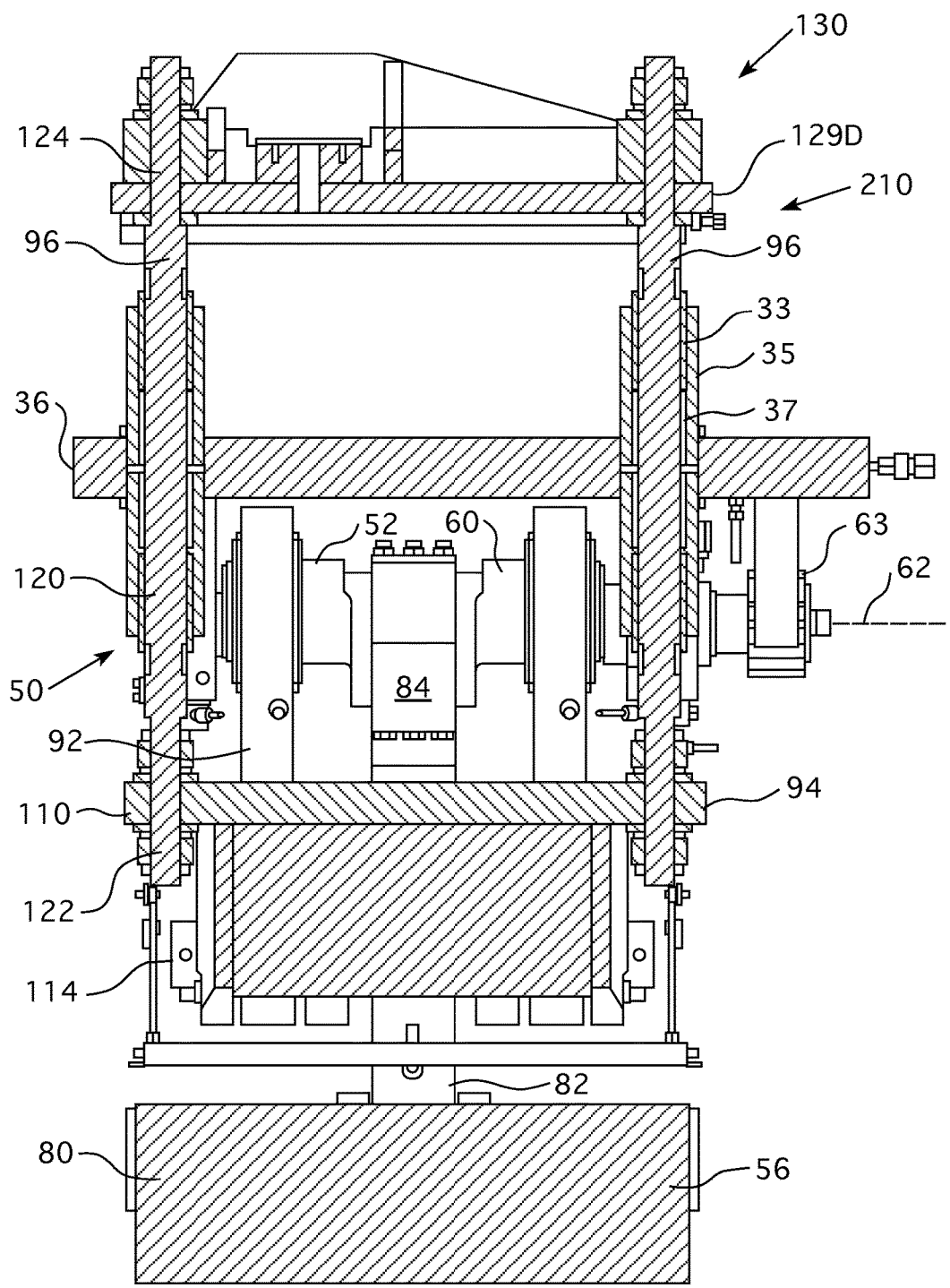
FIG. 13 is a second cross-sectional side view of a tab press unit with selected tooling components removed for clarity.
Figure 14:
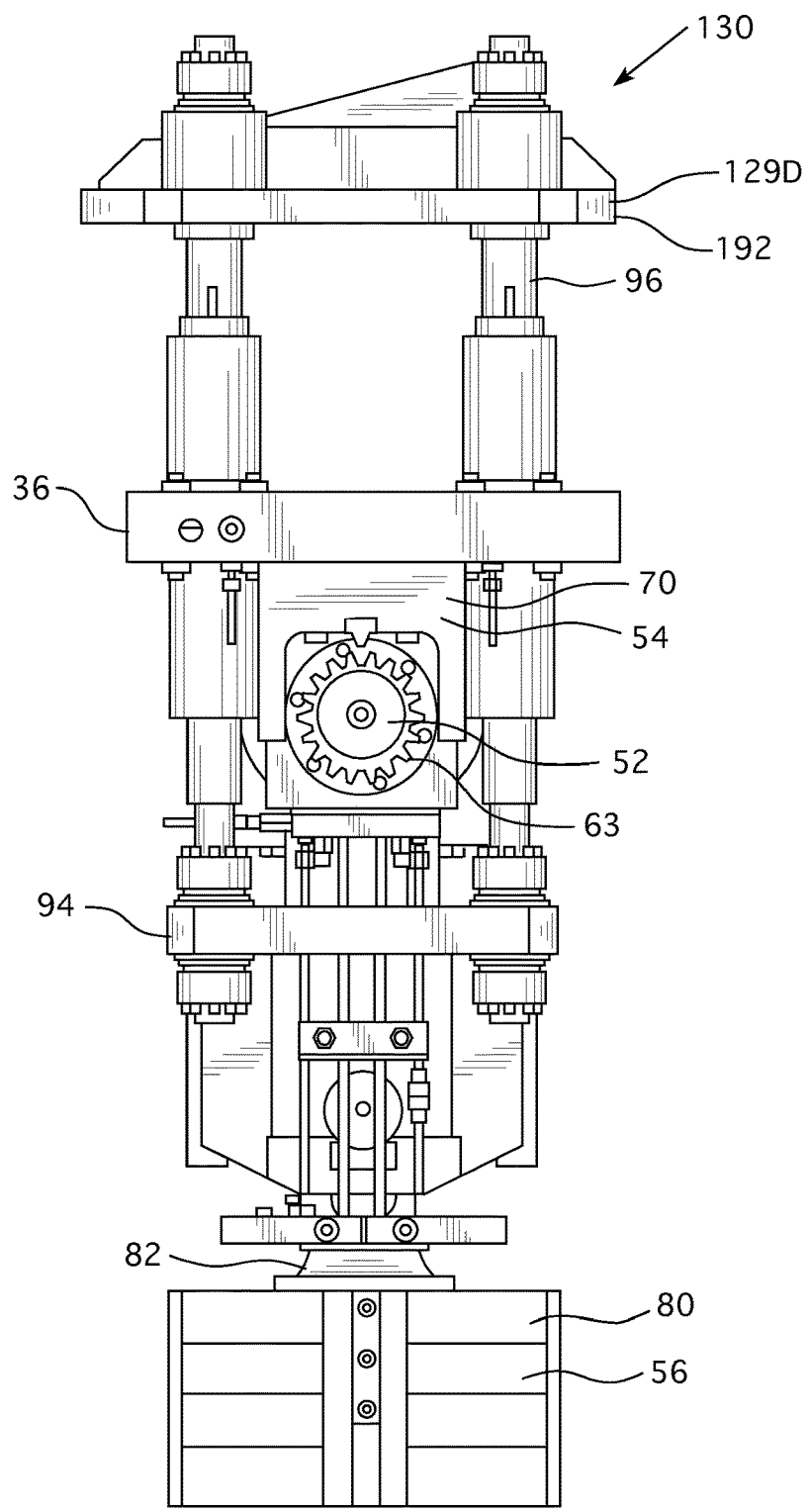
FIG. 14 is a partial end view of a tab press unit with selected tooling components removed for clarity.

The end press units 12A, 12B, 12C are substantially similar and, as such, only one press unit is described below. It is understood that each press unit 12 includes substantially similar elements. Further, with the exception of the direction of the tab lane 20D and the linkage assembly, the tab press 12D is also similar to the end press units 12A, 12B, 12C and, unless otherwise noted, includes similar elements. For reference purposes, if elements of two press units 12 need to be described, the elements of the separate press units will be identified with a letter. Further, the elements of each press unit 12 are "associated." That is, as used herein, "associated" means that the elements are part of the same press unit 12 and operate together, or, act upon/with each other in some manner. Elements external to a press unit 12 may be associated with multiple press units 12. For example, as discussed below, a multiple press drive assembly 160 is associated with a plurality of press units 12. Thus, for example, a crankshaft 52A and linkage assembly 90A, discussed below, of a first press unit 12A are "associated" and operate with each other, but are separate from the elements of a second press unit 12B. Each press unit 12 includes a number of elongated sets of lanes 20 (or lane set 20, or lane 20), a crankshaft 52 (FIGS. 6-13), a linkage assembly 90 (FIGS. 6-13), a first tooling assembly 130, and a second tooling assembly 140 (FIGS. 8 and 12, shown schematically). The lane set 20 may further be identified as an end lane 20A, 20B, or 20C, or, as a tab lane 20D. In one exemplary embodiment, not shown, each press unit 12 further includes a separate housing assembly (not shown). In an exemplary embodiment, the press units 12A, 12B, 12C, 12D are disposed in a common housing assembly 30. In an exemplary embodiment, discussed in detail below, a multiple press drive assembly 160 is associated with a plurality of press units 12.

As used herein, a "lane" is a path over which a can end shell 1' or tab 2 passes and which are generally defined by the first tooling assembly 130, and more specifically by the first lane die 131, which is disposed above the "lane," and the second tooling assembly 140, and more specifically by the second lane die 141, which is disposed below the "lane." That is, each lane set 20 includes the first and second tooling assemblies 130, 140 and other subcomponents and elements which define the path over which a shell 1' or tab 2 travel during forming operations. These elements are discussed in detail below. A "set of lanes" means that there are a number of lanes 20 defined by the same first and second tooling assemblies 130, 140. That is, in an exemplary embodiment (not shown), a single pair of first and second tooling assemblies 130, 140 include a plurality of lane dies 131, 141 and define a plurality lanes 20. In another exemplary embodiment, and the embodiment discussed hereinafter, each press unit 12 includes a single lane 20. As a lane 20 is elongated, each lane 20A, 20B, 20C, 20D (as shown) has an longitudinal axis 22A, 22B, 22C, 22D. As discussed below, the end lane longitudinal axes 22A, 22B, 22C are generally parallel with each other. The tab lane longitudinal axis 22D extends generally perpendicular to the end lane longitudinal axes 22A, 22B, 22C.

There is a feeder device 21 (FIG. 2) associated with each end lane 20A, 20B, 20C. Each feeder device 21 is structured to progressively advance, or "index," a number of work pieces, i.e., can end shells 1'. That is, as used herein, "progressively advance" or "index" means that the feeder device 21 moves a work piece forward a predetermined distance during each cycle of the press system 10, as described below, As further described below, the press system 10 includes a number of tool stations 150. In an exemplary embodiment, the feeder device 21 advances each work piece ahead by one tool station 150 during each cycle.

Further, the tab lane 20D, in an exemplary embodiment, includes a tab feeder assembly 23. The tab feeder assembly 23 includes a push tab feeder 24 and a pull tab feeder 26. The push tab feeder 24 is disposed "upstream" of the tab lane 20D, i.e. at a location before the tab feed stock enters the tab lane 20D, The pull tab feeder 26 is disposed "downstream" of the tab lane 20D, i.e. at a location after the tab feed stock leaves the tab lane 20D, Both the push tab feeder 24 and the pull tab feeder 26 are structured to advance the tab feed stock through the tab lane 20D. Further, each of the push tab feeder 24 and the pull tab feeder 26 include a servo-motor (not shown) that drive a cam indexing gearbox (not shown). The servo-motor, along with the cam indexing gearbox are structured to advance the tab feed stock, and tabs after formation thereof, in a synchronized manner. That is, the tab feed stock indexes forward along the tab lane 20D at a rate substantially similar to the rate of the shells 1' advancing through the end lanes 20A, 20B, 20C. Further, in an exemplary embodiment, a scrap chopper assembly 28 is disposed adjacent, or coupled to, the pull tab feeder 26. The scrap chopper assembly 28 is structured to chop, or otherwise shred, the remaining tab feed stock that exits the tab lane 20D. It is understood that the feeder devices 21 and tab feeder assembly 23 generally operate during the time the first tooling assembly 130 is moving from the second position to the first position, as described below.

In an exemplary embodiment, the housing assembly 30 includes a number of sidewalls 32, a number of floor mountings 34, and a number of fixed mounting plates 36. In an exemplary embodiment, the housing assembly 30 has a generally rectangular cross-section with four sidewalls 32. The sidewalls 32 may include a number of openings 38 (behind cover plates shown) that provide access to the enclosed space defined by the housing assembly 30. The floor mountings 34 are disposed at each corner of the housing assembly 30 below the sidewalls 32; the sidewalls are coupled, directly coupled, or fixed to the thereto. Each fixed mounting plate 36 is, in an exemplary embodiment, a planar member disposed in a generally horizontal plane. Each fixed mounting plate 36 is coupled, directly coupled, or fixed to the upper ends of the housing assembly sidewalls 32. It is noted that each mounting plate 36 is also considered to be part of the individual press units 12A, 12B, 12C, 12D. That is, when a press unit 12 is removed or replaced, the mounting plate 36 remains with the press unit 12. Further, each second tooling assembly 140 is, in an exemplary embodiment, coupled, directly coupled or fixed to the associated mounting plate 36. In another embodiment, not shown, the housing assembly 30 includes a number of frame members that form a frame assembly to support the various operatively coupled elements and second tooling assembly 140.

Drive assembly includes a motor having an output shaft. The motor provides a rotational motion to the output shaft. In one embodiment, not shown, output shaft is directly coupled to crankshaft 52, discussed below. In another exemplary embodiment, also not shown, drive assembly further includes a tension member 168, such as but not limited to, a belt 169, timing belt or chain (neither shown). In an exemplary embodiment, not shown, drive assembly further includes a drive wheel selectively fixed to output shaft. That is, drive wheel is fixed to output shaft by a shear pin. Shear pin is structured to shear at a predetermined level of force or rotational torque. As discussed below, anti-rotational forces may be applied to crankshaft 52, during such an occurrence, and provided that the force exceeds the predetermined level of force, or rotational torque, of the shear pin shear pin will shear and break the operative coupling between output shaft and crankshaft 52. The tension member extends between output shaft and, more specifically, drive wheel, and crankshaft, to transfer rotational motion from output shaft to crankshaft 52. That is, drive assembly is "operatively coupled" to the crankshaft 52. As used herein, "operatively coupled" means that motion in one element is transferred to another element. It is noted that location of motor relative to the housing assembly 30 is selectable; for example, when multiple press units are disposed adjacent to each other and each has its own motor (not shown), each motor may, for example, be disposed in line with the lane 20.

Figure 2:
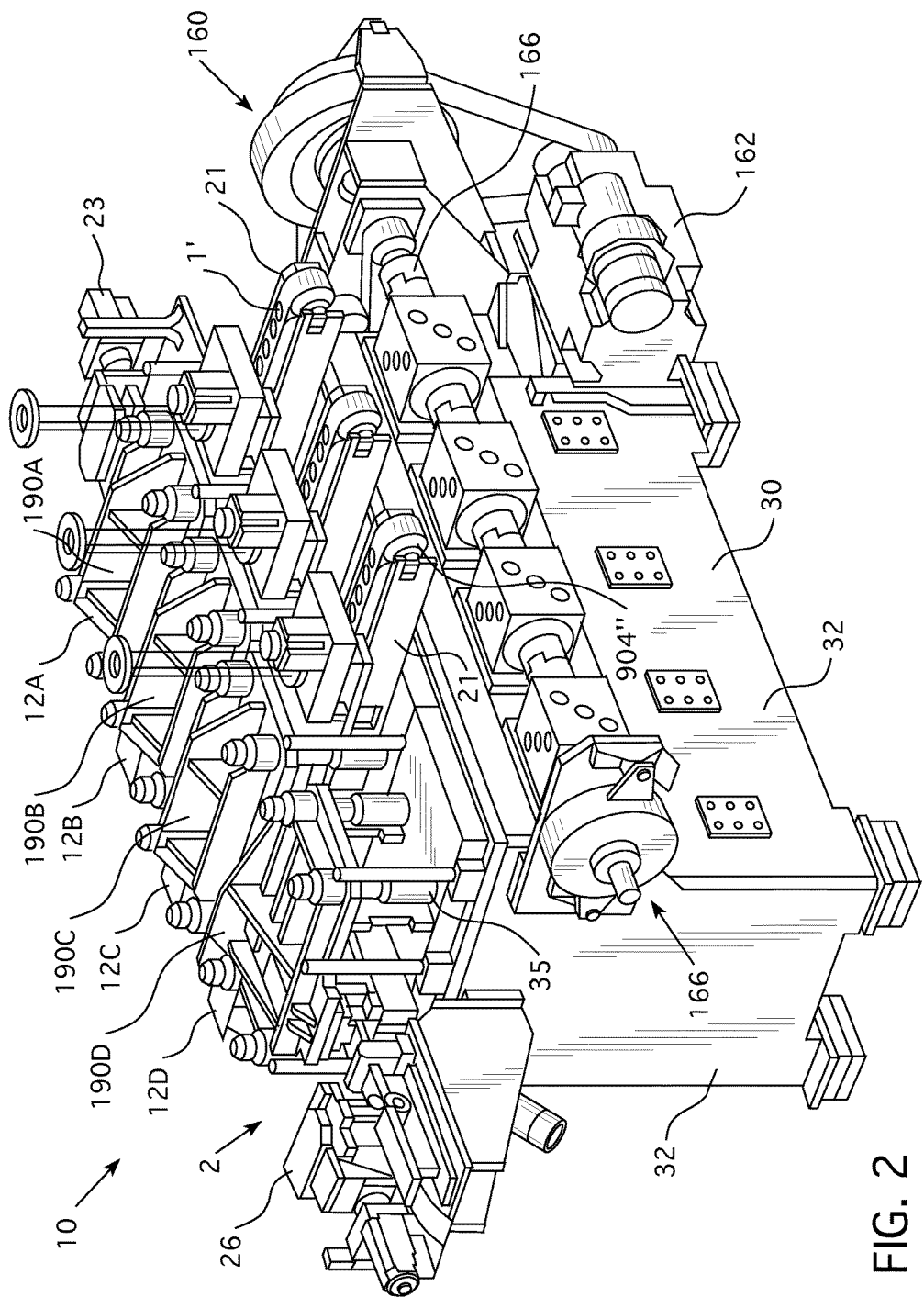
FIG. 2 is another isometric view of a can end conversion system.

In the exemplary embodiment shown, a multiple press drive assembly 160, shown in FIGS. 1-2, is associated with a plurality of press units 12A, 12B, 12C, 12D. That is, the multiple press drive assembly 160 includes a motor 162 with an output shaft 164, a clutch/brake assembly 300 with an output shaft 302, as well as a direct drive linkage assembly 166. The direct drive linkage assembly 166 is operatively coupled to the motor 162 via the clutch/brake assembly 300, described below. That is, the rotational motion of the motor output shaft 164 is transferred to the direct drive linkage assembly 166 and, more specifically, to the linkage shafts 170.

The direct drive linkage assembly 166 includes a number of linkage shafts 170 and gearboxes 172. There is one right angle miter gearbox 172' for each press units 12A, 12B, 12C, 12D. Each gearbox 172 includes two of the linkage shafts 170 extending from opposite sides. Each linkage shaft 170, as well as clutch assembly output shaft 302, includes a selectable coupling 174. Each selectable coupling 174 is structured to be selectably (i.e. removably) coupled to another selectable coupling 174 in a fixed relationship. As shown, the selectable couplings 174 are coupled to each other thereby coupling the linkage shafts 170 to the linkage shaft 170 of an adjacent gearbox 172, or to the clutch assembly output shaft 302. In this configuration, the linkage shafts 170 are coupled to each other and to the output shaft 164 in a fixed relationship. That is, the linkage shafts 170 and the clutch assembly output shaft 302 rotate together.

Figure 4:
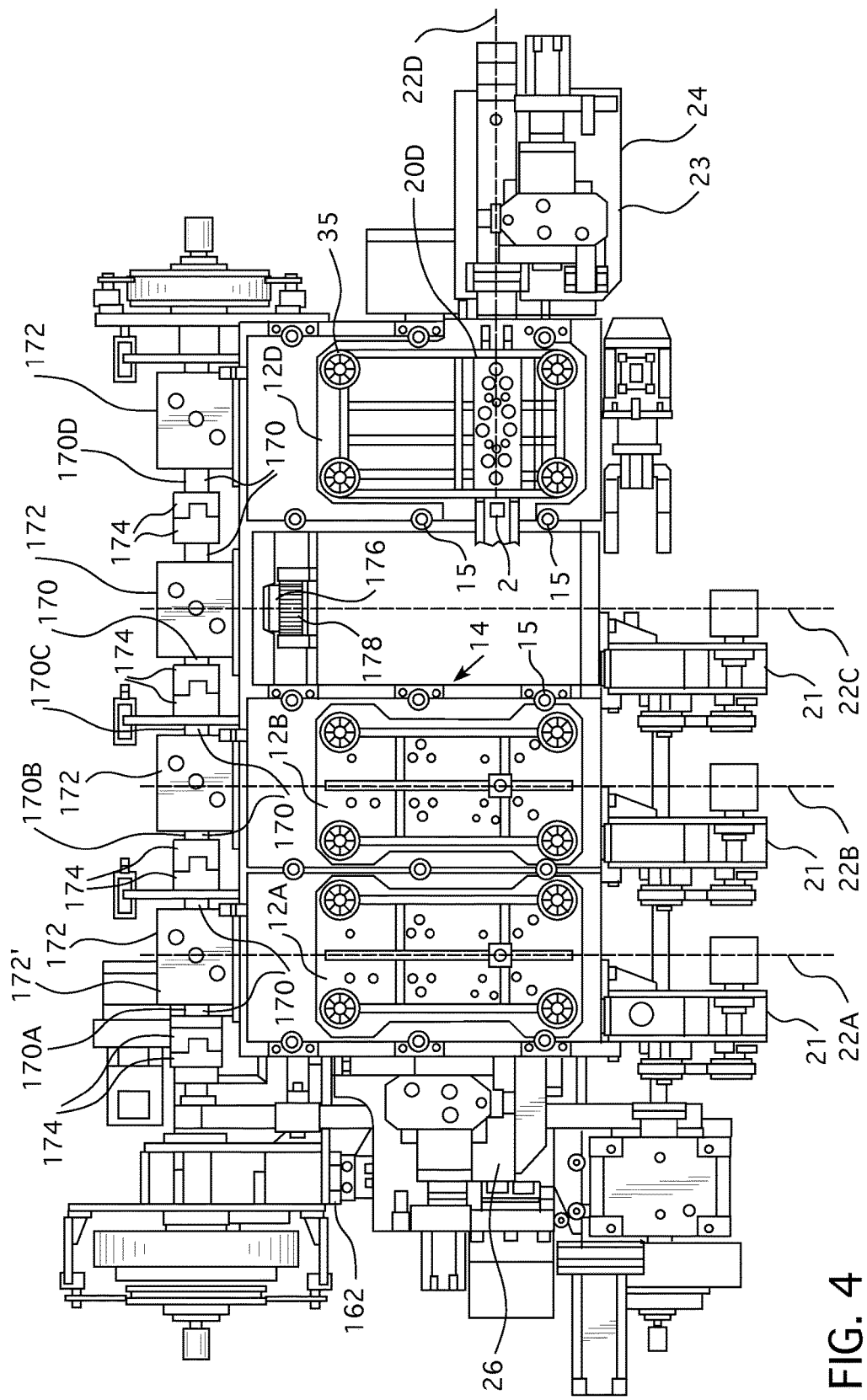
FIG. 4 is a top view of a can end conversion system with one press unit removed for clarity.
Figure 5:
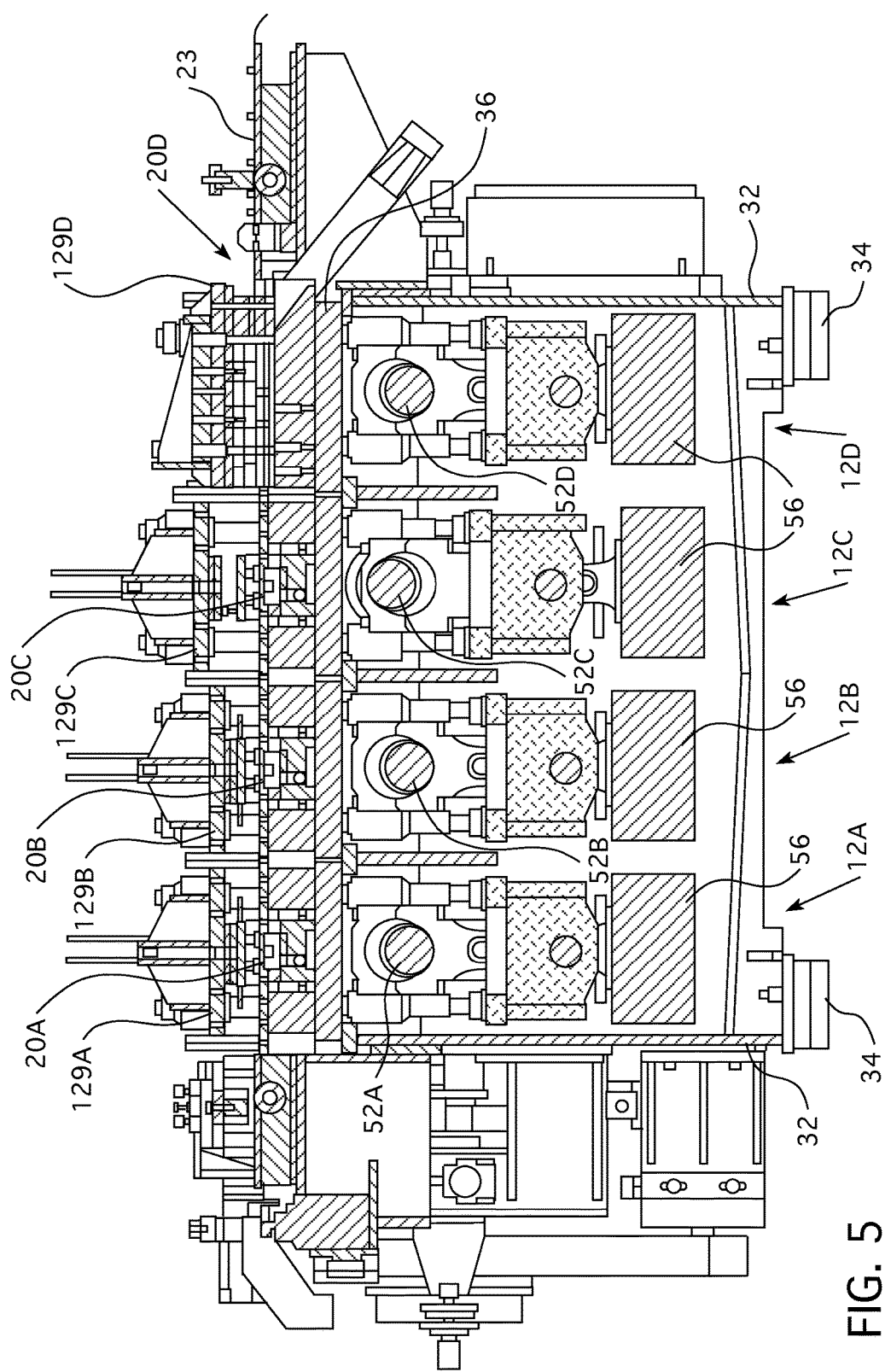
FIG. 5 is a cross-sectional view of a can end conversion system.
Figure 6:
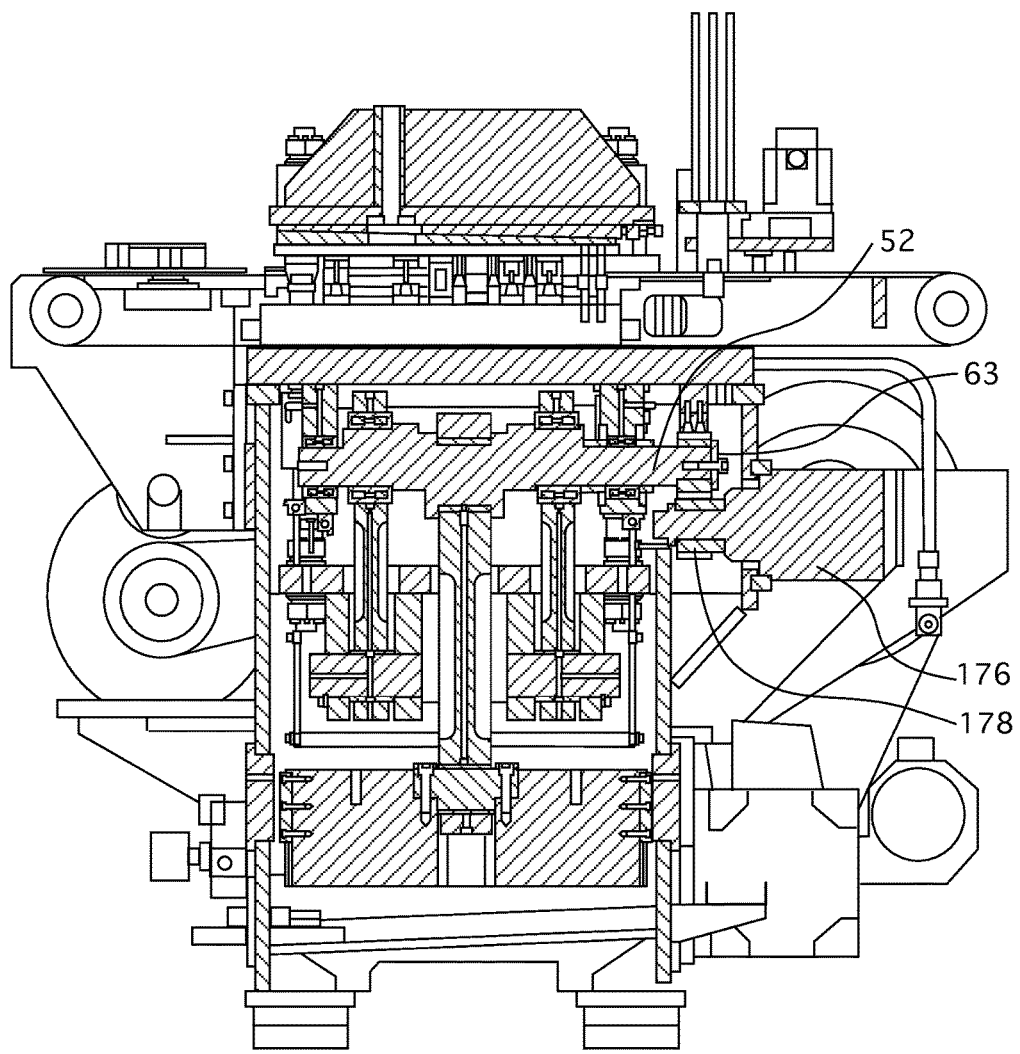
FIG. 6 is a lateral cross-sectional view of a can end conversion system.
Figure 7:
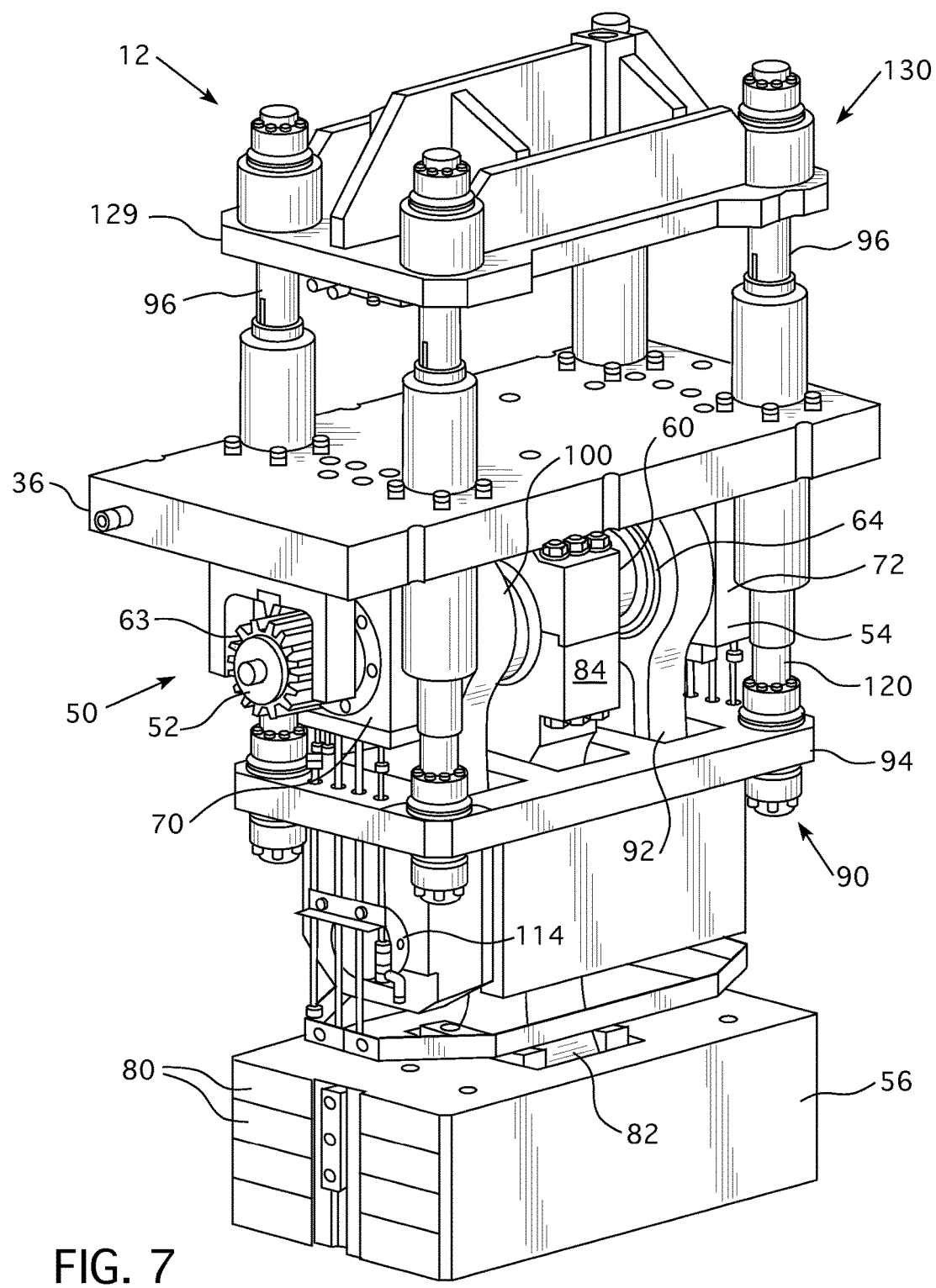
FIG. 7 is a partial isometric view of an end press unit with selected tooling components removed for clarity.

Each gearbox 172 further includes a press shaft 176 and a pinion gear 178, as shown in FIG. 4. Each press shaft 176 extends generally horizontally and about ninety degrees to the axis of rotation of the linkage shafts 170. Within each gearbox 172 is a conversion linkage (not shown) that converts the rotational motion of the linkage shafts 170 to a rotational motion in each press shaft 176. That is, in an exemplary embodiment, within each gearbox 172 there are a number of miter gears 610, described below, structured to convert the rotational motion of a linkage shafts 170 about one axis of rotation into rotation of the press shaft 176 about a different, and in an exemplary embodiment perpendicular, axis or rotation. Each gearbox pinion gear 178 is coupled, directly coupled or fixed to an associated press shaft 176. As shown in FIG. 6, each gearbox pinion gear 178 operatively engages a crankshaft pinion gear 63, as discussed below. In this configuration, each press unit 12 is easily separated from the direct drive linkage assembly 166. That is, removal of the press unit 12 from the housing assembly also separates the gearbox pinion gear 178 and crankshaft pinion gear 63.

As noted above the press units 12A, 12B, 12C, 12D are generally similar. An end press unit 12A is shown in FIGS. 6-9 and a tab press unit 12D is shown in FIGS. 10-13. Like reference numbers identify similar elements. Each crankshaft assembly 50 includes crankshaft 52, a crankshaft mounting assembly 54 and a counterweight assembly 56. Each crankshaft 52 includes an elongated, generally cylindrical body 60, having an axis of rotation 62 (also identified herein as the crankshaft longitudinal axis 62), a pinion gear 63 at one end, and a number of offset bearings 64. The crankshaft pinion gear 63 is sized to correspond to, i.e. is structured to be operatively coupled to, and is operatively coupled to, a gearbox pinion gear 178. Thus, the rotational motion of the motor 162 is transferred to each crankshaft 52.

The offset bearings 64 include a substantially cylindrical surface 66. Thus, the offset bearings 64 each have a center axis. The center axis of the offset bearings 64 is offset from the crankshaft body axis of rotation 62. Further, the offset bearings 64 are offset in substantially the same radial direction. That is, in an exemplary embodiment, the center axis of the offset bearings 64 are substantially aligned (i.e., disposed on the same line). The crankshaft mounting assembly 54 includes two spaced mounting blocks 70, 72. Each crankshaft mounting block 70, 72 defines a substantially circular opening 74. In an exemplary embodiment, a bearing 76 is disposed in each crankshaft mounting block opening 74. Further, in an exemplary embodiment, the crankshaft mounting blocks 70, 72 are coupled, directly coupled, or fixed to the lower side of fixed mounting plate 36.

The crankshaft 52 is rotatably coupled to the crankshaft mounting assembly 54. That is, in an exemplary embodiment, the ends of crankshaft body 60 are disposed in, and are rotatably coupled to crankshaft mounting blocks 70, 72. In the end press units 12A, 12B, 12C, the crankshaft 52 is oriented so that the crankshaft longitudinal axis 62 is substantially parallel with the associated end lane longitudinal axis 22. As noted above, each crankshaft 52, and in an exemplary embodiment each crankshaft pinion gear 63, is operatively coupled to a gearbox pinion gear 178. Further, each press shaft 176 is substantially aligned with, i.e. parallel to, a crankshaft body axis of rotation 62. Thus, the rotational motion of the motor 162 is transferred to each crankshaft 52.

As noted above, the tab press unit 12D includes similar elements to the end press units 12A, 12B, 12C. Further, the tab press unit crankshaft 52D has a longitudinal axis 62D that is substantially parallel to the press units' crankshaft axes of rotation 62A, 62B, 62C. The tab press unit crankshaft longitudinal axis 62D, however, extends generally perpendicular to the tab press lane tab lane longitudinal axis 22D. Further, the tab press unit kiss blocks 138D, 148D, discussed below, are not subjected to loading during forming operations.

Crankshaft counterweight assembly 56 includes a weight 80 and a support member 82. Crankshaft counterweight assembly support member 82 has an upper end 84 and a lower end 86. Support member upper end 84 defines a rotational coupling which, in an exemplary embodiment, is a substantially circular opening. A bearing 88 may be disposed in the opening in support member upper end 84. A medial portion of crankshaft body 60, i.e., not offset bearings 64, is rotatably disposed in support member upper end 84. Support member lower end 86 is coupled, directly coupled, or fixed to weight 80. Weight 80 is disposed above lower sidewall 32 of the housing assembly 30. That is, the weight 80 is suspended by the crankshaft 52 and, as such, the weight 80 biases the crankshaft 52 downwardly. In this configuration, crankshaft 52 is structured to rotate about the crankshaft body axis of rotation 62 with the offset bearings 64 moving in a circular path about the crankshaft body axis of rotation 62.

Linkage assembly 90 provides the mechanical link between the crankshaft 52 and the first tooling assembly 130. Linkage assembly 90 is rotatably coupled to the crankshaft 52 and, more specifically, to offset bearings 64, and converts the rotational motion of the offset bearings 64 to a reciprocating vertical motion of the first tooling assembly 130. Linkage assembly 90 includes a number of drive rods 92, a mounting platform 94, and a number of guide pins 96. In an exemplary embodiment, there is one drive rod 92 for each offset bearing 64 (two as shown). Each drive rod 92 has a first end 100 and a second end 102. Each drive rod end 100,102 defines a substantially circular opening. Bearings 64 may be disposed in the openings in the drive rod ends 100,102. Each drive rod first end 100 is rotatably coupled to an offset bearing 64. The drive rod second ends 102 are discussed below.

Linkage assembly mounting platform 94 includes a planar member 110 and a number of mounting blocks 112. In an exemplary embodiment, linkage assembly mounting platform planar member 110 is a rectangular planar member 110. As shown, there is one linkage assembly mounting block 112 per drive rod 92. Each linkage assembly mounting block 112 is coupled, directly coupled, or fixed to one planar side (the lower side as shown) of linkage assembly mounting platform planar member 110. Each linkage assembly mounting block 112 includes an axle 114. Each linkage assembly axle 114 is rotatably coupled to a drive rod second end 102. That is, each axle 114 extends through a drive rod second end 102. Linkage assembly mounting platform 94 may include additional members to add weight. That is, linkage assembly mounting platform 94 also acts as a counter balance.

In the configuration described so far, rotation of the crankshaft 52 about the crankshaft body axis of rotation 62 causes the offset bearings 64 to move in a circular path about the crankshaft body axis of rotation 62. This motion imparts a generally vertical motion to the drive rods 92. It is understood that each drive rod first end follows the circular path about the crankshaft body axis of rotation 62 of the offset bearing 64 to which it is attached, but the overall motion of the drive rods 92 is generally a reciprocating vertical motion. Accordingly, linkage assembly mounting platform 94 reciprocates between an upper position and a lower position.

Guide pins 96 each have an elongated body 120 with a first end 122 and a second end 124. In an exemplary embodiment, there are four guide pins 96. Each guide pin 96 and, more specifically, each guide pin first end 122, is coupled, directly coupled, or fixed to the upper side of linkage assembly mounting platform planar member 110. In an exemplary embodiment, the guide pins 96 are disposed in a rectangular pattern. The guide pins 96 extend substantially vertically. As shown, guide pins 96 pass through fixed mounting plate 36. As such, fixed mounting plate 36, in an exemplary embodiment, includes a guide pin passage 37 for each guide pin 96. Further, each guide pin passage 37 may include a guide sleeve 35 and a guide sleeve bearing 33. In this configuration, guide pins 96 reciprocate with mounting platform 94.

The first and second tooling assemblies 130, 140 operate together to form the can end 1 and couple a tab 2 thereto. The first tooling assembly 130 includes a generally planar support member 129, an elongated first lane die 131 and a first die shoe 132. The first tooling assembly support member 129 is oriented generally horizontally and generally parallel to the associated mounting plate 36. The first lane die 131 includes a number of first tooling components 134. The second tooling assembly 140 includes an elongated second lane die 141 and a second die shoe 142. The second lane die 141 includes a number of second tooling components 144. The first and second lane dies 131, 141 are disposed opposite each other and facing each other. That is, the first lane die shoe 132 is coupled, directly coupled, or fixed to the inner (lower) face of the first tooling assembly support member 129. The first lane die 131 is coupled, directly coupled, or fixed to the first lane die shoe 132. Similarly, the second lane die shoe 142 is coupled, directly coupled, or fixed to the inner (upper) face of the mounting plate 36. The second lane die 141 is coupled, directly coupled, or fixed to the second lane die shoe 142. As used herein, the "inner" face of the tooling assembly support member 129 and the mounting plate 36 are the sides that face each other.

As noted above, the first and second lane dies 131, 141 define a lane 20. The first and second tooling assemblies, in another exemplary embodiment, further include a die holder (not shown) and a die bed (not shown). The die bed is, in an exemplary embodiment, a planar member, and, the die holder is a mounting for the lane die 131, 141. The die shoe 132, 142 is disposed between the die bed and lane die 131, 141. In another exemplary embodiment, the first and second tooling assemblies do not include a die shoe 132, 142. This is possible because the die shoe 132, 142 is structured to spread the impact from forming operations over the die bed, thereby reducing wear. As discussed above, the conversion system 10 operates with reduced loads thereby ameliorating the need for a die shoe 132, 142.

It is further noted, that due in part to the reduced loads associated with the press units 12, the first tooling assembly 130 does not include elements typically required for the tooling assemblies of a ram press 200. For example, a ram press 200 tooling assembly utilizes a die set (or die shoe) with ram press guide pins. Such ram press guide pins, typically, have a diameter of about ten inches and add considerable weight to the first tooling assembly 130. The weight of the ram press guide pins adds increased loads and tipping moments to a ram press. Further, the drive for a ram press must provide additional power in order to move the ram press guide pins. Such ram press guide pins are not part of the present first tooling assembly 130. As such, the present first tooling assembly 130 is lighter than the ram press first tooling assembly. This in turn allows other elements of the conversion system 10 to be less robust and therefore lighter as well.

As discussed below, the end press units 12A, 12B, 12C are subjected to loads and tipping moments that are generally symmetrical about the associated crankshaft body axis of rotation 62. The end lane support member 129A, 129B, 129C each include a support structure 190A, 190B, 190C including a number of planar members 192. The planar members are coupled, directly coupled or fixed to the outer face of the tooling assembly support member 129. The planes of the planar members 192 extend generally perpendicular to the plane of the end lane support members 129A, 129B, 129C. Because the load and tipping moments in the end press units 12A, 12B, 12C are disposed in a generally symmetrical pattern about the associated crankshaft body axis of rotation 62, the end press unit support structures 190A, 190B, 190C are also generally symmetrical about the associated crankshaft body axis of rotation 62. That is, as shown, the support structures 190A, 190B, 190C include three planar members 192 disposed with planes generally parallel to the associated crankshaft body axis of rotation 62 and two planar members 192 disposed with planes generally perpendicular to the associated crankshaft body axis of rotation 62.

As discussed below, the tab lane 20D is disposed generally perpendicular to the associated crankshaft body axis of rotation 62. As such, the tab press unit support structure 190D is asymmetrical. That is, the tab press unit support structure 190D also includes a number of planar members 192 with planes that extend generally perpendicular to the plane of the tab lane support member 129D. The tab press unit support structure 190D, however, is disposed in a non-symmetrical pattern.

The tooling components 134, 144 are cooperative. Cooperative tooling components 134, 144, as used herein, mean that the two tooling components 134, 144 operate together to form a work piece. For example, a punch and a die are two cooperative tooling components. Thus, for each first tooling components 134 there is a cooperative second tooling component 144. As such, the tooling components 134, 144 may be identified collectively as a "pair of cooperative tooling components" or a "tool station 150." It will be appreciated that the conversion system 10 may have any known or suitable number and/or configuration of tool stations 150 structured to perform any variety of desired operations such as, for example and without limitation, rivet forming, panel forming, scoring, embossing and/or final staking. Additional non-limiting examples of tool stations (not shown), which could be employed are described, for example, in U.S. Pat. No. 7,270,246.

The first tooling components 134 are coupled, directly coupled, or fixed to the first die shoe 132. The first tooling components 134 are disposed in series, i.e., generally along a linear path. The second tooling components 144 are coupled, directly coupled, or fixed to the second die shoe 142. The second tooling components 144 are disposed in series, i.e., generally along a linear path. The first die shoe 132 is disposed above the second die shoe 142 and structured to move vertically. It is understood that the tooling components 134, 144 of a cooperative pair are disposed opposite each other. Thus, the first tooling assembly 130 moves between a first position, wherein the first tooling assembly 130 is spaced from the second tooling assembly 140, and a second position, wherein the first tooling assembly 130 is adjacent the second tooling assembly 140. In the second position, the first tooling assembly 130 is sufficiently close to the second tooling assembly 140 so that, during the downstroke (i.e., moving from the first position to the second position) the pair of cooperative tooling components 134, 144 engage the can end shell 1', or tab 2, and perform a forming operation thereon. It is understood that forming operations may be said to occur when the first tooling assembly 130 is in the second position but actually the forming operations occur just as the first tooling assembly 130 moves into the second position. Further, as noted above, the paths over which the pairs of cooperative tooling components 134, 144 are disposed define a lane 20. Thus, the cooperative tooling components 134, 144 are disposed in series within a lane 20. Further, in an exemplary embodiment, the first tooling assembly 130 and, more specifically, the first die shoe 132, has a generally rectangular cross-section in a horizontal plane.

The guide pins 96 extend between linkage assembly mounting platform planar member 110 and the first die shoe 132. Thus, each guide pin 96 is coupled, directly coupled, or fixed to the mounting platform 94 and to the first tooling assembly 130. The second die shoe 142 is coupled, directly coupled, or fixed to the upper side of the fixed mounting plate 36. In this configuration, second tooling assembly 140 is substantially stationary relative to crankshaft 52 and first tooling assembly 130 moves substantially vertically relative to crankshaft 52. That is, as described above, the motion of the drive rods 92 imparts a reciprocal, vertical motion to the mounting platform 94. The motion of mounting platform 94 imparts a vertical motion to the first tooling assembly 130 via the guide pins 96. Stated alternately, in this configuration, the first tooling assembly 130 is movably coupled to the housing assembly 30 and the second tooling assembly 140 is coupled to the housing assembly 30. Each time the first tooling assembly 130 reciprocates, the press unit 12 completes one cycle.

Further, in this configuration, the multiple press drive assembly 160 and the direct drive linkage assembly 166 are operatively coupled to each other. Further, drive linkage assembly 166 is operatively coupled to each press units' crankshaft 52. Within each press unit 12A, 12B, 12C, 12D the following elements are all operatively coupled to each other; the crankshaft 52, the linkage assembly 90, and the first tooling assembly 130. Thus, the motion of the multiple press drive assembly 160 is transferred to each first tooling assembly 130.

As noted above, the first tooling assembly 130 has a generally rectangular cross-section and the guide pins 96, in an exemplary embodiment, are disposed in a rectangular pattern. As noted above, the crankshaft 52 is oriented so that the crankshaft longitudinal axis 62 is substantially parallel with the associated lane longitudinal axis 22. In this configuration, the loads acting upon the first tooling assembly 130 have fewer tipping moments than a press that utilizes a single ram for multiple lanes. This configuration further reduces the deflection of the elements of the linkage assembly 90.

As noted above the four press units 12A, 12B, 12C, 12D are substantially similar with a notable exception being the direction of the tab lane 20D and the lack of loading on the tab press kiss blocks 138D, 148D (discussed below). That is, the three end lanes 20A, 20B, 20C are generally aligned with the crankshaft body axis of rotation 62 and, in an exemplary embodiment, the end lane longitudinal axes 22A, 22B, 22C are disposed above and substantially aligned with the associated crankshaft body axis of rotation 62. The tab lane longitudinal axis 22D extends generally perpendicular to the end lane longitudinal axes 22A, 22B, 22C. This also means that the tab lane longitudinal axis 22D extends generally perpendicular to the associated crankshaft body axis of rotation 62. Further, this means that the tab press first and second tooling assemblies 130, 140, as well as the first and second die lane dies 131, 141, define a tab lane 20 that extends generally perpendicular to the associated crankshaft body axis of rotation 62. To accommodate for the additional forces and tipping moments generated by the different orientation, the tab lane support member 129D is asymmetrical as described above.

As noted above, each lane die 132. 141 is a progressive die which, in an exemplary embodiment, includes eight tool stations 150. For each cycle of the press the shell 1' is moved by feeder device 21 to one tool station 150 and then the next tool station 150. The work being done in each station differs therefore the load of each station is different. In an exemplary embodiment, the first three tool stations 150 form a rivet and create nearly half of load in the lane die 131, 141. Each tool station load can range from as high as about 10,000 lbs. to as low as about 100 lbs.

In an exemplary embodiment, at least one of the end press units first and second tooling assemblies 130A, 130B, 130C, 140A, 140B, 140C further include a number of kiss blocks, shown as first and second kiss blocks 138A, 138B, 138C, 148A, 148B, 148C that are subjected to loads during forming operations, as well as a pre-load. In an exemplary embodiment, there is one kiss block 130A, 130B, 130C, 140A, 140B, 140C disposed between each die shoe 132A, 132B, 132C, 142A, 142B, 142C and each tooling component 134A, 134B, 134C, 144A, 144B, 144C. In the disclosed configuration, i.e., with a crankshaft 52 driving the tooling components 134A, 134B, 134C, 144A, 144B, 144C associated with an end lane 20A, 20B, 20C the kiss blocks 138A, 138B, 138C, 148A, 148B, 148C are deflected by about 0.002 inch. Thus, the reactive force that the kiss blocks 138A, 138B, 138C, 148A, 148B, 148C generate is substantially less than the reactive force required with a system utilizing a press ram. For the conversion system 10, as opposed to a conversion press, the first and second kiss blocks 138A, 138B, 138C, 148A, 148B, 148C are structured to be deflected between about 0.001 and 0.004 inch, or in an exemplary embodiment, about 0.002 inch during the reciprocal motion of the first tooling assembly 130A, 130B, 130C. It is again noted that the tab lane kiss blocks 138D, 148D are not subjected to the loads in the same manner as the end lane kiss blocks 138A, 138B, 138C, 148A, 148B, 148C.

Further, the relative position of the crankshafts 52A, 52B, 52C, 52D operatively coupled to a multiple press drive assembly 160 are, in an exemplary embodiment, different. That is, the orientation of the crankshafts 52A, 52B, 52C, 52D are offset from each other so that only one press unit is engaged in forming operations at a specific point in time. A conversion system 10 having such offset crankshafts 52 is, as used herein, structured to independently and sequentially load the first and second tooling assemblies 130, 140. That is, the first tooling assembly 130 of only one press unit 12 are in a second position at one time. In this configuration, the multiple press drive assembly motor 162 is a smaller motor than in a press ram 200, discussed below. Moreover, the multiple press drive assembly motor 162 for a multiple-out conversion system 10, including a 3-out conversion system 10, can be structured to provide a maximum load of between about 5 and 25 tons, or about 15 tons. That is, the load applied by each crankshaft 52 as the first tooling assembly 130 moves into the second position is between about 5 tons and 25 tons, or about 15 tons per module. Thus, in this embodiment and with a 3-out conversion system 10, the multiple press drive assembly motor 162 provides a load of about 60 tons. In another embodiment, the crankshafts 52A, 52B, 52C, 52D are substantially in the same orientation and all first tooling assemblies 130A, 130B, 130C, 130D move in substantially in synch with each other.

In an exemplary embodiment, the relative position of the crankshafts 52A, 52B, 52C, 52D are sequentially offset. For example, a crankshaft 52 is in a first position when the offset bearings 64 are at a topmost, or 12:00 (twelve o'clock) position. It is noted that the position descriptions using "o'clock" positions are broadly representative of the relative offset between crankshafts and are not limiting. The crankshafts 52A, 52B, 52C, 52D rotate from the first position to a second position when the offset bearings 64 (discussed below) are at a bottommost, or 6:00 (six o'clock) position. It is noted that these offsets are not shown in FIG. 5.

In an exemplary embodiment, when the first press unit crankshaft 52A, is in the first position (12:00 o'clock position), the second press unit crankshaft 52B is positioned just behind the first position, e.g. at 11:00 o'clock. "Behind" being relative to the direction the crankshafts 52 are moving. Stated alternately, the orientation of the second press unit crankshaft 52B is offset from the orientation of the first press unit crankshaft 52A. It is understood that "orientation" of a crankshaft 52 relates to the orientation about the crankshaft axis of rotation 62 and not the orientation of the crankshaft 52 relative to some other point, line or plane. In an exemplary embodiment, the second press unit crankshaft 52B is offset between about 1 and 44 degrees, or, between about 2 and 30 degrees, or, between about 5 and 20 degrees or about 10 degrees "behind" the first press unit crankshaft 52A. That is, the second press unit crankshaft 52B is offset in a direction behind the position of the first press unit crankshaft. The third press unit crankshaft 52C is offset in a similar manner from the second press unit crankshaft 52B, e.g. at the 10:00 o'clock position and the fourth press unit crankshaft 52D is offset in a similar manner from the third press unit crankshaft 52C, e.g. at 9:00 o'clock position. In this configuration, the second press unit crankshaft 52B moves into the first position as the first press unit crankshaft 52A moves out of the first position and toward the second position. Subsequently, the third press unit crankshaft 52C moves into the first position as the second press unit crankshaft 52B moves out of the first position toward the second position, and so forth.

Further, in an exemplary embodiment, as the fourth press unit crankshaft 52D moves past the second (6:00 o'clock) position, none of the crankshafts 52A, 52B, 52C, 52D are in, or moving toward the second position, thus the feeder device 21 may advance the can shells 1' without interference from the tooling assemblies 130, 140, described below. In another exemplary embodiment, the first press unit crankshaft 52A is moving toward the second position when the fourth press unit crankshaft 52D moves just past the second (6:00 o'clock) position.

As the crankshafts 52A, 52B, 52C, 52D rotate, the associated first tooling assemblies 130A, 130B, 130C, 130D reciprocate vertically between a first position, wherein the first tooling assembly 130 is spaced from the second tooling assembly 140, and a second position, wherein the first tooling assembly 130 is adjacent the second tooling assembly 140. Thus, when the orientation of the crankshafts 52A, 52B, 52C, 52D are offset relative to each other, each press unit's first tooling assembly 130 movement is slightly offset in time from the other press units 12. For example, in this configuration, only one press unit 12 is in the second position at one time, or, stated alternately, no two press unit first tooling assemblies 130 are in the second position at the same time.

Forming operations occur when a first tooling assembly 130 moves into the second position. Thus, reactive forces act upon the press units 12 when a first tooling assembly 130 moves into the second position. Accordingly, when the press units 12 sequentially and independently move their first tooling assembly 130 into the second position, the conversion system 10 is exposed to individual, sequential instances of loading and reactive forces. Thus, unlike a conversion press that utilizes a single ram, which must overcome the reactive forces generated by multiple lanes 20 at one time, the conversion system 10 divides the reactive forces over time. Accordingly, the multiple press drive assembly 160 is not required to generate the same force as a ram press 200, discussed below.

Accordingly, in the exemplary configuration, the multiple press drive assembly 160 as well as each press unit 12A, 12B, 12C, 12D and the elements thereof are subjected to reduced loads, tipping moments, kiss block deflections, and stresses. This in turn allows the various elements to be smaller and lighter than press units wherein a ram actuates multiple dies at the same time. That is, the majority of "operational characteristics" of the multiple press drive assembly 160 as well as each press unit 12A, 12B, 12C, 12D are reduced relative to known conversion systems. As used herein, the "operational characteristics" include the weight and physical characteristics (e.g. length, height, width, cross-sectional area, volume, etc.) of the elements, as well as, the loads, deflection, tipping moments, and stresses, applied thereto. Further, "reduced operational characteristics" means that the majority of operational characteristics are smaller, lighter, or "less than" the operational characteristics of, or experienced by, a traditional ram press 200. Because the various elements have reduced operational characteristics, the conversion system 10 itself has reduced operational characteristics.

It is noted that, in one embodiment, the reduced operational characteristics of the conversion system 10 and the various elements are significant features of the disclosed concept which solve selected problems stated above. It is, however, noted that aspects of the disclosed concept may be used in other embodiments and, as such, unless a claim recites operational characteristics, then the operational characteristics are not a significant feature of the disclosed concept.

For example, in an exemplary embodiment, the multiple press drive assembly 160 provides between about 70 tons (140,000 lbs.) and 80 tons (160,000 lbs.) of force or about 75 tons (150,000 lbs.) of force. In another exemplary embodiment, the multiple press drive assembly 160 provides between about 50 tons (100,000 lbs.) and 69 tons (138,000 lbs.) of force or about 60 tons (120,000 lbs.) of force. Thus, this operational characteristic of the multiple press drive assembly 160, i.e. the load provided, is reduced relative to a ram press 200 which, as noted above, typically provides a load of about 250,000 lbs.

Further, in this configuration, the elements of the linkage assembly 90 are subjected to lower loads and may be made from smaller components. For example, guide pins 96 have a diameter between about 1.0 to 5.0 inches, or between about 2.0 and 3.0 inches, or about 2.5 inches compared to the 10.5 inch diameter of a ram press guide pins, discussed above.

Figure 15A:
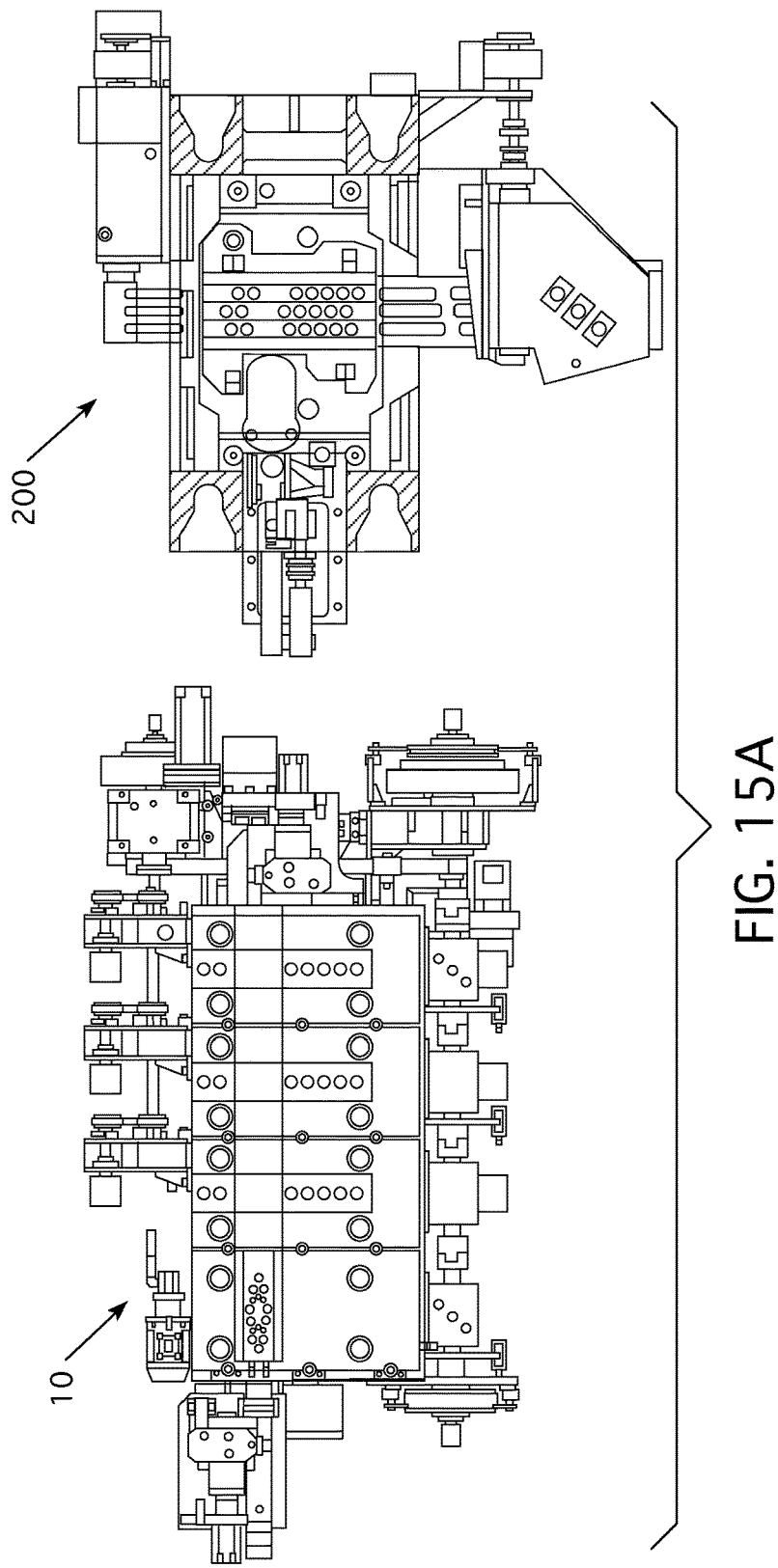
FIGS. 15A-15C show a conversion system relative to a prior art ram press.
Figure 15B:
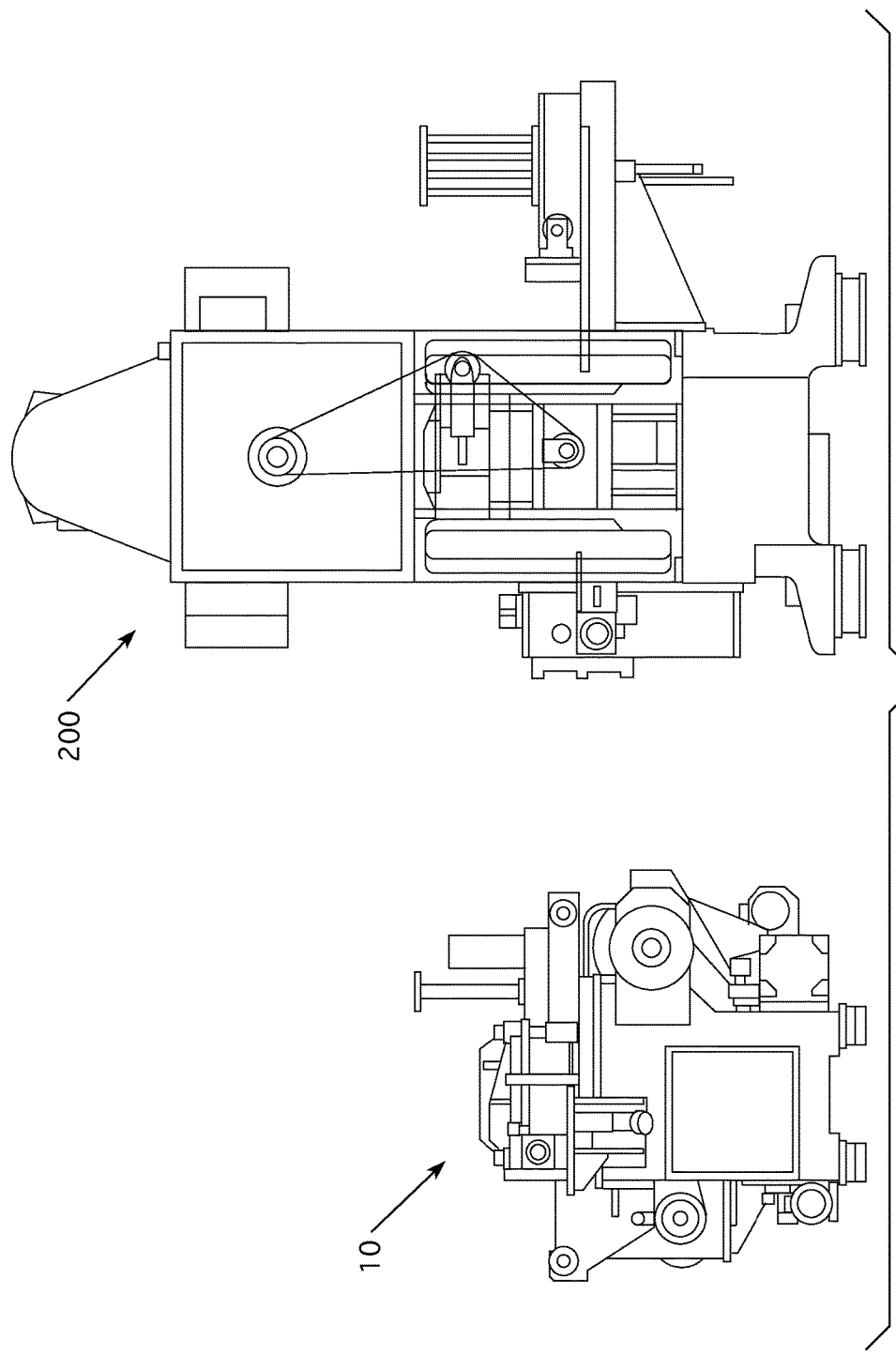
Figure 15C:
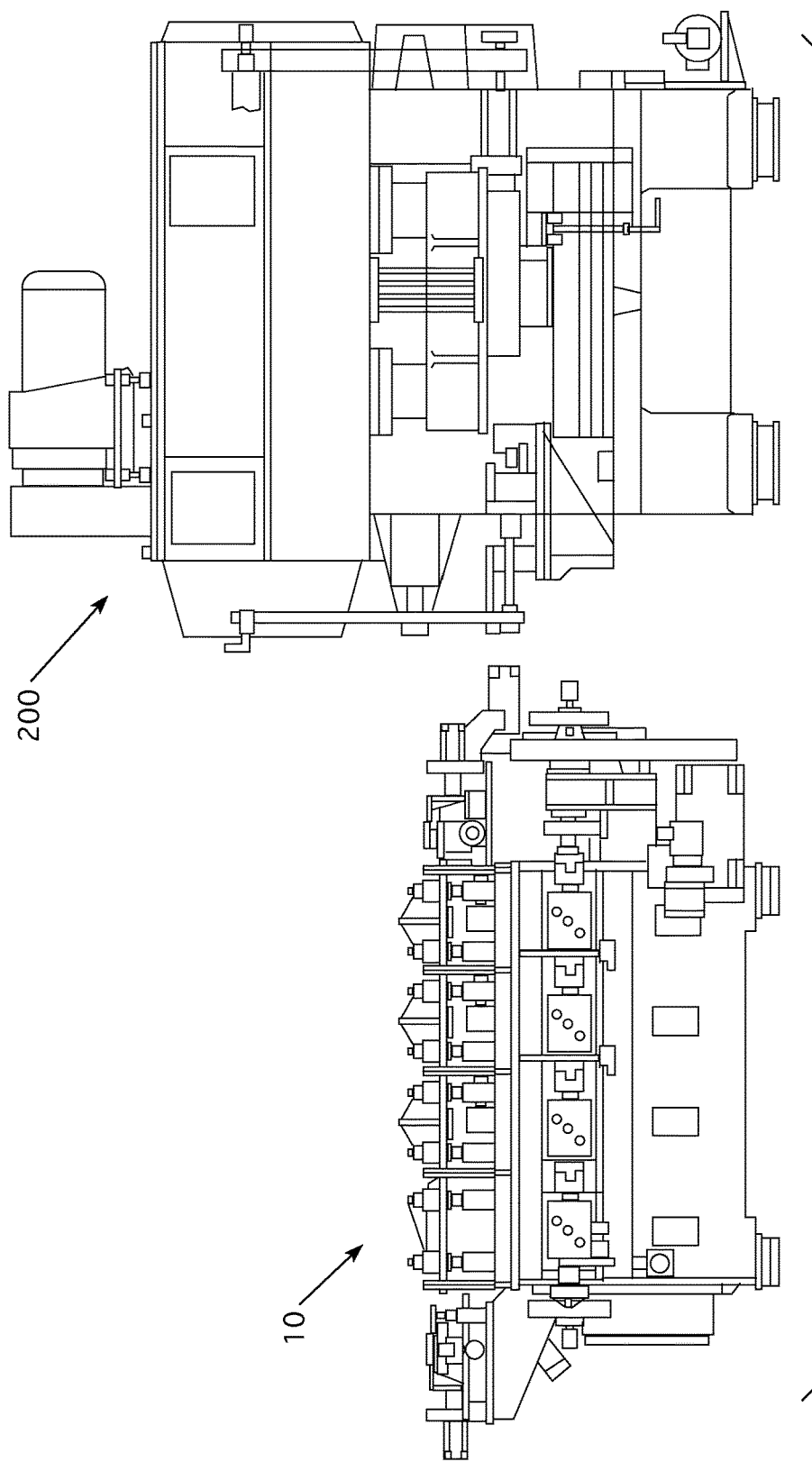
Figure 17:
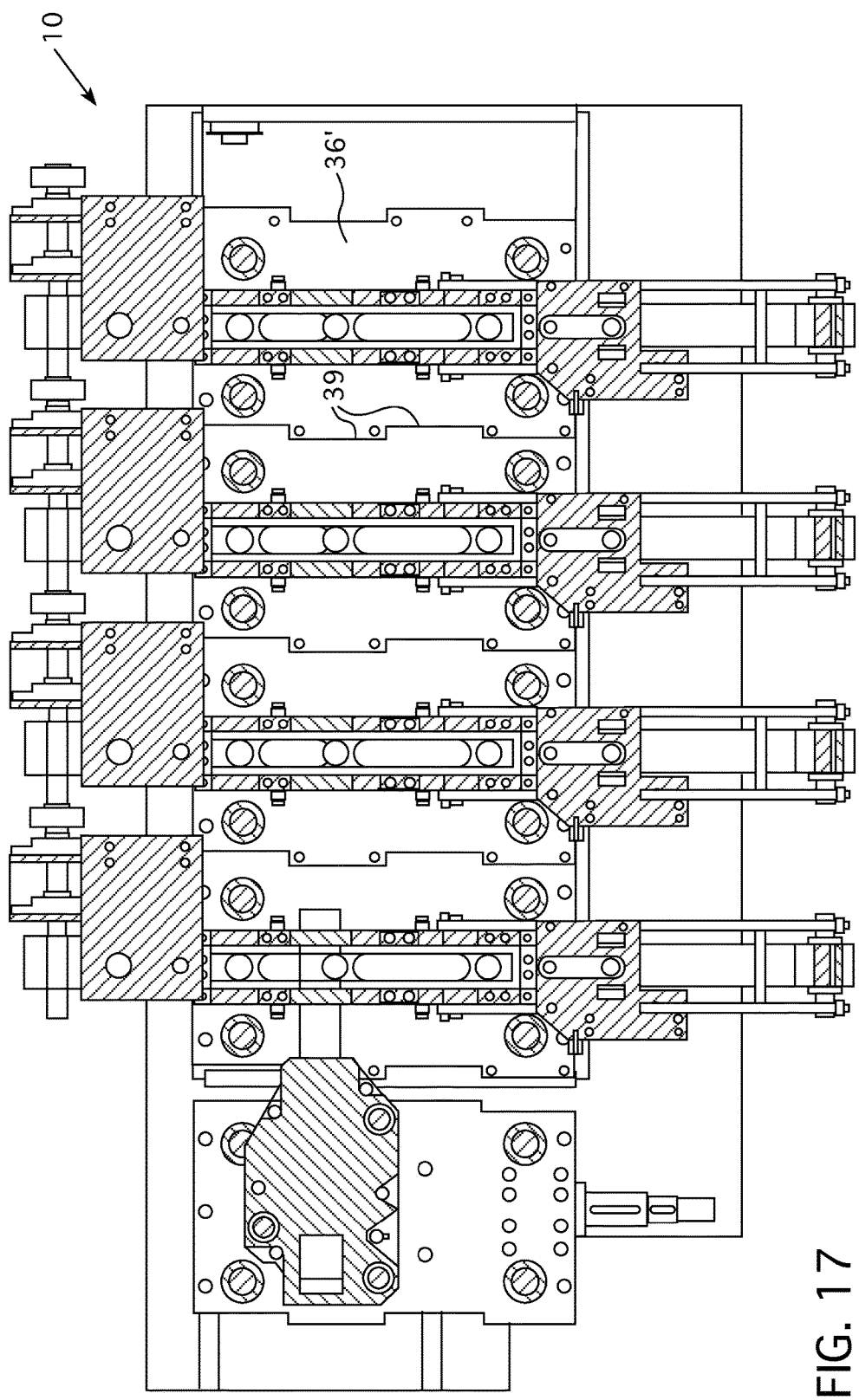
FIG. 17 is a top view of an alternate embodiment of the conversion press.

When the can end conversion system 10 is configured as described above, the drive assembly 160 and crankshaft assembly 50 are disposed below the first and second tooling assemblies 130, 140. In this configuration, the drive assembly 160 and crankshaft assembly 50 cannot drip lubricants or other liquids into the lanes 20 and contaminate the can end shell 1' being formed. Moreover, in the disclosed configuration, the conversion system 10 is substantially smaller than a ram press. As shown in FIGS. 15A-15C, an exemplary 3-out conversion system 10 is compared to a 3-out ram press 200 (relevant dimensions, of the exemplary embodiment, are shown on FIGS. 15A-15C). As shown, the conversion system 10 has a volume that is about 50% the volume of a ram press 200, and a height that is about 50% the height of a ram press 200. More specifically, and as shown in FIGS. 15A-15C, the conversion system 10, or 10', (all elements inclusive in the phrase "the housing assembly 30 and number of press units 12A, 12B, 12C, 12D") has height of between about 60 inches and 100 inches, or about 81.0 inches, a length of between about 120 inches and 160 inches, or about 144.0 inches, and a width of between about 60 inches and 90 inches, or about 74.1 inches. Thus, the volume of the conversion system 10, i.e. the housing assembly 30 and number of press units 12A, 12B, 12C, 12D, is between about 200 ft.$^3$ and 800 ft.$^3$, or about 500 ft.$^3$ These operational characteristics of the conversion system 10 are reduced relative to a ram press 200 which typically has a length of about 120.0 inches, a height of about 154.6 inches, a width of about 108.1 inches and a volume of about 1,160.5 ft.$^3$.

It is further noted that the mounting plate 36 dimension generally perpendicular to the associated lane 20 determines how close the various end lanes 20A, 20B, 20C are disposed to each other. In another exemplary embodiment, the size of each press unit 12 is further reduced by providing mounting plates 36' with staggered edges. That is, as show in FIG. 16, which shows a 4-out conversion press 10, the mounting plates 36' edges are not substantially straight. Rather, the mounting plates 36' include offsets 39 structured to allow the mounting plates 36' to nest and position the end lanes 20A, 20B, 20C closer to each other.

Further the lane dies of the conversion system 10 weigh about 50% less than the 1,100 lbs. lane die (not shown) of the ram press 200. That is, the conversion system 10 first lane dies 131 have a total weight of between about 450 and 550 lbs., or, about 480 lbs. In alternate terminology, because of the reduction in loads, the conversion system 10 utilizes first lane dies 131 that weigh about 50% less than the first lane dies of a ram press 200. For example, a ram press 200 is structured to move a die having a maximum weight of about 1,150 lbs. and upper dies generally have a weight near the maximum allowable weight. A single first lane die 131 of the conversion system 10 weighs between about 80 lbs. and 160 lbs., or between about 100 lbs. and 140 lbs., or about 120 lbs. Thus, a 3-out conversion system 10, with a tab lane 20D, has first lane dies 131 that collectively weigh between about 320 lbs. and 640 lbs., or between about 400 lbs. and 560 lbs., or about 480 lbs. (4× first lane die weight) total. Stated alternately, the collective weight of the first lane dies 131 is between about 320 lbs. and 640 lbs., or between about 400 lbs. and 560 lbs., or about 480 lbs. It is understood that the collective die weight depends upon the number of lanes 20 and that a four-out conversion press would have a greater weight (generally 5× first lane die weight) This is the mass that is moved by the multiple press drive assembly 160 and which causes much of the tipping moments. Further, the second lane dies 141 have a substantially similar weight.

In a conversion system 10 using modular press units 12, the tooling load is about 15 tons per module. This, in an exemplary 3-out conversion system 10 using modular press units 12, the tooling load, and the load the motor is structured to provide, is about 60 tons (120,000 lbs.). Further, because of the reduced loads, the interference of the end lane kiss blocks 138A, 138B, 138C, 148A, 148B, 148C is about 80% less than the interference experienced by kiss blocks of a ram press 200. That is, the kiss blocks of a ram press 200 have a kiss block deflection of between about 0.009 and 0.011, or about 0.010 inch while a conversion system 10 has a kiss block deflection of between about 0.001 and 0.004, or about 0.002 inch in each press unit 12. As noted above, the less deflection in the end lane kiss blocks 138A, 138B, 138C, 148A, 148B, 148C the less the "snap through." That is, with the reduction in the deflection, there is reduction in vibration and, therefore, a reduction in wear and tear. Thus, these operational characteristics of the end lane kiss blocks 138A, 138B, 138C, 148A, 148B, 148C are reduced relative to a ram press 200.

As shown in FIG. 8, in an exemplary embodiment, the kiss block pre-load is applied by a wedge assembly 210. As shown, the wedge assembly 210 includes two wedge members 212, 214. The wedge members 212, 214, in an exemplary embodiment, include bodies that have a cross-sectional area generally equal to the cross-sectional area of the associated first tooling assembly planar support member 129. Further, in an exemplary embodiment, each wedge member 212, 214 has a body 216, 218 having a taper that is substantially similar to the other wedge member 212, 214. At least one wedge member 212, 214 is movably coupled to the first tooling assembly planar support member 129 and disposed between the first tooling assembly planar support member 129 and the first die shoe 132. At least one wedge member 212, 214 includes a selectably adjustable coupling 222 disposed at the thicker end of the wedge member body 216, 218. Each wedge member 212, 214 is movable coupled to the first tooling assembly planar support member 129 by the adjustable coupling 222.

As shown, the wedge members 212, 214 are disposed with the narrow end of one wedge member 212, 214 disposed adjacent the thick end of the other wedge member 212, 214. In this configuration, the adjustable couplings 512 are used to advance or withdraw the wedge members 212, 214 relative to each other. When the wedge members 212, 214 are advanced toward each other, the overall thickness of the wedge assembly 210 increases and increases the deflection of the associated end lane kiss blocks 138A, 138B, 138C, 148A, 148B, 148C when the first tooling assembly 130 is in the second position.

Further, the modular conversion system 10 allows for about an 50% reduction in tipping loads. That is, the tipping loads in a unit 12 are about 50% less than the tipping loads disclosed in appendix A for a ram press 200. As discussed in Appendix A, the tipping loads can be determined based upon the loads at the tooling stations and the location relative to a selected origin.

In an alternate embodiment, not shown, the drive assembly 40 is coupled to a cam shaft (not shown) rather than a crankshaft 52. In this embodiment, the drive rods extend vertically above the cam shaft and are coupled to the second tooling assembly 140. The second tooling assembly 140 is movable coupled to fixed, substantially vertical guide pins (not shown). As the drive rods move over the cam surface, the second tooling assembly 140 is lifted toward the first tooling assembly 130. In a further alternate embodiment, the second tooling components 144 are movably disposed in the second tooling assembly 140 and structured to move independently and substantially vertically. For example, each second tooling component 144 may be disposed on substantially vertical guide pins (not shown). In this embodiment, there is a drive rod (not shown) for each second tooling component 144 and the cams (not shown) acting upon each drive rod is offset from the other cams. In this configuration, each tool station 150 is actuated at a slightly different time (the actuation periods may overlap). Thus, the total force required to rotate the camshaft is reduced when compared to a crankshaft or cam shaft that must actuate all tool stations 150 at once.

As noted above, the multiple press drive assembly 160 includes a motor 162 with an output shaft 164, a clutch/brake assembly 300 with an output shaft 302, as well as a direct drive linkage assembly 166. The direct drive linkage assembly 166 is operatively coupled to the motor 162 via the clutch/brake assembly 300. The elements of the press drive assembly 160 are shown in FIG. 18. More specifically, the multiple press drive assembly 160 further includes a tension member 168, as shown a belt 169. In an exemplary embodiment, the belt 169 operatively couples the motor 162 to the clutch/brake assembly 300. That is, the belt 169 is coupled to the motor output shaft 164 and transfers rotational motion from the motor 162 to the clutch/brake assembly 300. As used herein, the "clutch/brake assembly" includes both a clutch assembly and a brake assembly. These may be separate assemblies such as, but not limited to, a clutch assembly, as described below, and a brake assembly such as a brake on the clutch/brake assembly output shaft 302. In an exemplary embodiment, the clutch/brake assembly includes a brake assembly wherein elements of the clutch assembly are also elements of the brake assembly. Such a clutch/brake assembly is, as used herein, a "unified clutch/brake assembly."

In an exemplary embodiment, the clutch/brake assembly 300 is a unified clutch/brake assembly that includes an output shaft 302, a flywheel assembly 304, a forward hub assembly 306, a forward brake assembly 308, a pneumatic actuator assembly 310, and, in another exemplary embodiment, a rear brake assembly 312, and a rear hub assembly 314. The clutch/brake assembly output shaft 302 includes an elongated, generally cylindrical body 320. As shown in FIG. 19, the clutch/brake assembly output shaft body 320 includes a first end 322, a medial portion 324, and a second end 326. The clutch/brake assembly output shaft body first end 322 includes an axial bore 330 that extends to the clutch/brake assembly output shaft body medial portion 324. The clutch/brake assembly output shaft body medial portion 324 includes the continuation of the clutch/brake assembly output shaft body axial bore 330 as well as a number of generally radial passages 332. The clutch/brake assembly output shaft body medial portion 324 further includes a forward key assembly 340, a bearing assembly mounting 342, and a feeder device drive assembly drive device coupling 343.

The clutch/brake assembly output shaft body medial portion forward key assembly 340 (hereinafter "forward key assembly" 340) is structured to maintain the clutch/brake assembly forward hub assembly 306 in a fixed relationship with the clutch/brake assembly output shaft body 320. In an exemplary embodiment, the forward key assembly 340 includes an axial slot 344 that extends to a clutch/brake assembly output shaft body first end axial face 323. In an exemplary embodiment, the forward key assembly axial slot 344 has a semicircular cross-section. As discussed below, the forward hub assembly wheel body 460, includes a similar axial slot 468. When the forward hub assembly wheel body 460 is disposed on the clutch/brake assembly output shaft body 320, the forward key assembly axial slot 344 and the hub assembly wheel body axial slot 468 align to form a key passage 346. The forward key assembly 340 further includes a key member 348. In an exemplary embodiment, the forward key assembly key member 348 is a body 350 that corresponds to the forward key assembly key passage 346.

The clutch/brake assembly output shaft body medial portion bearing assembly mounting 342 (hereinafter output shaft body bearing assembly mounting 342) is a portion of the clutch/brake assembly output shaft body 320 structured to be coupled to the clutch/brake assembly flywheel assembly bearing assembly 404. The output shaft body bearing assembly mounting 342 has a substantially circular cross-section.

The clutch/brake assembly output shaft body medial portion feeder device drive assembly drive device coupling 343 (hereinafter output shaft body drive device coupling 343), in an exemplary embodiment, includes a sprocket 360 that is coupled, directly coupled, or fixed to the clutch/brake assembly output shaft body medial portion 324 and is structured to rotate therewith. The output shaft body drive device coupling drive sprocket 360 is further structured to be operatively coupled to a feeder device drive assembly drive device belt 922, discussed below. That is, the output shaft body drive device coupling sprocket 360 is structured to transfer the rotational motion of the clutch/brake assembly output shaft body 320 to the feeder device drive assembly drive device belt 920 and cause the feeder device drive assembly drive device belt 920 to move.

The clutch/brake assembly output shaft body second end 326 includes a selectable coupling 174. As noted above, each selectable coupling 174 is structured to be selectably (i.e. removably) coupled to another selectable coupling 174 in a fixed relationship. In an exemplary embodiment, each selectable coupling 174 is a symmetrical interlocking selectable coupling 175. A symmetrical interlocking selectable coupling 175 includes a collar member 370 and a number of axial extensions 378 (FIG. 18). Each collar member 370 includes a generally circular body 372 with a first axial surface 374 and a second axial surface 376. The collar member body first axial surface 374 includes the number of axial extensions 378. The axial extensions 378 further define a number of axial pockets 380 between, and adjacent to, the axial extensions 378. That is, the axial extensions 378 and the axial pockets 380 (FIG. 18A) are disposed in a generally symmetrical pattern. It is understood that when two symmetrical interlocking selectable couplings 175 are disposed facing each other, the axial extensions 378 on one symmetrical interlocking selectable coupling 175 align with, and fit within, the other symmetrical interlocking selectable coupling's axial pockets 380. When so disposed, the two symmetrical interlocking selectable couplings 175 are operatively coupled in a fixed relationship until separated in an axial direction.

The selectable coupling 174 may be any type of shaft coupling including, but not limited to, a flex disk coupling including keyed-slots (not shown) or a jaw-type coupling. In an exemplary embodiment, shown in FIG. 18A, a jaw-type selectable coupling 174 includes resilient collar (not shown) including a number of radial extensions 371. The clutch/brake assembly output shaft body second end radial extensions 371 are evenly spaced and create a number of sockets 373, i.e. the space between the clutch/brake assembly output shaft body second end radial extensions 371. In this embodiment, the axial extensions 378 of the opposing symmetrical interlocking selectable couplings 175 are disposed within the clutch/brake assembly output shaft body second end sockets 373.

In an exemplary embodiment, the axial extensions 378 and the axial pockets 380 are each shaped, generally, as circular sectors, i.e., similar to the shape of a slice of pie, and are disposed in repeating pattern. That is, for example, each axial extension 378 extends over an arc of about sixty degrees. On either side of each axial extension 378 is an axial pocket 380 also extending over an arc of about sixty degrees. With this pattern, there are three axial extensions 378 and three axial pockets 380 on the collar member body first axial surface 374. Moreover, in this pattern, the axial extensions 378 on one symmetrical interlocking selectable coupling 175 are structured to fit into the axial pockets 380 on an adjacent symmetrical interlocking selectable coupling 175. When the axial extensions 378 on one symmetrical interlocking selectable coupling 175 are disposed in the axial pockets 380 on an adjacent symmetrical interlocking selectable coupling 175, the symmetrical interlocking selectable couplings 175 are operatively coupled in a fixed relationship and the rotation of one symmetrical interlocking selectable coupling 175 causes the other symmetrical interlocking selectable coupling 175 to rotate.

As shown in FIG. 19, the clutch/brake assembly flywheel assembly 304 includes a flywheel body 400, a clutch disk 402, and a bearing assembly 404. The clutch/brake assembly flywheel assembly flywheel body 400 is generally toroidal, i.e. shaped as a torus, and includes a central passage 410. It is understood that the central passage 410 of a torus has a generally, or substantially, circular cross-sectional shape. The clutch/brake assembly flywheel assembly flywheel body radial surface 412 is structured to engage the multiple press drive assembly belt 169 with minimal slippage. Further, the clutch/brake assembly flywheel assembly flywheel body 400 includes a collar 414 on one axial surface. In an exemplary embodiment, and as used herein, a "collar" is a raised ridge that extends about, and is spaced from, a toroidal central passage such as the clutch/brake assembly flywheel assembly flywheel body central passage 410. As shown, the clutch/brake assembly flywheel assembly flywheel body collar 414 includes a number of threaded bores 416 spaced generally evenly thereabout. The threaded bores 416 extend generally axially.

The clutch/brake assembly flywheel assembly clutch disk 402 includes a generally toroidal body 420 having an axial, first planar surface 422 and an outer radial surface 424. The clutch/brake assembly flywheel assembly clutch disk first planar surface 422 is, in an exemplary embodiment, substantially smooth and is structured to be engaged by a clutch pad. The clutch/brake assembly flywheel assembly clutch disk outer radial surface 424 includes a number of radially extending tabs 426, each defining a passage (not numbered). There is a corresponding number of tabs 426 and threaded bores 416 which are further disposed in a corresponding pattern.

The clutch/brake assembly flywheel assembly bearing assembly 404 can be any known type of bearing. In an exemplary embodiment, as shown, the clutch/brake assembly flywheel assembly bearing assembly 404 includes a pair of spaced ball bearing assemblies 430. That is, each clutch/brake assembly flywheel assembly bearing assembly 404 includes an inner, first torus-shaped race 432, an outer, second torus-shaped race 434, and a number of ball bearings 436 disposed therebetween. The second torus-shaped race 434 is sized to fit snugly within the clutch/brake assembly flywheel assembly flywheel body central passage 410.

The clutch/brake assembly flywheel assembly 304 is assembled and coupled to the clutch/brake assembly output shaft 302 as follows. The clutch/brake assembly flywheel assembly clutch disk 402 is coupled, directly coupled or, in an exemplary embodiment, fixed to the clutch/brake assembly flywheel assembly flywheel body 400. That is, a number of fasteners (not numbered) are passed through the clutch/brake assembly flywheel assembly clutch disk outer radial surface tab passages and are threaded into the clutch/brake assembly flywheel assembly flywheel body 400 collar threaded bores 416. Further, the clutch/brake assembly flywheel assembly bearing assembly 404 is disposed within the clutch/brake assembly flywheel assembly flywheel body central passage 410. The clutch/brake assembly flywheel assembly 304 is rotatably coupled to the clutch/brake assembly output shaft 302 with the clutch/brake assembly flywheel assembly bearing assembly 404 coupled, directly coupled, or fixed to the output shaft body bearing assembly mounting 342. In an exemplary embodiment, the clutch/brake assembly flywheel assembly bearing assembly first torus-shaped race 432 is fixed to the output shaft body bearing assembly mounting 342.

Figure 19A:
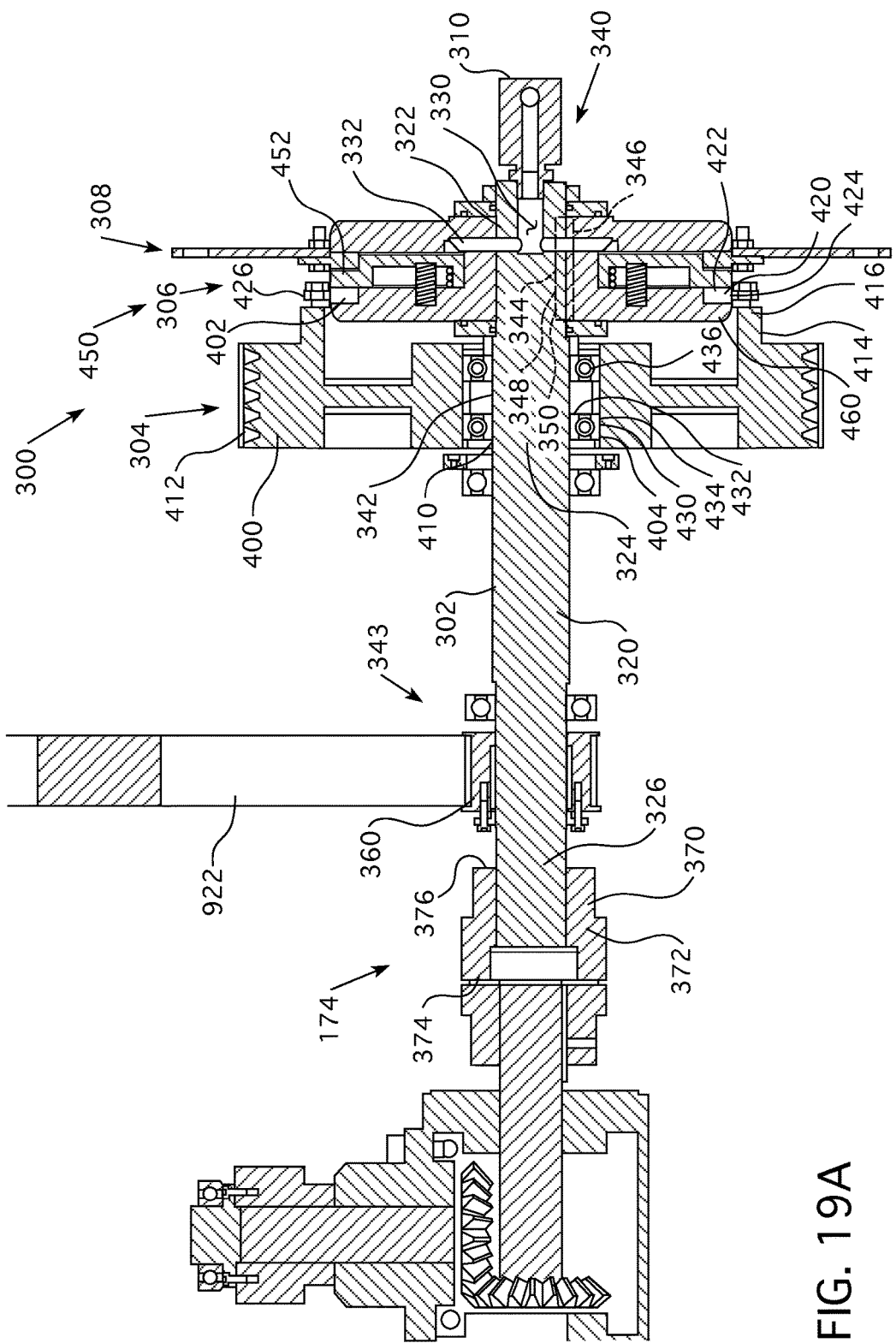

As shown in FIG. 19A, the clutch/brake assembly forward hub assembly 306 (hereinafter "forward hub assembly" 306) includes a wheel assembly 450 and a clutch assembly 452. The forward hub assembly wheel assembly 450 is, in an exemplary embodiment, fixed to the clutch/brake assembly output shaft body 320 or the clutch/brake assembly output shaft body medial portion 324. In an exemplary embodiment, the forward hub assembly wheel assembly 450 is fixed in a single orientation to the clutch/brake assembly output shaft body 320 by the forward key assembly 340, as described below.

The forward hub assembly wheel assembly 450 includes a body 460 (hereinafter "forward hub assembly wheel body" 460). The forward hub assembly wheel body 460 is generally toroidal and defines a center passage 462 as well as a clutch assembly cavity 464. In an exemplary embodiment, the forward hub assembly wheel body clutch assembly cavity 464 is a toroidal cavity having a rectangular cross-sectional shape. Further, the forward hub assembly wheel body clutch assembly cavity 464 includes a number of spaced, generally axial pockets 466. In an exemplary embodiment, the forward hub assembly wheel body clutch assembly cavity axial pockets 466 are disposed in a pattern within the forward hub assembly wheel body clutch assembly cavity 464.

In an exemplary embodiment, the forward hub assembly wheel body 460 further includes an axial slot 468. As discussed above, the forward hub assembly wheel body axial slot 468 is sized to correspond to the forward key assembly axial slot 344 and, when the forward hub assembly wheel body 460 is disposed on the clutch/brake assembly output shaft body 320, the forward key assembly axial slot 344 and the hub assembly wheel body axial slot 468 align to form a key passage 346.

Further, in an exemplary embodiment, the forward hub assembly wheel body 460 includes a number of radial passages 469 that extend between the forward hub assembly wheel body center passage 462 and the forward hub assembly wheel body clutch assembly cavity 464. In an exemplary embodiment, the forward hub assembly wheel body radial passages 469 extend to one axial surface of the forward hub assembly wheel body clutch assembly cavity 464. The forward hub assembly wheel body radial passages 469 are sized and positioned to correspond to the clutch/brake assembly output shaft body medial portion radial passages 332. That is, when the forward hub assembly wheel body 460 is disposed on the clutch/brake assembly output shaft body medial portion 324, the forward hub assembly wheel body radial passages 469 and the clutch/brake assembly output shaft body medial portion radial passages 332 form a number of continuous passages. Stated alternatively, when the forward hub assembly wheel body 460 is disposed on the clutch/brake assembly output shaft body medial portion 324, the forward hub assembly wheel body radial passages 469 and the clutch/brake assembly output shaft body medial portion radial passages 332 are in fluid communication.

The forward hub assembly clutch assembly 452 (hereinafter "forward clutch assembly" 452) includes a movable piston 470, a clutch pad 480 and a mounting 490. The forward clutch assembly piston 470 includes a toroidal body 472. The forward clutch assembly piston body 472 includes an clutch pad support 474 and a mounting portion 476. The forward clutch assembly clutch pad support 474 is structured to support and/or coupled to the forward clutch assembly clutch pad 480 to the forward clutch assembly piston 470. In an exemplary embodiment, the forward clutch assembly piston 470 and the forward clutch assembly clutch pad 480 are unitary and the forward clutch assembly clutch pad body support 474 is the transition between the two areas of the unitary body. The forward clutch assembly clutch pad body mounting portion 476 is a generally planar portion including a number of axial mounting pockets 478. The forward clutch assembly piston body mounting pockets 478 are in a pattern sized and shaped to correspond to the forward hub assembly wheel body clutch assembly cavity axial pockets 466 and to their pattern.

The forward clutch assembly clutch pad 480 includes a toroidal body 482. In an exemplary embodiment, the forward clutch assembly clutch pad 480 is made from a soft material and is sized and shaped to correspond to the clutch/brake assembly flywheel assembly clutch disk first planar surface 422 as well as the forward brake member body 510, discussed below. The forward clutch assembly clutch pad body 482 has, in an exemplary embodiment, a generally rectangular cross-section including a first axial surface 484 and a second axial surface 486.

In an exemplary embodiment, the forward clutch assembly mounting 490 includes a number of resilient members 492. As shown, and in an exemplary embodiment, the forward clutch assembly mounting members 492 are compression springs 494. The members 492 are sized to correspond to the forward clutch assembly piston body mounting pockets 478 and the forward hub assembly wheel body clutch assembly cavity axial pockets 466.

The forward hub assembly 306 is assembled as follows. The forward clutch assembly clutch pad 480 is coupled, directly coupled or fixed to the forward clutch assembly piston body 472. In an exemplary embodiment, the forward clutch assembly clutch pad 480 extends about, i.e. encircles, the forward clutch assembly piston body 472. The forward clutch assembly piston body 472 and forward clutch assembly clutch pad 480 are movably disposed in the forward hub assembly wheel body clutch assembly cavity 464. In an exemplary embodiment, the forward clutch assembly piston body 472 and forward clutch assembly clutch pad 480 are translatably disposed in the forward hub assembly wheel body clutch assembly cavity 464. In an exemplary embodiment, the forward clutch assembly piston body 472 and forward clutch assembly clutch pad 480 move generally axially as described below.

The forward clutch assembly mounting 490, and in an exemplary embodiment the forward clutch assembly mounting members 492, movably, or translatably, couple the forward clutch assembly piston body 472 and forward clutch assembly clutch pad 480 to the forward hub assembly wheel body 460. For example, opposing ends of the resilient members 492 are disposed in one of the forward clutch assembly piston body mounting pockets 478 or the forward hub assembly wheel body clutch assembly cavity axial pockets 466. In this configuration, the forward clutch assembly piston body 472 and forward clutch assembly clutch pad 480 are structured to move axially relative to the forward hub assembly wheel body 460, but cannot rotate relative thereto.

Figure 19C:
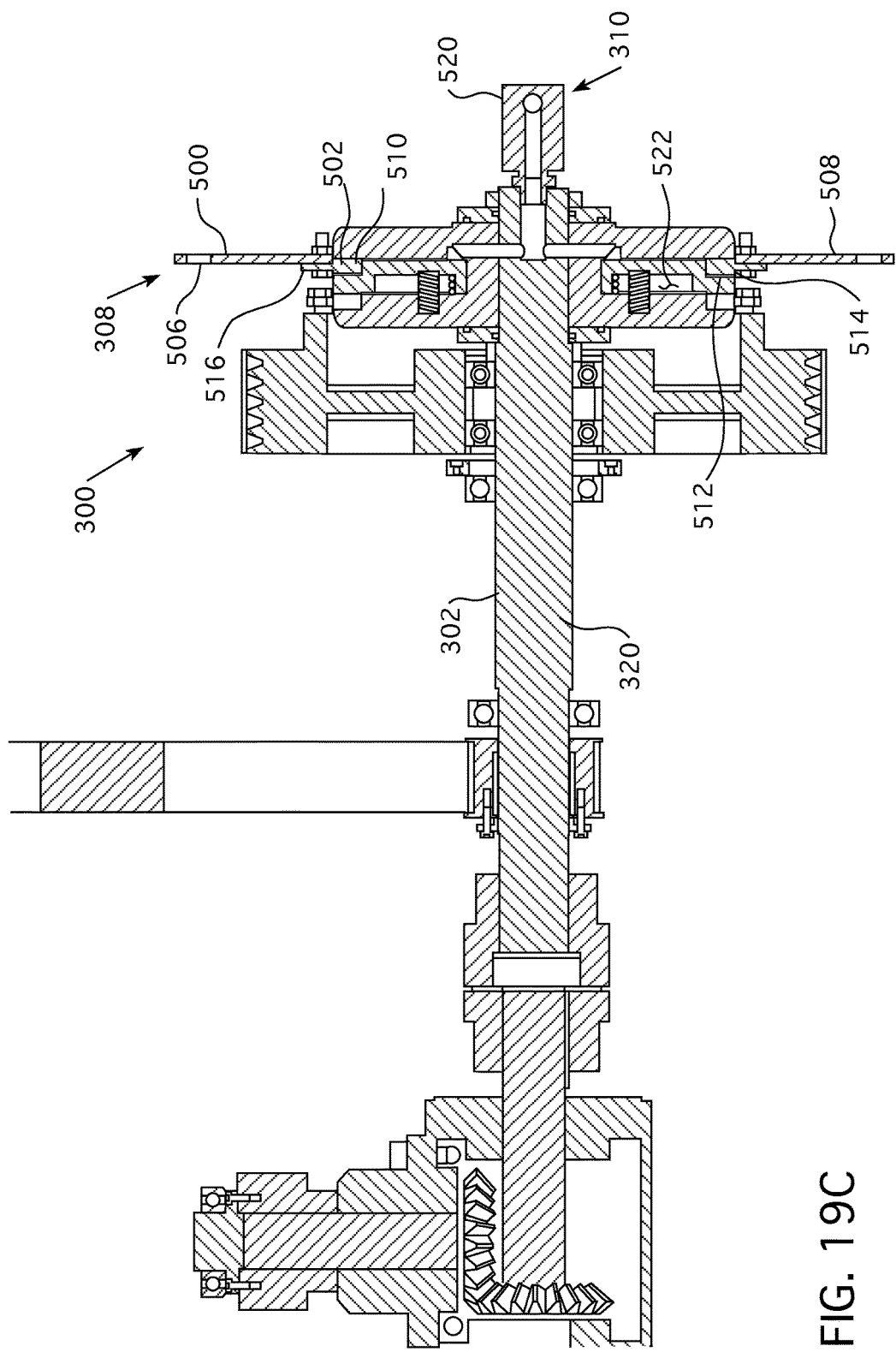

As shown in FIG. 19C, the clutch/brake assembly forward brake assembly 308 includes a forward support assembly 500 and a forward brake member 502. The forward support assembly 500 is shown in part as opposed brackets 506, 508. It is understood that the forward support assembly 500 includes a number of other members or elements that support the forward support assembly brackets 506, 508. For example, the forward support assembly 500 can be, but is not limited to, a housing assembly or a frame assembly (neither shown). The forward support assembly brackets 506, 508 include passages (not numbered) through which fasteners may extend. The forward support assembly 500 is structured to provide a fixed coupling point for the clutch/brake assembly forward brake assembly forward brake member 502 (hereinafter "forward brake member" 502).

The forward brake member 502 includes a generally toroidal body 510 having an axial, first planar surface 512 and an outer radial surface 514. The forward brake member body first planar surface 512 is, in an exemplary embodiment, substantially smooth and is structured to be engaged by a clutch pad. The forward brake member body outer radial surface 514 includes a number of radially extending tabs 516, each defining a passage (not numbered). In an exemplary embodiment, the forward brake member body 510 has a generally rectangular cross-section. The forward brake member body 510 is coupled, directly coupled, or fixed to the forward support assembly 500 by fasteners extending through the forward support assembly brackets 506, 508 and the forward brake member body tabs 516.

The clutch/brake assembly pneumatic actuator assembly 310 (hereinafter "pneumatic actuator assembly" 310) is further coupled to other elements of the multiple press drive assembly 160 and, as such, is also identified as being part of those assemblies, e.g. as part of the feeder device drive assembly momentum assembly 916, discussed below. The pneumatic actuator assembly 310 includes the clutch/brake assembly output shaft body axial bore 330, the clutch/brake assembly output shaft body medial portion radial passages 332, the forward hub assembly wheel body radial passages 469, and a rotatable pressure coupling 520. The pneumatic actuator assembly 310 further includes a number of seals, pressure hoses, and a pressure generating assembly (none shown). The pneumatic actuator assembly rotatable pressure coupling 520 is rotatably disposed in the clutch/brake assembly output shaft body axial bore 330. The clutch/brake assembly output shaft body medial portion radial passages 332 and the forward hub assembly wheel body radial passages 469 are aligned when the forward hub assembly 306 is fixed to the clutch/brake assembly output shaft 302. The seals are disposed at, or about, the various interfaces of these elements and are structured to substantially prevent fluid leakage from the various passages. Further, seals are disposed between the surfaces of the forward hub assembly wheel body clutch assembly cavity 464 and the forward clutch assembly piston 470 thereby creating a forward hub assembly pressure retaining chamber 522 on one side of the forward clutch assembly piston 470. In this configuration, the clutch/brake assembly pneumatic actuator assembly 310 is structured to move, via pressurizing the forward hub assembly pressure retaining chamber 522, the forward clutch assembly piston body 472 between a first position and a second position.

In addition to the configurations noted above, the clutch/brake assembly 300 is assembled as follows. The clutch/brake assembly flywheel assembly 304 is rotatably coupled to the clutch/brake assembly output shaft 302 at the clutch/brake assembly output shaft body medial portion 324. That is, the clutch/brake assembly flywheel assembly bearing assembly 404 is coupled, directly coupled, or fixed to the output shaft body bearing assembly mounting 342 and the clutch/brake assembly flywheel assembly flywheel body 400 is coupled, directly coupled, or fixed to the clutch/brake assembly flywheel assembly bearing assembly 404. Further, the clutch/brake assembly flywheel assembly clutch disk 402 is disposed within the forward hub assembly wheel body clutch assembly cavity 464. As noted above, the clutch/brake assembly flywheel assembly clutch disk 402 is sized and shaped to correspond to the forward clutch assembly clutch pad 480. Thus, in this configuration, the clutch/brake assembly flywheel assembly clutch disk 402 and forward clutch assembly clutch pad 480 are disposed adjacent to each other within the forward hub assembly wheel body clutch assembly cavity 464. Further, the clutch/brake assembly flywheel assembly clutch disk 402 and forward clutch assembly clutch pad 480 are also generally parallel to each other.

The forward hub assembly 306 is, in an exemplary embodiment, fixed to the clutch/brake assembly output shaft body medial portion 324. The clutch/brake assembly output shaft body medial portion 324 is disposed in the forward hub assembly wheel body center passage 462 with the forward key assembly axial slot 344 and the hub assembly wheel body axial slot 468 aligned to form the forward key passage 346. The key member 348 is disposed in the key passage 346 and substantially fixes the forward hub assembly wheel body 460 to the clutch/brake assembly output shaft body 320. That is, manufacturing tolerances may allow for minimal motion between the forward hub assembly wheel body 460 and the clutch/brake assembly output shaft body 320, but the forward hub assembly wheel body 460 cannot rotate about the clutch/brake assembly output shaft body 320.

Further, the forward brake member 502 is disposed within the forward hub assembly wheel body clutch assembly cavity 464. That is, the forward brake member 502 is disposed within the forward hub assembly wheel body clutch assembly cavity 464 on the opposite side of the forward clutch assembly clutch pad 480 from the clutch/brake assembly flywheel assembly clutch disk 402. As noted above, the forward brake member 502 is also sized and shaped to correspond to forward clutch assembly clutch pad 480. Thus in this configuration, the clutch/brake assembly flywheel assembly clutch disk 402, the forward clutch assembly clutch pad 480, and the forward brake member 502 are disposed in series within the forward hub assembly wheel body clutch assembly cavity 464. The forward hub assembly wheel body clutch assembly cavity 464 has a sufficient axial height so that the forward clutch assembly clutch pad 480 can be spaced from both the clutch/brake assembly flywheel assembly clutch disk 402 and the forward brake member 502 simultaneously.

In this configuration, the forward clutch assembly piston body 472, and therefore the forward clutch assembly clutch pad 480, moves between two positions, a first position, wherein the forward clutch assembly clutch pad 480 is not fixed to the clutch/brake assembly flywheel assembly 304, and a second position, wherein the forward clutch assembly clutch pad 480 is fixed to the clutch/brake assembly flywheel assembly 304 (and more specifically to the clutch/brake assembly flywheel assembly clutch disk 402). In an exemplary embodiment, the forward clutch assembly mounting 490 is structured to bias the forward clutch assembly piston body 472, and therefore the forward clutch assembly clutch pad 480, toward the first position.

In an exemplary embodiment, and wherein the clutch/brake assembly 300 is a unified clutch/brake assembly, the forward clutch assembly mounting 490 is further structured to bias the forward clutch assembly piston body 472, and therefore the forward clutch assembly clutch pad 480, against the forward brake member 502. That is, when the forward clutch assembly piston body 472 is in the first position, the forward clutch assembly clutch pad 480 is fixed to the forward brake member 502.

It is understood that, as the forward clutch assembly clutch pad 480 is structured to be biased against an element that is in a different state there is a transition period wherein the clutch pad 480 transitions from one state to the other. That is, if the forward clutch assembly clutch pad 480 is generally stationary, it is structured to be moved against a rotating element, e.g. the clutch/brake assembly flywheel assembly clutch disk 402. Conversely, if the forward clutch assembly clutch pad 480 is in motion, it is structured to be biased against a stationary element, e.g. the forward brake member 502. As is understood with clutch pads, as the forward clutch assembly clutch pad 480 engages the other element, the forward clutch assembly clutch pad 480 transitions to the state of the element against which it is biased. Thus, when a generally stationary forward clutch assembly clutch pad 480 is biased against a rotating clutch/brake assembly flywheel assembly clutch disk 402, the forward clutch assembly clutch pad 480 begins to rotate with the clutch/brake assembly flywheel assembly clutch disk 402. At the end of the transition period, the forward clutch assembly clutch pad 480 matches the speed, and is fixed, to the clutch/brake assembly flywheel assembly clutch disk 402. Conversely, when a rotating forward clutch assembly clutch pad 480 is biased against a stationary forward brake member 502, the forward clutch assembly clutch pad 480 transitions to a stationary state and is therefore fixed to the forward brake member 502.

As noted above, the direct drive linkage assembly 166 includes a number of linkage shafts 170 and gearboxes 172. In an exemplary embodiment, the gearboxes 172 are right angle miter gearboxes 172'. There is one right angle miter gearbox 172'A, 172'B, 172'C, 172'D associated with each press units 12A, 12B, 12C, 12D. The linkage shafts 170 and the right angle miter gearbox 172' are substantially similar and only one will be described. As before, the letters "A," "B," "C," and "D" are used to identify the various right angle miter gearbox 172'A, 172'B, 172'C, 172'D associated with the press units 12A, 12B, 12C, 12D.

Figure 20:
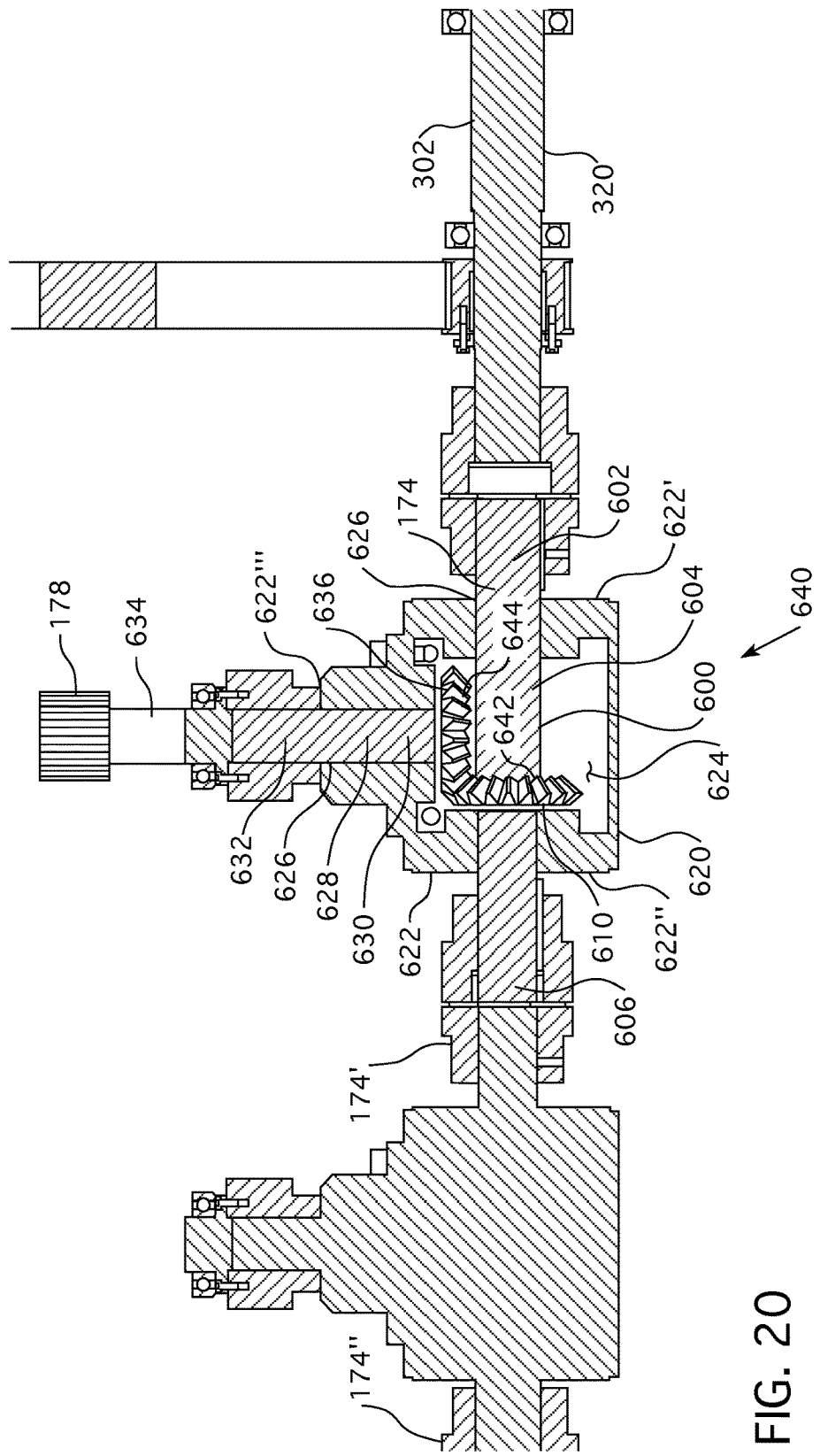
FIG. 20 is a detail top cross-sectional view of a conversion linkage.
Figure 21:
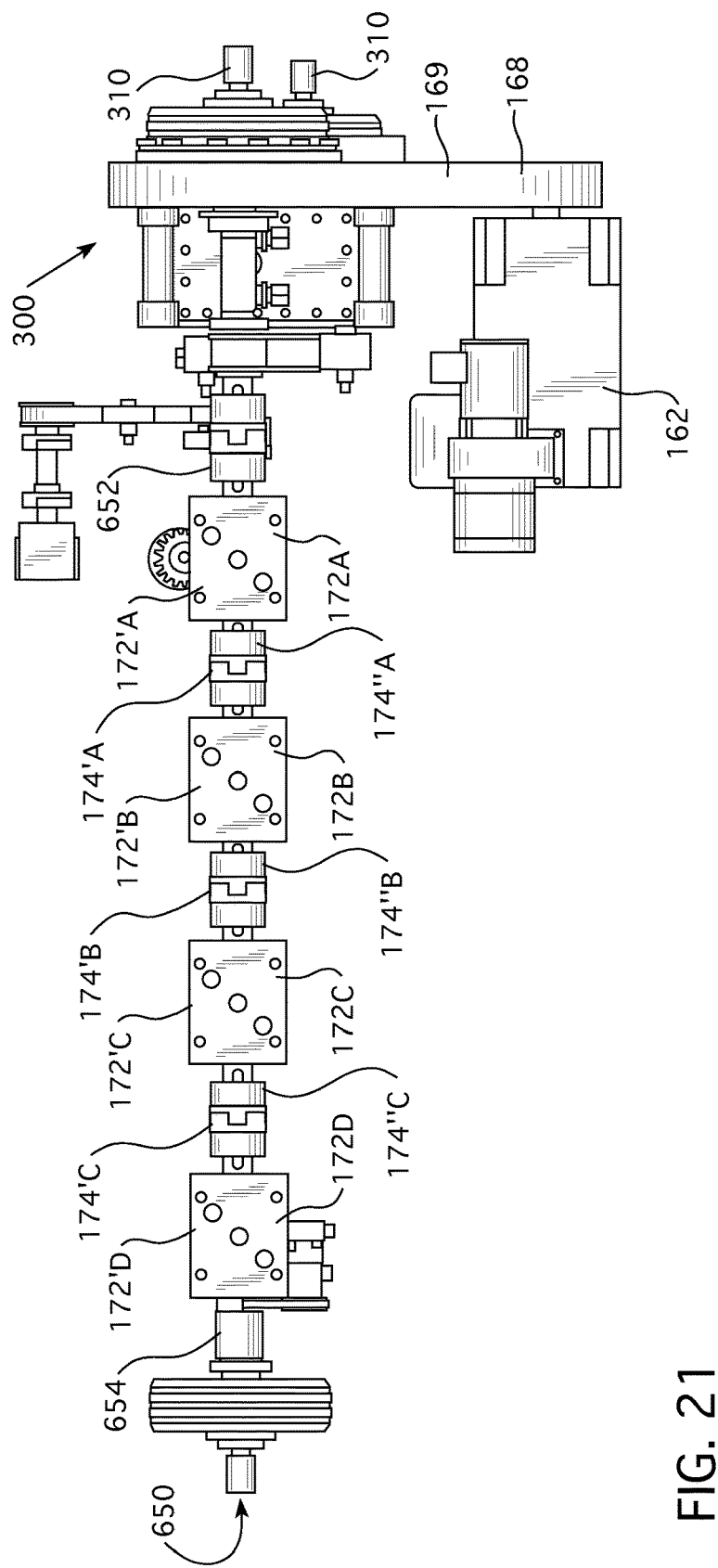
FIG. 21 is a side view of the direct drive linkage assembly.

As shown in FIGS. 20 and 21, each linkage shaft 170 includes an elongated body 600 which, in an exemplary embodiment, has a substantially circular cross-section. Each linkage shaft body 600 includes a first end 602, a medial portion 604, and a second end 606. A selectable coupling 174, and in an exemplary embodiment a symmetrical interlocking selectable coupling 175 as described above, is disposed at each linkage shaft body first end 602 and each linkage shaft body second end 606. Further, a miter gear 610 is coupled, directly coupled or fixed to the linkage shaft body medial portion 604. Hereinafter, the various linkage shaft selectable couplings 174 shall be identified as either a right angle miter gearbox linkage shaft body first end selectable coupling 174' or a right angle miter gearbox linkage shaft body second end selectable coupling 174". These reference numbers are also modified by the letters "A," "B," "C," and "D", used below, in association with a specific right angle miter gearbox 172'A, 172'B, 172'C, 172'D.

Each right angle miter gearbox 172' includes a housing assembly 620, and a press shaft 176, as noted above. Each miter gearbox housing assembly 620 includes a number of sidewalls 622 defining a substantially enclosed space 624. Two opposed sidewalls 622', 622", as well as one sidewall 622''' are generally perpendicular to the opposed sidewalls 622', 622", defined generally circular passages 626, The miter gearbox housing assembly passages 626, in an exemplary embodiment, include a bearing (not shown). The miter gearbox housing assembly passages 626 correspond to the linkage shafts 170 and the press shaft 176. Each press shaft 176 includes a body 628 with a first end 630, a medial portion 632, and a second end 634. A miter gear 636 is coupled, directly coupled or fixed to the press shaft body first end 630. A pinion gear 178 is coupled, directly coupled or fixed to the press shaft body second end 634.

Each right angle miter gearbox 172' is assembled as follows. A linkage shaft 170 is partially disposed in the miter gearbox housing assembly enclosed space 624, That is, the linkage shaft body first end 602 and the linkage shaft body second end 606 are disposed on opposing sides of the miter gearbox housing assembly 620 with the linkage shaft body medial portion 604 passing through the miter gearbox housing assembly passages 626 disposed on opposed sidewalls 622', 622". Further, the linkage shaft miter gear 610 is disposed in the miter gearbox housing assembly enclosed space 624. The press shaft body first end 630, as well as the press shaft miter gear 636, are also disposed in the miter gearbox housing assembly enclosed space 624. The press shaft body medial portion 632 extends through the miter gearbox housing assembly passage 626 disposed on the sidewall 622''' that is perpendicular to the opposed sidewalls 622', 622" having passages 626. The linkage shaft miter gear 610 and the press shaft miter gear 636 are operatively coupled, i.e. the gear teeth mesh together. In this configuration, each right angle miter gearbox 172' is structured to convert the rotational motion of a linkage shaft 170 about one axis of rotation into rotation of the press shaft 176 about a different, and in an exemplary embodiment perpendicular, axis or rotation.

In this configuration, the linkage shaft miter gear 610 and the press shaft miter gear 636 define a conversion linkage 640 structured to convert a rotational motion in a linkage shaft 170 to a rotational motion in a press shaft 176. That is, the conversion linkage 640 includes a first miter gear 642 (as shown linkage shaft miter gear 610) and a second miter gear 644 (as shown press shaft miter gear 636) wherein the first miter gear 642 and the second miter gear 644 are operatively coupled to each other.

In an exemplary embodiment, the multiple press drive assembly 160 is assembled as follows. The multiple press drive assembly tension member 168, such as belt 169, is coupled or directly coupled to the motor output shaft 164 and the clutch/brake assembly flywheel assembly 304, and more specifically to the flywheel body radial surface 412. That is, belt 169 loops about both the motor output shaft 164 and the flywheel body radial surface 412. In this configuration, rotational motion in the motor output shaft 164 is transferred to the clutch/brake assembly flywheel assembly flywheel body 400. The clutch/brake assembly output shaft body second end selectable coupling 174 is coupled to the linkage shaft 170A of a first right angle miter gearbox 172'A. That is, the clutch/brake assembly output shaft body second end selectable coupling 174" is selectably coupled to the linkage shaft body first end selectable coupling 174'A of the first right angle miter gearbox 172'A.

The remaining right angle miter gearboxes 172'B, 172'C, 172'D are operatively coupled to each other. That is, each right angle miter gearbox linkage shaft body first end selectable coupling 174'B, 174'C, 174'D is selectably coupled to an adjacent linkage shaft body second end selectable coupling 174"A, 174"B, 174"C, respectively. In this configuration, the linkage shaft 170A, 170B, 170C, and 170D are operatively coupled together in a fixed orientation. That is, the linkage shaft 170A, 170B, 170C, and 170D are disposed in series and form a drive shaft 650 that includes a forward, first end 652 and a rear, second end 654.

In operation, the forward clutch assembly piston body 472 is initially in the first position and the forward clutch assembly clutch pad 480 is fixed to the forward brake member 502. That is, the forward clutch assembly clutch pad 480 is stationary. As the forward clutch assembly piston body 472 and forward clutch assembly clutch pad 480 are translatably disposed in the forward hub assembly wheel body clutch assembly cavity 464, i.e. coupled in a fixed orientation but axially movable, the forward hub assembly wheel body 460 is also stationary. As the forward hub assembly wheel body 460 is fixed to the clutch/brake assembly output shaft body medial portion 324, the clutch/brake assembly output shaft body 320 is also stationary. As the clutch/brake assembly output shaft body 320 is selectably and operatively coupled to the various linkage shafts 170A, 170B, 170C, and 170D in a fixed orientation, the various linkage shafts 170A, 170B, 170C, and 170D are also stationary. When the various linkage shafts 170A, 170B, 170C, are stationary, the various press shafts 176A, 176B, 176C, 176D, and crankshafts 52A, 52B, 52C, 52D are also stationary.

When the motor 162 is actuated, the motor output shaft 164 rotates. This rotational motion is transferred to the clutch/brake assembly flywheel assembly flywheel body 400 via the multiple press drive assembly tension member 168. After the clutch/brake assembly flywheel assembly flywheel body 400 is brought up to a selected rotational speed, the forward clutch assembly piston body 472 is moved to the second position. As the forward clutch assembly piston body 472 is moved to the second position, the forward clutch assembly clutch pad 480 is biased against a rotating clutch/brake assembly flywheel assembly clutch disk 402. While there is initially some slippage, the forward clutch assembly clutch pad 480 becomes fixed to the clutch/brake assembly flywheel assembly clutch disk 402 and rotates therewith. Accordingly, due to the various couplings and elements disposed in fixed relationships described in the paragraph above, the various linkage shafts 170A, 170B, 170C, and 170D rotate as well. Further, as described above, the rotational motion of the various linkage shafts 170A, 170B, 170C, and 170D are transferred via the right angle miter gearboxes 172'A, 172'B, 172'C, 172'D, and the various press shafts 176A, 176B, 176C, 176D, to the various crankshafts 52A, 52B, 52C, 52D.

Motion of the crankshafts 52A, 52B, 52C, 52D can be halted by moving the forward clutch assembly piston body 472 to the first position. That is, as the forward clutch assembly piston body 472 is moved to the first position, the forward clutch assembly clutch pad 480 is biased against a stationary forward brake member 502. As described above, after a transition period wherein the forward clutch assembly clutch pad 480 slips relative to the forward brake member 502, the forward clutch assembly clutch pad 480 is fixed to the forward brake member 502 and is stationary. As described above, when the forward clutch assembly clutch pad 480 is stationary, the elements of the direct drive linkage assembly 166 and the crankshafts 52A, 52B, 52C, 52D are stationary. It is noted, however, that the clutch/brake assembly flywheel assembly flywheel body 400 is still free to, and does, rotate about the stationary clutch/brake assembly output shaft body 320. Thus, rotational energy is conserved and is utilized when the forward clutch assembly piston body 472 is again moved to the second position.

Figure 22:
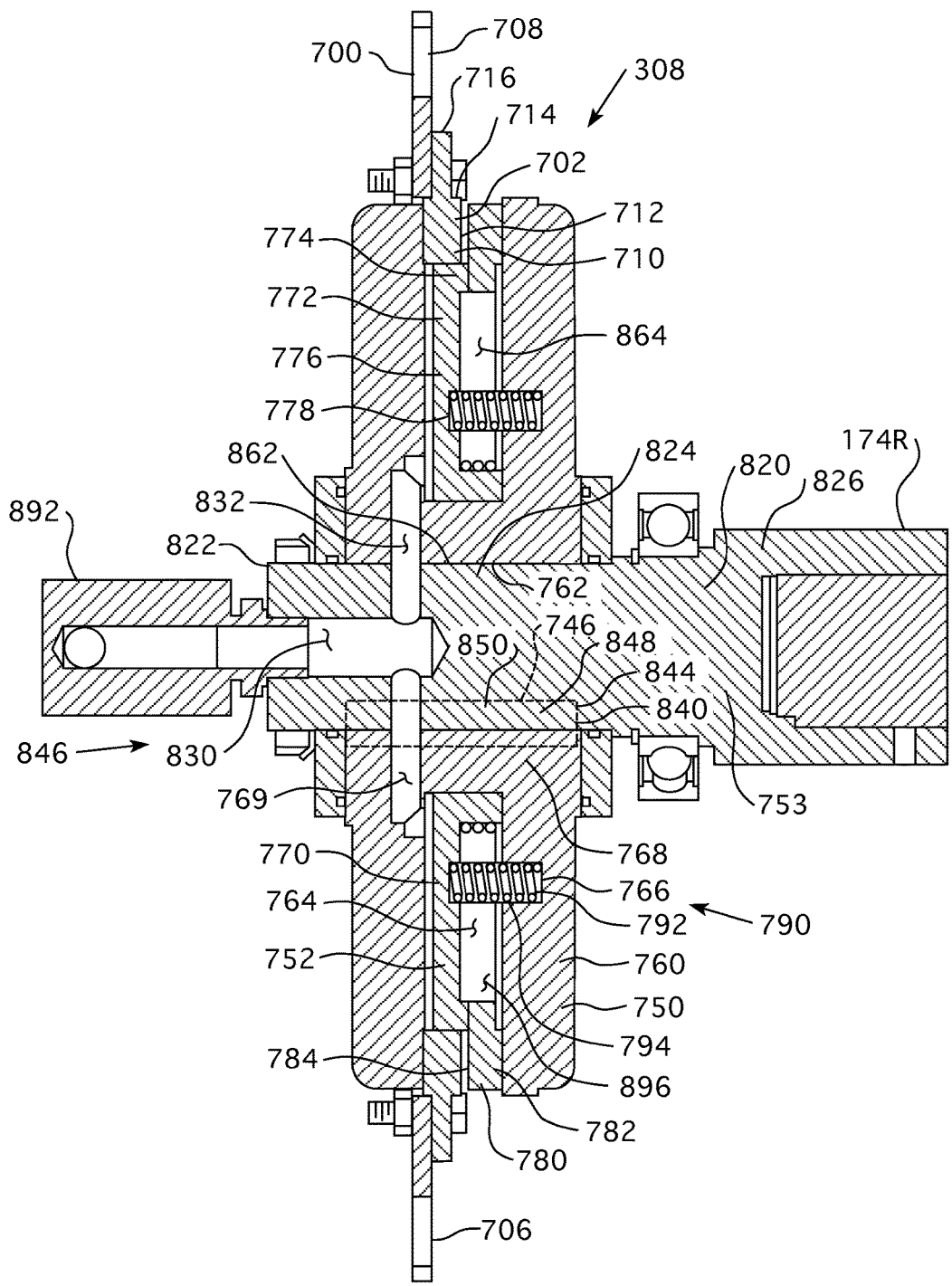
FIG. 22 is a detail side cross-sectional view of a rear brake assembly.

In an exemplary embodiment, stress on the various linkage shafts 170A, 170B, 170C, and 170D is reduced by a rear brake assembly 312, and a rear hub assembly 314. That is, as shown in FIG. 22, the rear brake assembly 312 is similar to the forward brake assembly 308 and includes a rear support assembly 700 and a rear brake member 702. The rear support assembly 700 is shown in part as opposed brackets 706, 708 (FIG. 18). It is understood that the rear support assembly 700 includes a number of other members or elements that support the rear support assembly brackets 706, 708. For example, the rear support assembly 700 can be, but is not limited to, a housing assembly or a frame assembly (neither shown). The rear support assembly brackets 706, 708 include passages (not numbered) through which fasteners may extend. The rear support assembly 700 is structured to provide a fixed coupling point for the clutch/brake assembly rear brake assembly rear brake member 702 (hereinafter "rear brake member" 702).

The rear brake member 702 includes a generally toroidal body 710 having an axial, first planar surface 712 and an outer radial surface 714. The rear brake member body first planar surface 712 is, in an exemplary embodiment, substantially smooth and is structured to be engaged by a clutch pad. The rear brake member body outer radial surface 714 includes a number of radially extending tabs 716, each defining a passage (not numbered). In an exemplary embodiment, the rear brake member body 710 has a generally rectangular cross-section. The rear brake member body 710 is coupled, directly coupled, or fixed to the rear support assembly 700 by fasteners extending through the rear support assembly brackets 706, 708 and the rear brake member body tabs 716.

The rear hub assembly 314, in an exemplary embodiment, also uses a clutch assembly to engage the rear brake member body 710. That is, the rear hub assembly 314 (hereinafter "rear hub assembly" 314) includes a wheel assembly 750, a clutch assembly 752, and a shaft 753. The rear hub assembly wheel assembly 750 is, in an exemplary embodiment, fixed to the rear hub assembly shaft 753, as described below. In an exemplary embodiment, the rear hub assembly wheel assembly 750 is fixed in a single orientation to the rear hub assembly shaft 753 by the rear key assembly 840, as described below.

The rear hub assembly wheel assembly 750 includes a body 760 (hereinafter "rear hub assembly wheel body" 760). The rear hub assembly wheel body 760 is generally toroidal and defines a center passage 762, as well as a clutch assembly cavity 764. In an exemplary embodiment, the rear hub assembly wheel body clutch assembly cavity 764 is a toroidal cavity having a rectangular cross-sectional shape. Further, the rear hub assembly wheel body clutch assembly cavity 764 includes a number of spaced, generally axial pockets 766. In an exemplary embodiment, the rear hub assembly wheel body clutch assembly cavity axial pockets 766 are disposed in a pattern within the rear hub assembly wheel body clutch assembly cavity 764.

In an exemplary embodiment, the rear hub assembly wheel body 760 further includes an axial slot 768. As discussed below, the rear hub assembly wheel body axial slot 768 is sized to correspond to a rear key assembly axial slot 844 and, when the rear hub assembly wheel body 760 is disposed on the rear hub assembly shaft 753, the rear key assembly axial slot 844 and the rear hub assembly wheel body axial slot 768 align to form a rear key passage 746.

Further, in an exemplary embodiment, the rear hub assembly wheel body 760 includes a number of radial passages 769 that extend between the rear hub assembly wheel body center passage 762 and the rear hub assembly wheel body clutch assembly cavity 764. In an exemplary embodiment, the rear hub assembly wheel body radial passages 769 extend to one axial surface of the rear hub assembly wheel body clutch assembly cavity 764. The rear hub assembly wheel body radial passages 769 are sized an positioned to correspond to the rear hub assembly shaft body medial portion radial passages 832, discussed below.

The rear hub assembly clutch assembly 752 (hereinafter "rear clutch assembly" 752) includes a movable piston 770, a clutch pad 780 and a mounting 790. The rear clutch assembly piston 770 includes a toroidal body 772. The rear clutch assembly piston body 772 includes an clutch pad support 774 and a mounting portion 776. The rear clutch assembly clutch pad body support 774 is structured to support and/or coupled to the rear clutch assembly clutch pad 780 to the rear clutch assembly piston 770. In an exemplary embodiment, the rear clutch assembly piston 770 and the rear clutch assembly clutch pad 780 are unitary and the rear clutch assembly clutch pad body support 774 is the transition between the two areas of the unitary body. The rear clutch assembly clutch pad body mounting portion 776 is a generally planar portion including a number of axial mounting pockets 778. The rear clutch assembly piston body mounting pockets 778 are in a pattern sized and shaped to correspond to the rear hub assembly wheel body clutch assembly cavity axial pockets 766 and to their pattern.

The rear clutch assembly clutch pad 780 includes a toroidal body 782. In an exemplary embodiment, the rear clutch assembly clutch pad 780 is made from a soft material and is sized and shaped to correspond to the rear brake member body first planar surface 712 as well as the rear brake member body 710. The rear clutch assembly clutch pad body 782 has, in an exemplary embodiment, a generally rectangular cross-section including a first axial surface 784.

In an exemplary embodiment, the rear clutch assembly mounting 790 includes a number of resilient members 792. As shown, and in an exemplary embodiment, the rear clutch assembly mounting members 792 are compression springs 794. The members 792 are sized to correspond to the rear clutch assembly piston body mounting pockets 778 and the rear hub assembly wheel body clutch assembly cavity axial pockets 766.

The rear hub assembly 314 is assembled as follows. The rear clutch assembly clutch pad 780 is coupled, directly coupled or fixed to the rear clutch assembly piston body 772. In an exemplary embodiment, the rear clutch assembly clutch pad 780 extends about, i.e. encircles, the rear clutch assembly piston body 772. The rear clutch assembly piston body 772 and rear clutch assembly clutch pad 780 are movably disposed in the rear hub assembly wheel body clutch assembly cavity 764. In an exemplary embodiment, the rear clutch assembly piston body 772 and rear clutch assembly clutch pad 780 are translatably disposed in the rear hub assembly wheel body clutch assembly cavity 764. In an exemplary embodiment, the rear clutch assembly piston body 772 and rear clutch assembly clutch pad 780 move generally axially as described below.

The rear clutch assembly mounting 790, and in an exemplary embodiment the rear clutch assembly mounting members 792, movably, or translatably, couple the rear clutch assembly piston body 772 and rear clutch assembly clutch pad 780 to the rear hub assembly wheel body 760. For example, opposing ends of the resilient members 792 are disposed in one of the rear clutch assembly piston body mounting pockets 778 or the rear hub assembly wheel body clutch assembly cavity axial pockets 766. In this configuration, the rear clutch assembly piston body 772 and rear clutch assembly clutch pad 780 are structured to move axially relative to the rear hub assembly wheel body 760, but cannot rotate relative thereto.

The rear hub assembly shaft 753 includes an elongated, generally cylindrical body 820. The rear hub assembly shaft body 820 includes a first end 822, a medial portion 824, and a second end 826. The rear hub assembly shaft body first end 822 includes an axial bore 830 that extends to the rear hub assembly shaft body medial portion 824. The rear hub assembly shaft body medial portion 824 includes the continuation of the rear hub assembly shaft body axial bore 830 as well as a number of generally radial passages 832. The rear hub assembly shaft body medial portion 824 further includes a rear key assembly 840.

The rear hub assembly shaft body medial portion key assembly 840 (hereinafter rear key assembly 840) is structured to maintain the rear hub assembly 314 in a fixed relationship with the rear hub assembly shaft body 820. In an exemplary embodiment, the rear key assembly 840 includes an axial slot 844 that extends to a rear hub assembly shaft body first end axial face 823. In an exemplary embodiment, the rear key assembly axial slot 844 has a semicircular cross-section. As discussed above, the rear hub assembly wheel body 760, includes a similar axial slot 768. When the rear hub assembly wheel body 760 is disposed on the rear hub assembly shaft body 820, the rear key assembly axial slot 844 and the rear hub assembly wheel body axial slot 768 align to form a key passage 746. The rear key assembly 840 further includes a key member 848. In an exemplary embodiment, the key assembly key member 848 is a body 850 that corresponds to the rear key assembly key passage 846.

The rear hub assembly shaft body second end 826 includes a selectable coupling 174R. As noted above, each selectable coupling 174 is structured to be selectably (i.e. removably) coupled to another selectable coupling 174 in a fixed relationship. In an exemplary embodiment, each selectable coupling 174 is a symmetrical interlocking selectable coupling 175, as described above.

The rear hub assembly 314 is, in an exemplary embodiment, fixed to the rear hub assembly shaft body medial portion 824. The rear hub assembly shaft body medial portion 824 is disposed in the rear hub assembly wheel body center passage 862 with the rear key assembly axial slot 844 and the hub assembly wheel body axial slot 768 aligned to form the key passage 846. The key member 848 is disposed in the key passage 846 and substantially fixes the rear hub assembly wheel body 760 to the rear hub assembly shaft body 820. That is, manufacturing tolerances may allow for minimal motion between the rear hub assembly wheel body 760 and the rear hub assembly shaft body 820, but the rear hub assembly wheel body 760 cannot rotate about the rear hub assembly shaft body 820.

When the rear hub assembly wheel body 760 is disposed on the rear hub assembly shaft body medial portion 824, the rear hub assembly wheel body radial passages 769 and the rear hub assembly shaft body medial portion radial passages 832 form a number of continuous passages. Stated alternatively, when the rear hub assembly wheel body 760 is disposed on the rear hub assembly shaft body medial portion 824, the rear hub assembly wheel body radial passages 769 and the rear hub assembly shaft body medial portion radial passages 832 are in fluid communication.

Further, the rear brake member 702 is disposed within the rear hub assembly wheel body clutch assembly cavity 764. As noted above, the rear brake member 702 is also sized and shaped to correspond to rear clutch assembly clutch pad 780. The rear hub assembly wheel body clutch assembly cavity 864 has a sufficient axial height so that the rear clutch assembly clutch pad 780 can be spaced from the rear brake member 702.

In this configuration, the rear clutch assembly piston body 772, and therefore the rear clutch assembly clutch pad 780, moves between two positions, a first position, wherein the rear clutch assembly clutch pad 780 is fixed to the rear brake member 702, and a second position, wherein the rear clutch assembly clutch pad 780 is not fixed to the rear brake member 702. In an exemplary embodiment, the rear clutch assembly mounting 790 is structured to bias the rear clutch assembly piston body 772, and therefore the rear clutch assembly clutch pad 780, toward the first position.

In this embodiment, the pneumatic actuator assembly 310 is further structured to actuate the rear brake assembly 312, That is, the pneumatic actuator assembly 310 further includes the rear hub assembly shaft body axial bore 830, rear hub assembly shaft body medial portion radial passages 832, the rear hub assembly wheel body radial passages 769, and a rear rotatable pressure coupling 892. The pneumatic actuator assembly 310 further includes a number of seals, pressure hoses, and a pressure generating assembly (none shown). The pneumatic actuator assembly rear rotatable pressure coupling 892 is rotatably disposed in the rear hub assembly shaft body axial bore 830. The rear hub assembly shaft body medial portion radial passages 832 and the rear hub assembly wheel body radial passages 769 are aligned when the rear hub assembly 314 is fixed to the rear hub assembly shaft 753. The seals are disposed at, or about, the various interfaces of these elements and are structured to substantially prevent fluid leakage from the various passages. Further, seals are disposed between the surfaces of the rear hub assembly wheel body clutch assembly cavity 864 and the rear clutch assembly piston 770 thereby creating a rear hub assembly pressure retaining chamber 896 on one side of the forward clutch assembly piston 470. In this configuration, the pneumatic actuator assembly 310 is structured to move, via pressurizing the rear hub assembly pressure retaining chamber 896, the rear clutch assembly piston body 772 between the first position and the second position. That is, when pressure is applied to the rear hub assembly pressure retaining chamber 896, the rear clutch assembly piston body 772 moves to the second position.

The rear hub assembly 314 is selectably coupled to the fourth linkage shaft 170D. That is, the fourth linkage shaft body second end selectable coupling 174"D is selectably, operatively coupled to, and therefore disposed in a fixed relationship with, the rear hub assembly shaft body second end selectable coupling 174R. Further, as disclosed above, the rear hub assembly wheel assembly 750 is fixed in a single orientation to the rear hub assembly shaft 753 by the rear key assembly 840. Further, the rear hub assembly wheel body 760 and the rear clutch assembly clutch pad 780 are disposed in a fixed orientation relative to each other.

The rear brake assembly 312 operates as follows. The rear clutch assembly piston body 772 is initially in the first position and the rear clutch assembly clutch pad 780 is fixed to the forward brake member 702. That is, the rear clutch assembly clutch pad 780 is stationary. As the rear hub assembly wheel body 760 and the rear clutch assembly clutch pad 780 are disposed in a fixed orientation relative to each other, the rear hub assembly wheel body 760 is stationary. Further, as the rear hub assembly wheel assembly 750 is fixed in a single orientation to the rear hub assembly shaft 753, the rear hub assembly shaft 753 is stationary.

When the pneumatic actuator assembly 310 is actuated, the forward hub assembly pressure retaining chamber 522 is pressurized and the forward clutch assembly piston body 472 moves from the first position to the second position, as described above. Further, the various linkage shafts 170A, 170B, 170C, and 170D, press shafts 176A, 176B, 176C, 176D, and crankshafts 52A, 52B, 52C, 52D begin to rotate, also as described above. Substantially simultaneously, the rear hub assembly pressure retaining chamber 896 is pressurized and the rear clutch assembly piston body 772, and therefore the rear clutch assembly clutch pad 780, moves to the second position. When the rear clutch assembly clutch pad 780 is in the second position, the rear clutch assembly clutch pad 780 is not fixed to the rear brake member 702 and the rear hub assembly wheel body 760 and the rear hub assembly shaft 753 are free to rotate. Accordingly, the rear hub assembly shaft 753 rotates along with the fourth linkage shaft 170D to which it is coupled in a fixed orientation.

When the pneumatic actuator assembly 310 is deactivated, pressure is released from the forward hub assembly pressure retaining chamber 522 and the rear hub assembly pressure retaining chamber 896, the forward clutch assembly mounting resilient members 492 and the rear clutch assembly mounting resilient members 792 move the forward clutch assembly piston body 472 and the rear clutch assembly piston body 772 to the first position. In this position, the forward clutch assembly clutch pad 480 and rear clutch assembly clutch pad 780 engage, and after a transition period, become fixed to the forward brake member body 510 and the rear brake member body 710, respectively. As described above, this causes the rotation of the various linkage shafts 170A, 170B, 170C, and 170D, press shafts 176A, 176B, 176C, 176D, and crankshafts 52A, 52B, 52C, 52D to cease rotation. Moreover, because the rear brake assembly 312 acts on the end of the direct drive linkage assembly 166 opposite the clutch/brake assembly 300, stress on the various linkage shafts 170A, 170B, 170C, and 170D is reduced because the braking loads are distributed.

In an exemplary embodiment, the feeder device 21 is mechanically driven by the multiple press drive assembly 160. As shown in FIGS. 1 and 18, the feeder device 21 includes an indexer assembly 900. The indexer assembly 900 is structured to convert a generally constant rotational motion to an intermittent, i.e. stop-and-go, motion. As noted above, the feeder device 21 is structured to progressively advance, or "index," a number of work pieces, i.e., can end shells 1' through the conversion system 10. More specifically, the feeder device 21 includes a number of feeder belts 902 each defining a number of cavities sized to correspond to a can end shell 1'. There is one feeder belt 902A, 902B, 902C for each end press units 12A, 12B, 12C. Each feeder belt 902A, 902B, 902C is configured in a loop that extends through an end lane 20A, 20B, 20C. Further, each feeder belt 902A, 902B, 902C is disposed on at least two rollers 904', 904" (FIGS. 1 and 2) at either end of the feeder belt 902A, 902B, 902C. One of the rollers 904'A, 904'B, 904'C is driven by the indexer assembly 900 which is, in turn, driven by multiple press drive assembly 160.

Figure 3:
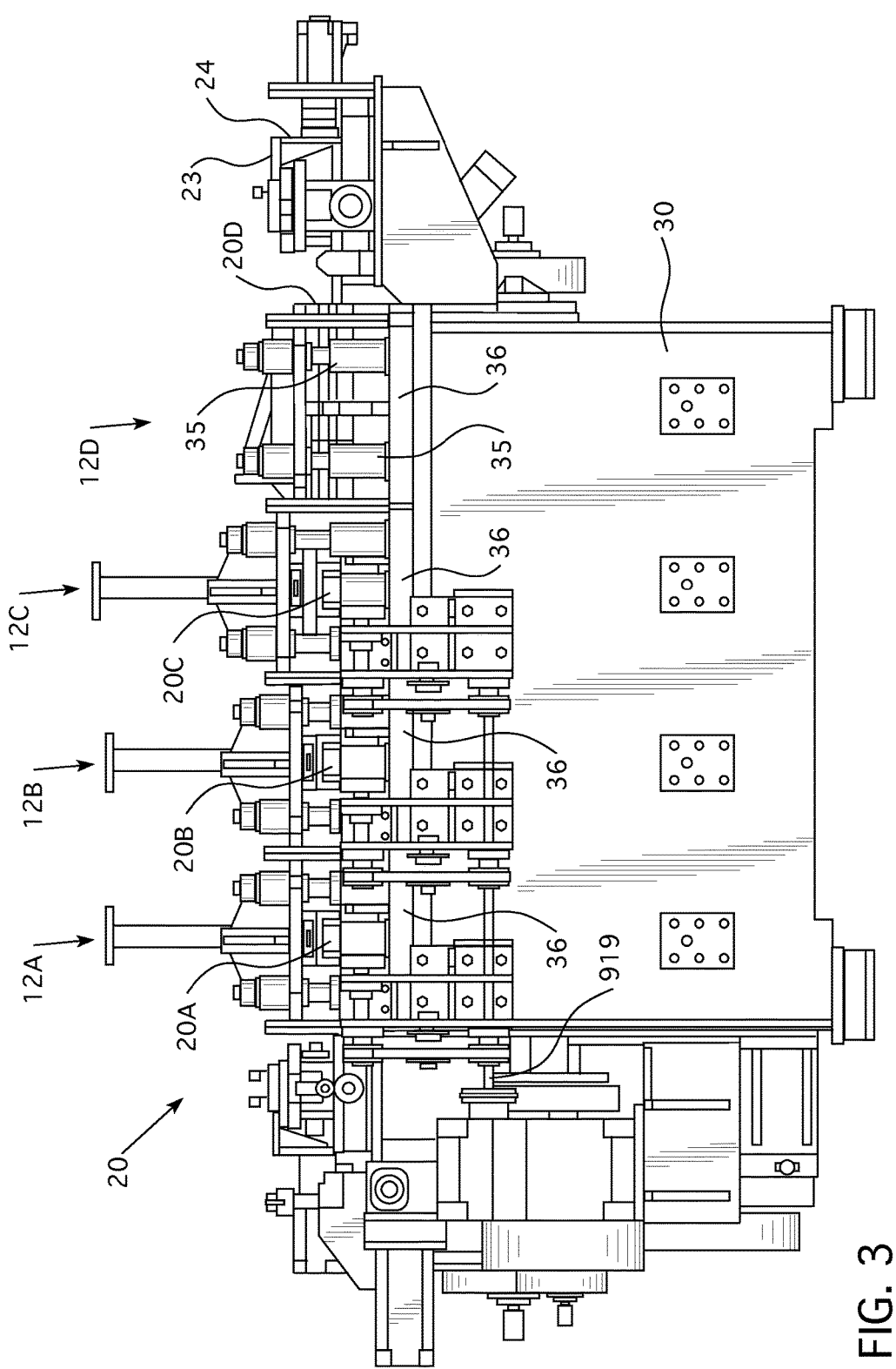
FIG. 3 is an end view of a can end conversion system.
Figure 23:
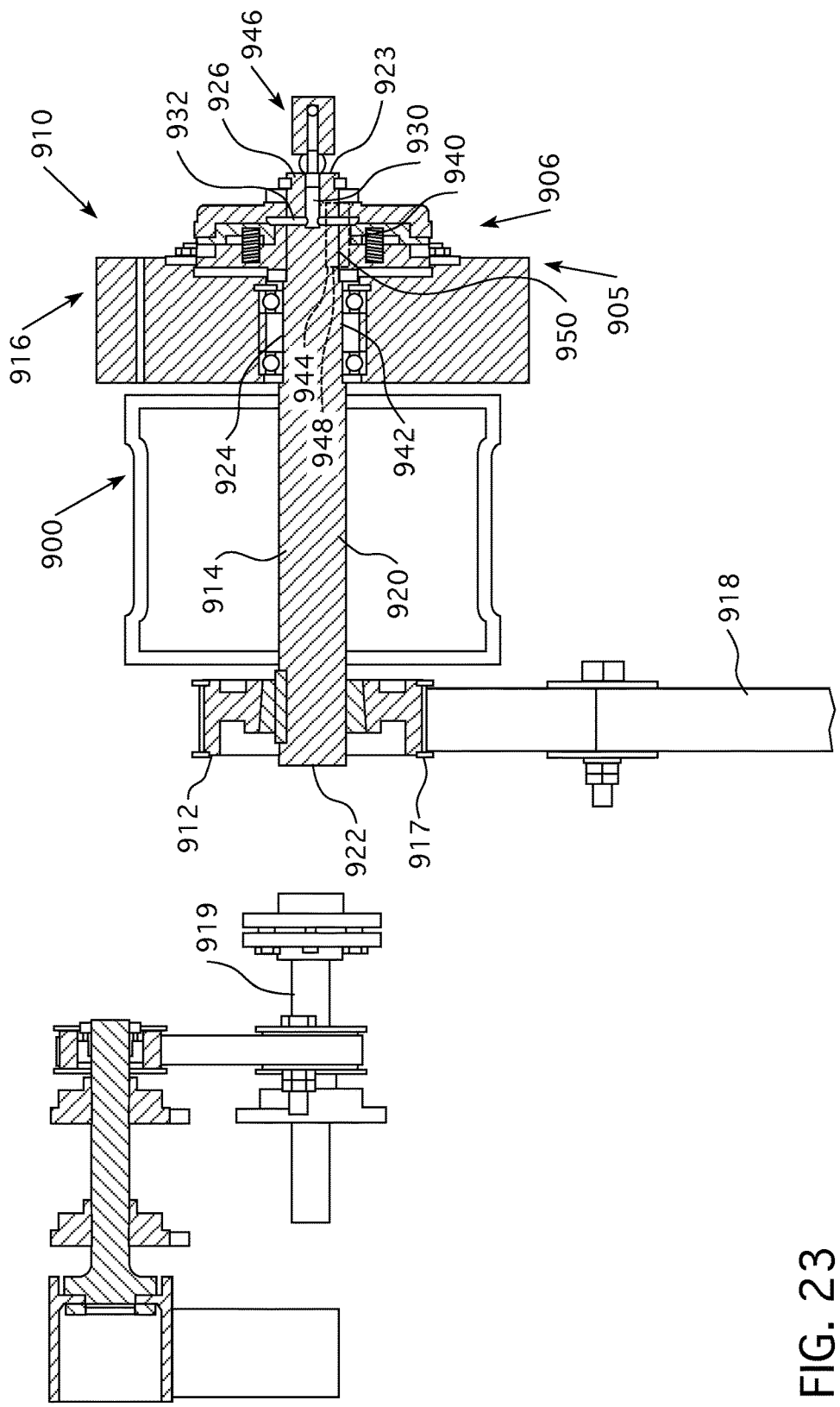
FIG. 23 is a detail top cross-sectional view of a feeder device drive assembly.

In an exemplary embodiment, as shown in FIG. 23, the indexer assembly 900 is operatively coupled to the feeder device drive assembly 910. The feeder device drive assembly 910 includes a drive device 912, a drive shaft 914, a momentum assembly 916, and an output shaft 919 (FIG. 3). The feeder device drive assembly momentum assembly 916 is a clutch assembly, a clutch/brake assembly or a unified clutch/brake assembly, but is identified as "momentum assembly" 916 to avoid confusion with the clutch/brake assembly 300 discussed above. The momentum assembly 916 includes a hub assembly 905 and a brake assembly 906.

The feeder device drive assembly drive device 912, in an exemplary embodiment, includes a sprocket 917 and a belt 918. The feeder device drive assembly drive device belt 918 is, in an exemplary embodiment, a toothed belt. The feeder device drive assembly drive device belt 918 is looped about the output shaft body drive device coupling drive sprocket 360 and the feeder device drive assembly drive device sprocket 917, thereby operatively coupling these two elements. As shown, a number of positioning rollers control the path of the feeder device drive assembly drive device belt 918.

The feeder device drive assembly drive shaft 914, which is also the input shaft for the indexer assembly 900, includes an elongated body 920. The feeder device drive assembly drive shaft body 920 includes a first end 922, a medial portion 924 and a second end, 926. The feeder device drive assembly drive shaft body 920, in an exemplary embodiment, extends through the indexer assembly 900. The feeder device drive assembly drive shaft body medial portion 924 is operatively coupled to the feeder device drive assembly output shaft 919 within the indexer assembly 900.

The feeder device drive assembly drive device sprocket 917 is coupled, directly coupled, or, in an exemplary embodiment, fixed to the feeder device drive assembly drive shaft body first end 922. In this configuration, rotational motion of the feeder device drive assembly drive device sprocket 917 is transferred to the feeder device drive assembly drive shaft body 920. The feeder device drive assembly drive shaft body second end 926 includes an axial bore 930 that extends to the feeder device drive assembly drive shaft body medial portion 924. The feeder device drive assembly drive shaft body medial portion 924 includes the continuation of the feeder device drive assembly drive shaft body axial bore 930 as well as a number of generally radial passages 932. The feeder device drive assembly drive shaft body medial portion 924 further includes a key assembly 940, a bearing assembly mounting 942.

The feeder device drive assembly drive shaft body medial portion key assembly 940 (hereinafter "feeder device drive shaft key assembly" 940) is structured to maintain the momentum assembly hub assembly 906 in a fixed relationship with the feeder device drive assembly drive shaft body 920. In an exemplary embodiment, the feeder device drive shaft key assembly 940 includes an axial slot 944 that extends to a feeder device drive assembly drive shaft body first end axial face 923. In an exemplary embodiment, the feeder device drive shaft key assembly axial slot 944 has a semicircular cross-section. As discussed below, the momentum assembly hub assembly wheel body 1060, includes a similar axial slot 1068. When the momentum assembly hub assembly wheel body 1060 is disposed on the feeder device drive assembly drive shaft body 920, the feeder device drive shaft key assembly axial slot 944 and the momentum assembly hub assembly wheel body axial slot 1068 align to form a feeder device drive shaft key passage 946. The feeder device drive shaft key assembly 940 further includes a feeder device drive shaft key member 948. In an exemplary embodiment, the feeder device drive shaft key assembly key member 948 is a body 950 that corresponds to the feeder device drive shaft key assembly key passage 946.

Figure 24:
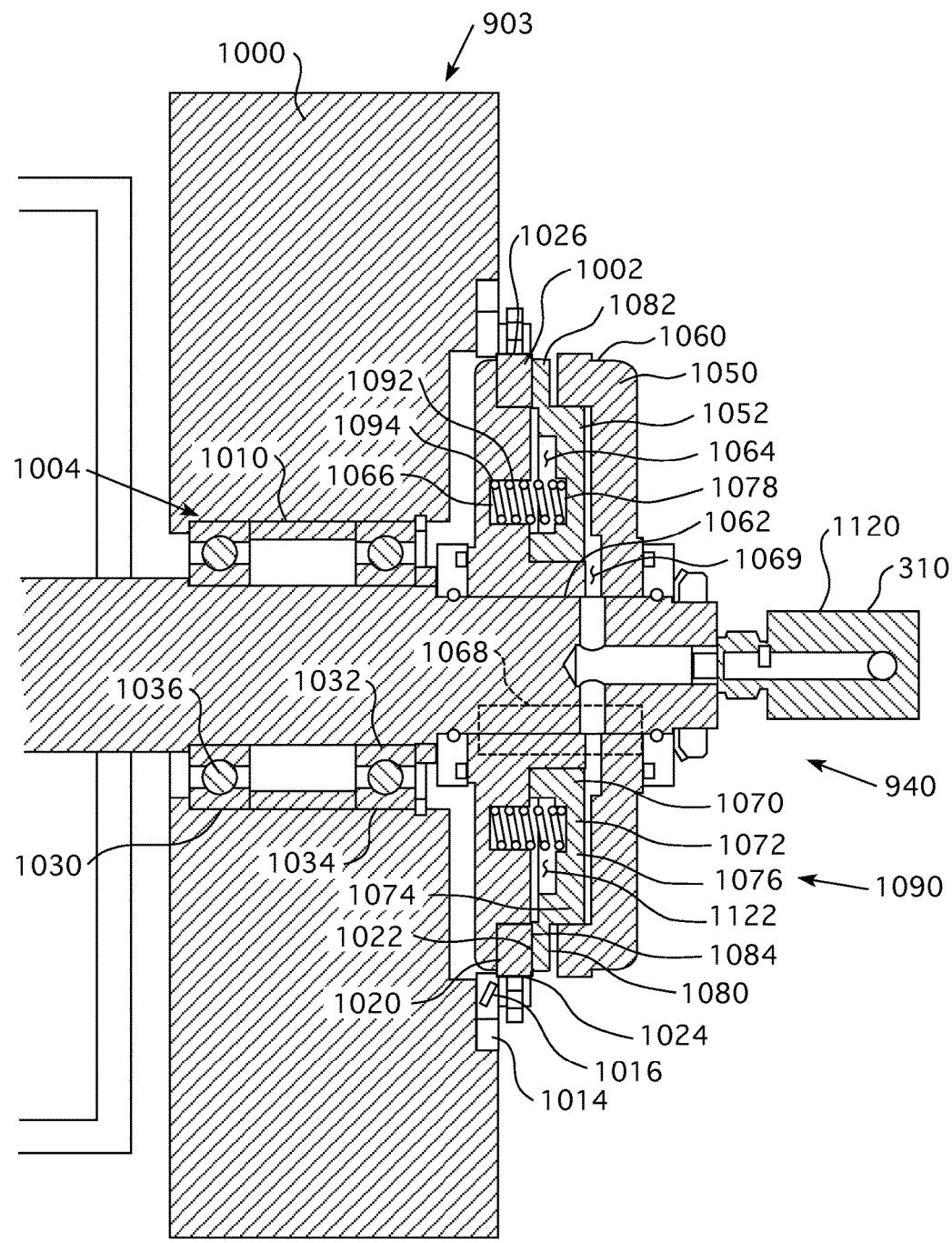
FIG. 24 is a detail side cross-sectional view of a momentum assembly.

As shown in FIG. 24, the feeder device drive assembly drive shaft body medial portion bearing assembly mounting 942 (hereinafter drive shaft body bearing assembly mounting 942) is a portion of the feeder device drive assembly drive shaft body 920 structured to be coupled to the momentum assembly flywheel assembly bearing assembly 1004, discussed below. The drive shaft body bearing assembly mounting 942 has a substantially circular cross-section.

The momentum assembly flywheel assembly 903 includes a flywheel body 1000, a clutch disk 1002, and a bearing assembly 1004. The momentum assembly flywheel assembly flywheel body 1000 is generally toroidal, i.e. shaped as a torus, and includes a central passage 1010. Further, the momentum assembly flywheel assembly flywheel body 1000 includes a collar 1014 on one axial surface. In an exemplary embodiment, and as used herein, a "collar" is a raised ridge that extends about, and is spaced from, a toroidal central passage such as the momentum assembly flywheel assembly flywheel body central passage 1010. As shown, the momentum assembly flywheel assembly flywheel body collar 1014 includes a number of threaded bores 1016 spaced generally evenly thereabout. The threaded bores 1016 extend generally axially.

The momentum assembly flywheel assembly clutch disk 1002 includes a generally toroidal body 1020 having an axial, first planar surface 1022 and an outer radial surface 1024. The momentum assembly flywheel assembly clutch disk first planar surface 1022 is, in an exemplary embodiment, substantially smooth and is structured to be engaged by a clutch pad. The momentum assembly flywheel assembly clutch disk outer radial surface 1024 includes a number of radially extending tabs 1026, each defining an passage (not numbered). There is a corresponding number of tabs 1026 and threaded bores 1016 which are further disposed in a corresponding pattern.

The momentum assembly flywheel assembly bearing assembly 1004 can be any known type of bearing. In an exemplary embodiment, as shown, the momentum assembly flywheel assembly bearing assembly 1004 includes a pair of spaced ball bearing assemblies 1030. That is, each momentum assembly flywheel assembly bearing assembly 1004 includes an inner, first torus-shaped race 1032, an outer, second torus-shaped race 1034, and a number of ball bearings 1036 disposed therebetween. The second torus-shaped race 1034 is sized to fit snugly within the momentum assembly flywheel assembly flywheel body central passage 1010.

The momentum assembly flywheel assembly 903 is assembled and coupled to the feeder device drive assembly drive shaft 914 as follows. The momentum assembly flywheel assembly clutch disk 1002 is coupled, directly coupled or, in an exemplary embodiment, fixed to the momentum assembly flywheel assembly flywheel body 1000. That is, a number of fasteners (not numbered) are passed through the momentum assembly flywheel assembly clutch disk outer radial surface tab passages and are threaded into the momentum assembly flywheel assembly flywheel body collar threaded bores 1016. Further, the momentum assembly flywheel assembly bearing assembly 1004 is disposed within the momentum assembly flywheel assembly flywheel body central passage 1010. The momentum assembly flywheel assembly 903 is rotatably coupled to the feeder device drive assembly drive shaft 914 with the momentum assembly flywheel assembly bearing assembly 1004 coupled, directly coupled, or fixed to the drive shaft body bearing assembly mounting 942. In an exemplary embodiment, the momentum assembly flywheel assembly bearing assembly first torus-shaped race 1032 is fixed to the drive shaft body bearing assembly mounting 942.

The momentum assembly hub assembly 906 includes a wheel assembly 1050 and a clutch assembly 1052. The momentum assembly hub assembly wheel assembly 1050 is, in an exemplary embodiment, fixed to the feeder device drive assembly drive shaft body 920 or the feeder device drive assembly drive shaft body medial portion 924. In an exemplary embodiment, the momentum assembly hub assembly wheel assembly 1050 is fixed in a single orientation to the feeder device drive assembly drive shaft body 920 by the feeder device drive shaft key assembly 940, as described below.

The momentum assembly hub assembly wheel assembly 1050 includes a body 1060 (hereinafter "momentum assembly hub assembly wheel body" 1060). The momentum assembly hub assembly wheel body 1060 is generally toroidal and defines a center passage 1062 as well as a clutch assembly cavity 1064. In an exemplary embodiment, the momentum assembly hub assembly wheel body clutch assembly cavity 1064 is a toroidal cavity having a rectangular cross-sectional shape. Further, the momentum assembly hub assembly wheel body clutch assembly cavity 1064 includes a number of spaced, generally axial pockets 1066. In an exemplary embodiment, the momentum assembly hub assembly wheel body clutch assembly cavity axial pockets 1066 are disposed in a pattern within the momentum assembly hub assembly wheel body clutch assembly cavity 1064.

In an exemplary embodiment, the momentum assembly hub assembly wheel body 1060 further includes an axial slot 1068. As discussed above, the momentum assembly hub assembly wheel body axial slot 1068 is sized to correspond to the key assembly axial slot 944 and, when the momentum assembly hub assembly wheel body 1060 is disposed on the feeder device drive assembly drive shaft body 920, the key assembly axial slot 944 and the hub assembly wheel body axial slot 1068 align to form a key passage 946.

Further, in an exemplary embodiment, the momentum assembly hub assembly wheel body 1060 includes a number of radial passages 1069 that extend between the momentum assembly hub assembly wheel body center passage 1062 and the momentum assembly hub assembly wheel body clutch assembly cavity 1064. In an exemplary embodiment, the momentum assembly hub assembly wheel body radial passages 1069 extend to one axial surface of the momentum assembly hub assembly wheel body clutch assembly cavity 1064. The momentum assembly hub assembly wheel body radial passages 1069 are sized and positioned to correspond to the feeder device drive assembly drive shaft body medial portion radial passages 932. That is, when the momentum assembly hub assembly wheel body 1060 is disposed on the feeder device drive assembly drive shaft body medial portion 924, the momentum assembly hub assembly wheel body radial passages 1069 and the feeder device drive assembly drive shaft body medial portion radial passages 932 form a number of continuous passages. Stated alternatively, when the momentum assembly hub assembly wheel body 1060 is disposed on the feeder device drive assembly drive shaft body medial portion 924, the momentum assembly hub assembly wheel body radial passages 1069 and the feeder device drive assembly drive shaft body medial portion radial passages 932 are in fluid communication.

The momentum assembly hub assembly clutch assembly 1052 (hereinafter "momentum assembly clutch assembly" 1052) includes a movable piston 1070, a clutch pad 1080 and a mounting 1090. The momentum assembly clutch assembly piston 1070 includes a toroidal body 1072. The momentum assembly clutch assembly piston body 1072 includes a clutch pad support 1074 and a mounting portion 1076. The momentum assembly clutch assembly clutch pad body support 1074 is structured to support and/or couple the momentum assembly clutch assembly clutch pad 1080 to the momentum assembly clutch assembly piston 1070. In an exemplary embodiment, the momentum assembly clutch assembly piston 1070 and the momentum assembly clutch assembly clutch pad 1080 are unitary and the momentum assembly clutch assembly clutch pad body support 1074 is the transition between the two areas of the unitary body. The momentum assembly clutch assembly clutch pad body mounting portion 1076 is a generally planar portion including a number of axial mounting pockets 1078. The momentum assembly clutch assembly piston body mounting pockets 1078 are in a pattern sized and shaped to correspond to the momentum assembly hub assembly wheel body clutch assembly cavity axial pockets 1066 and to their pattern.

The momentum assembly clutch assembly clutch pad 1080 includes a toroidal body 1082. In an exemplary embodiment, the momentum assembly clutch assembly clutch pad 1080 is made from a soft material and is sized and shaped to correspond to the momentum assembly flywheel assembly clutch disk first planar surface 1022. The momentum assembly clutch assembly clutch pad body 1082 has, in an exemplary embodiment, a generally rectangular cross-section including a first axial surface 1084.

In an exemplary embodiment, the momentum assembly clutch assembly mounting 1090 includes a number of resilient members 1092. As shown, and in an exemplary embodiment, the momentum assembly clutch assembly mounting members 1092 are compression springs 1094. The members 1092 are sized to correspond to the momentum assembly clutch assembly piston body mounting pockets 1078 and the momentum assembly hub assembly wheel body clutch assembly cavity axial pockets 1066.

The momentum assembly hub assembly 906 is assembled as follows. The momentum assembly clutch assembly clutch pad 1080 is coupled, directly coupled or fixed to the momentum assembly clutch assembly piston body 1072. In an exemplary embodiment, the momentum assembly clutch assembly clutch pad 1080 extends about, i.e. encircles, the momentum assembly clutch assembly piston body 1072. The momentum assembly clutch assembly piston body 1072 and momentum assembly clutch assembly clutch pad 1080 are movably disposed in the momentum assembly hub assembly wheel body clutch assembly cavity 1064. In an exemplary embodiment, the momentum assembly clutch assembly piston body 1072 and momentum assembly clutch assembly clutch pad 1080 are translatably disposed in the momentum assembly hub assembly wheel body clutch assembly cavity 1064. In an exemplary embodiment, the momentum assembly clutch assembly piston body 1072 and momentum assembly clutch assembly clutch pad 1080 move generally axially as described below.

The momentum assembly clutch assembly mounting 1090, and in an exemplary embodiment the momentum assembly clutch assembly mounting members 1092, movably, or translatably, couple the momentum assembly clutch assembly piston body 1072 and momentum assembly clutch assembly clutch pad 1080 to the momentum assembly hub assembly wheel body 1060. For example, opposing ends of the resilient members 1092 are disposed in one of the momentum assembly clutch assembly piston body mounting pockets 1078 or the momentum assembly hub assembly wheel body clutch assembly cavity axial pockets 1066. In this configuration, the momentum assembly clutch assembly piston body 1072 and momentum assembly clutch assembly clutch pad 1080 are structured to move axially relative to the momentum assembly hub assembly wheel body 1060, but cannot rotate relative thereto.

In this embodiment, the pneumatic actuator assembly 310 includes the feeder device drive assembly drive shaft body axial bore 930, the feeder device drive assembly drive shaft body medial portion radial passages 932, the momentum assembly hub assembly wheel body radial passages 1069, and a rotatable pressure coupling 1120. The pneumatic actuator assembly 310 further includes a number of seals, pressure hoses, and a pressure generating assembly (none shown). The pneumatic actuator assembly rotatable pressure coupling 1120 is rotatably disposed in the feeder device drive assembly drive shaft body axial bore 930. The feeder device drive assembly drive shaft body medial portion radial passages 932 and the momentum assembly hub assembly wheel body radial passages 1069 are aligned when the momentum assembly hub assembly 906 is fixed to the feeder device drive assembly drive shaft 914. The seals are disposed at, or about, the various interfaces of these elements and are structured to substantially prevent fluid leakage from the various passages. Further, seals are disposed between the surfaces of the momentum assembly hub assembly wheel body clutch assembly cavity 1064 and the momentum assembly clutch assembly piston 1070 thereby creating a momentum assembly hub assembly pressure retaining chamber 1122 on one side of the momentum assembly clutch assembly piston 1070. In this configuration, the pneumatic actuator assembly 310 is structured to move, via pressurizing the momentum assembly hub assembly pressure retaining chamber 1122, the momentum assembly clutch assembly piston body 1072 between a first position and a second position.

In addition to the configurations noted above, the momentum assembly 916 is assembled as follows. The momentum assembly flywheel assembly 903 is rotatably coupled to the feeder device drive assembly drive shaft 914 at the feeder device drive assembly drive shaft body medial portion 924. That is, the momentum assembly flywheel assembly bearing assembly 1004 is coupled, directly coupled, or fixed to the drive shaft body bearing assembly mounting 942 and the momentum assembly flywheel assembly flywheel body 1000 is coupled, directly coupled, or fixed to the momentum assembly flywheel assembly bearing assembly 1004. Further, the momentum assembly flywheel assembly clutch disk 1002 is disposed within the momentum assembly hub assembly wheel body clutch assembly cavity 1064. As noted above, the momentum assembly flywheel assembly clutch disk 1002 is sized and shaped to correspond to the momentum assembly clutch assembly clutch pad 1080. Thus, in this configuration, the momentum assembly flywheel assembly clutch disk 1002 and momentum assembly clutch assembly clutch pad 1080 are disposed adjacent to each other within the momentum assembly hub assembly wheel body clutch assembly cavity 1064. Further, the momentum assembly flywheel assembly clutch disk 1002 and momentum assembly clutch assembly clutch pad 1080 are also generally parallel to each other.

The momentum assembly hub assembly 906 is, in an exemplary embodiment, fixed to the feeder device drive assembly drive shaft body medial portion 924. The feeder device drive assembly drive shaft body medial portion 924 is disposed in the momentum assembly hub assembly wheel body center passage 1062 with the key assembly axial slot 944 and the hub assembly wheel body axial slot 1068 aligned to form the key passage 946. The key member 948 is disposed in the key passage 946 and substantially fixes the momentum assembly hub assembly wheel body 1060 to the feeder device drive assembly drive shaft body 920. That is, manufacturing tolerances may allow for minimal motion between the momentum assembly hub assembly wheel body 1060 and the feeder device drive assembly drive shaft body 920, but the momentum assembly hub assembly wheel body 1060 cannot rotate about the feeder device drive assembly drive shaft body 920.

In this configuration, the momentum assembly clutch assembly piston body 1072, and therefore the momentum assembly clutch assembly clutch pad 1080, moves between two positions, a first position, wherein the momentum assembly clutch assembly clutch pad 1080 is not fixed to the momentum assembly flywheel assembly 903, and a second position, wherein the momentum assembly clutch assembly clutch pad 1080 is fixed to the momentum assembly flywheel assembly 903 (and more specifically to the momentum assembly flywheel assembly clutch disk 1002). In an exemplary embodiment, the momentum assembly clutch assembly mounting 1090 is structured to bias the momentum assembly clutch assembly piston body 1072, and therefore the momentum assembly clutch assembly clutch pad 1080, toward the first position.

The feeder device drive assembly output shaft 919, which is also the output shaft of the indexer assembly 900, is coupled to the rollers 904'A, 904'B, 904'C. As with the other modular devices, a roller shaft 901 extending between the rollers 904'A, 904'B, 904'C is, in an exemplary embodiment, separable and includes separable couplings at the interface between roller shaft 901 segments. In this configuration, the feeder device drive assembly output shaft 919 drives each roller 904'A, 904'B, 904'C. As noted above, the indexer assembly 900 converts the generally constant rotation of the feeder device drive assembly drive shaft 914 to an intermittent motion in the feeder device drive assembly output shaft 919.

In operation, the momentum assembly clutch assembly piston body 1072 begins in the first position. That is, initially, the momentum assembly clutch assembly clutch pad 1080 is not fixed to the momentum assembly flywheel assembly 903. When the pneumatic actuator assembly 310 is actuated, the momentum assembly clutch assembly piston body 1072 moves to the second position. That is, the momentum assembly clutch assembly clutch pad 1080 is fixed to the momentum assembly flywheel assembly 903 (and more specifically to the momentum assembly flywheel assembly clutch disk 1002). In this configuration, the momentum assembly hub assembly wheel assembly 1050, which is fixed to the feeder device drive assembly drive shaft body 920, imparts a rotational motion to the momentum assembly flywheel assembly flywheel body 1000. As before, it is understood that there is a transition period wherein the momentum assembly clutch assembly clutch pad 1080 slips relative to the momentum assembly flywheel assembly clutch disk 1002. After the transition period, the momentum assembly clutch assembly clutch pad 1080 is fixed to the momentum assembly flywheel assembly clutch disk 1002. In this configuration, the momentum assembly flywheel assembly 903 rotates at the same speed, i.e. RPM, as the feeder device drive assembly drive shaft body 920. As noted above, the motion of the feeder device drive assembly drive shaft body 920 is converted to an intermittent motion in the feeder device drive assembly output shaft 919 by the indexer assembly 900.

When the pneumatic actuator assembly 310 is deactivated, pressure is released from the momentum assembly hub assembly pressure retaining chamber 1122. The momentum assembly clutch assembly mounting members 1092 move the momentum assembly clutch assembly piston body 1072 to the first position. In this position, the momentum assembly clutch assembly clutch pad 1080 is not fixed to the momentum assembly flywheel assembly 903 and the momentum assembly flywheel assembly 903 is free to rotate about the feeder device drive assembly drive shaft 914. Further, as noted above, when the pneumatic actuator assembly 310 is deactivated, the clutch/brake assembly output shaft body 320 is also stationary. As described above, the output shaft body drive device coupling drive sprocket 360 is operatively coupled to the feeder device drive assembly drive shaft 914. Thus, when the clutch/brake assembly output shaft body 320 is stationary, the feeder device drive assembly drive shaft 914 is also stationary. When the feeder device drive assembly drive shaft 914 is stationary, the momentum assembly hub assembly 906 is also stationary.

When the pneumatic actuator assembly 310 is actuated again (and presuming the momentum assembly flywheel assembly flywheel body 1000 has not lost rotational motion due to friction) the momentum assembly hub assembly 906 engages moving momentum assembly flywheel assembly flywheel body 1000. That is, the momentum assembly clutch assembly piston body 1072 moves to the second position as described above. except the momentum assembly flywheel assembly clutch disk 1002 is in motion. As such, the energy of the momentum assembly flywheel assembly 903 is preserved and assist in restarting the feeder device 21.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A multi-press drive assembly for a conversion system, said conversion system including a number of crankshafts, said drive assembly comprising:
   a motor including an output shaft;
   a clutch/brake assembly including an output shaft;
   a drive linkage assembly including a number of gearboxes, a number of linkage shafts, and a number of press shafts;
   said clutch/brake assembly operatively coupled to said motor output shaft;
   said clutch/brake assembly output shaft operatively coupled to at least one said drive linkage assembly linkage shaft;
   each said press shaft structured to be operatively coupled to a crankshaft;
   said clutch/brake assembly includes a flywheel assembly and a forward hub assembly;
   said forward hub assembly including a wheel assembly and a clutch assembly;
   said forward hub assembly wheel assembly fixed to said clutch/brake assembly output shaft;
   said forward hub assembly clutch assembly including a mounting and a movable clutch pad;
   said forward hub assembly clutch assembly mounting coupled to said forward hub assembly wheel assembly;
   said forward hub assembly clutch assembly clutch pad movably coupled to said forward hub assembly clutch assembly mounting; and
   said forward hub assembly clutch assembly clutch pad moves between a first position, wherein said forward hub assembly clutch assembly clutch pad is not fixed to said clutch/brake assembly flywheel assembly, and a second position, wherein said forward hub assembly clutch assembly clutch pad is fixed to said clutch/brake assembly flywheel assembly.

2. The multi-press drive assembly of claim 1, wherein:
   said clutch/brake assembly flywheel assembly includes a flywheel body, wherein said clutch/brake assembly flywheel body is generally a torus including a central passage; and
   said clutch/brake assembly flywheel body is rotatably disposed about said clutch/brake assembly output shaft.

3. The multi-press drive assembly of claim 2, wherein:
   said clutch/brake assembly flywheel assembly includes a clutch disk, said clutch/brake assembly flywheel assembly clutch disk fixed to said clutch/brake assembly flywheel body; and
   said hub assembly forward clutch assembly clutch pad moves between a first position, wherein said forward hub assembly clutch assembly clutch pad is not fixed to said clutch/brake assembly flywheel assembly clutch disk, and a second position, wherein said forward hub assembly clutch assembly clutch pad is fixed to said clutch/brake assembly flywheel assembly clutch disk.

4. The multi-press drive assembly of claim 3, wherein:
   said forward hub assembly clutch assembly includes a piston;
   said forward hub assembly clutch assembly piston including a body;
   wherein said forward hub assembly clutch assembly piston body is generally toroidal and includes a number of axial mounting pockets;
   said forward hub assembly wheel assembly includes a wheel body;
   wherein said forward hub assembly wheel body is generally toroidal and defines a clutch assembly cavity;
   said forward hub assembly clutch assembly clutch pad includes a generally toroidal body;
   said forward hub assembly clutch assembly clutch pad body fixed to said forward hub assembly clutch assembly piston body;
   said forward hub assembly clutch assembly piston body and said forward hub assembly clutch assembly clutch pad body movably disposed in said forward hub assembly wheel body clutch assembly cavity; and
   said forward hub assembly clutch assembly piston body moves between a first position, wherein said forward hub assembly clutch assembly clutch pad is not fixed to said clutch/brake assembly flywheel assembly clutch disk, and a second position, wherein said forward hub assembly clutch assembly clutch pad is fixed to said clutch/brake assembly flywheel assembly clutch disk.

5. The multi-press drive assembly of claim 4, wherein:
   said clutch/brake assembly includes a pneumatic actuator assembly; and
   said clutch/brake assembly pneumatic actuator assembly structured to move said forward hub assembly clutch assembly piston body between said first position and said second position.

* * * * *

UNITED STATES PATENT AND TRADEMARK OFFICE
CERTIFICATE OF CORRECTION

PATENT NO. : 10,352,385 B2
APPLICATION NO. : 14/881234
DATED : July 16, 2019
INVENTOR(S) : Gregory H. Butcher et al.

It is certified that error appears in the above-identified patent and that said Letters Patent is hereby corrected as shown below:

In the Specification

Column 4, Line 61, "assembly disposed" should read --assembly is disposed--.
Column 10, Line 30, "fixed to the thereto" should read --fixed thereto--.
Column 11, Line 20, "each press units" should read --each of press units--.
Column 11, Line 43, "shafts" should read --shaft--.
Column 17, Line 41, "in substantially in" should read --substantially in--.
Column 19, Line 32, "pins" should read --pin--.
Column 20, Line 29, "weight) This" should read --weight). This--.
Column 32, Line 19, "752. and" should read --752, and--.
Column 32, Line 55, "sized an positioned" should read --sized and positioned--.

Signed and Sealed this
Third Day of December, 2019

Andrei Iancu
*Director of the United States Patent and Trademark Office*